(12) United States Patent
Ophardt et al.

(10) Patent No.: US 8,622,243 B2
(45) Date of Patent: Jan. 7, 2014

(54) PHOTOCHROMIC OPTICALLY KEYED DISPENSER

(71) Applicant: Gotohti.com Inc., Beamsville (CA)

(72) Inventors: Heiner Ophardt, Arisdorf (CH); Andrew Jones, Smithville (CA)

(73) Assignee: Gotohti.com Inc., Beamsville (CA)

( * ) Notice: Subject to any disclaimer, the term of this patent is extended or adjusted under 35 U.S.C. 154(b) by 0 days.

(21) Appl. No.: 13/901,231

(22) Filed: May 23, 2013

(65) Prior Publication Data

US 2013/0256334 A1 Oct. 3, 2013

Related U.S. Application Data

(63) Continuation of application No. 13/308,774, filed on Dec. 1, 2011, now Pat. No. 8,479,950, which is a continuation of application No. 12/654,453, filed on Dec. 18, 2009, now Pat. No. 8,071,933, which is a continuation-in-part of application No. 11/881,753, filed on Jul. 30, 2007, now Pat. No. 7,984,825, and a continuation-in-part of application No. 12/155,763, filed on Jun. 9, 2008, now Pat. No. 7,980,421.

(51) Int. Cl.
*B67D 7/14* (2010.01)

(52) U.S. Cl.
USPC ......... 222/52; 222/63; 222/181.1; 222/181.3; 222/183; 222/325; 250/221; 250/372

(58) Field of Classification Search
USPC ............ 222/23, 52, 63, 113, 181.1, 181.3, 222/321.7, 321.8, 321.9, 183, 325–327, 222/192, 333, 372, 383.1; 250/221, 372, 250/492.1

See application file for complete search history.

(56) References Cited

U.S. PATENT DOCUMENTS

| 4,711,368 | A  | * | 12/1987 | Simons ...................... 340/545.6 |
| 4,851,530 | A  | * | 7/1989  | Rickwood ........................ 544/71 |
| 4,913,544 | A  | * | 4/1990  | Rickwood et al. ....... 351/159.61 |
| 5,373,970 | A  | * | 12/1994 | Ophardt .................... 222/181.2 |
| 5,431,309 | A  | * | 7/1995  | Ophardt .................... 222/181.3 |
| 5,836,482 | A  | * | 11/1998 | Ophardt et al. ............... 222/325 |
| 6,069,354 | A  | * | 5/2000  | Alfano et al. .................. 250/221 |
| 6,206,238 | B1 | * | 3/2001  | Ophardt ............................. 222/1 |
| 7,028,861 | B2 | * | 4/2006  | Sayers et al. ...................... 222/1 |
| 7,621,426 | B2 | * | 11/2009 | Reynolds et al. ............. 222/325 |
| 7,980,421 | B2 | * | 7/2011  | Ophardt et al. ................... 222/1 |
| 7,984,825 | B2 | * | 7/2011  | Ophardt et al. ................... 222/1 |
| 8,071,933 | B2 | * | 12/2011 | Ophardt et al. ............... 250/221 |
| 8,479,950 | B2 | * | 7/2013  | Ophardt et al. ................... 222/1 |

* cited by examiner

*Primary Examiner* — Frederick C Nicolas
(74) *Attorney, Agent, or Firm* — Thorpe North & Western LLP

(57) ABSTRACT

A removable and replaceable keying component which is required for operation of a mechanism and which component includes a waveguide having a photochromic portion. A method of controlling operation of a mechanism, preferably a dispenser, having a removable component comprising the steps of measuring electromagnetic radiation passing through a waveguide carrying at least in part on the removable component and permitting operation of the mechanism only when the measured electromagnetic radiation corresponds with one or more pre-selected parameters. Preferably, the method involves directing emitted electromagnetic radiation with pre-selected input parameters selected from a plurality of input parameters.

20 Claims, 30 Drawing Sheets

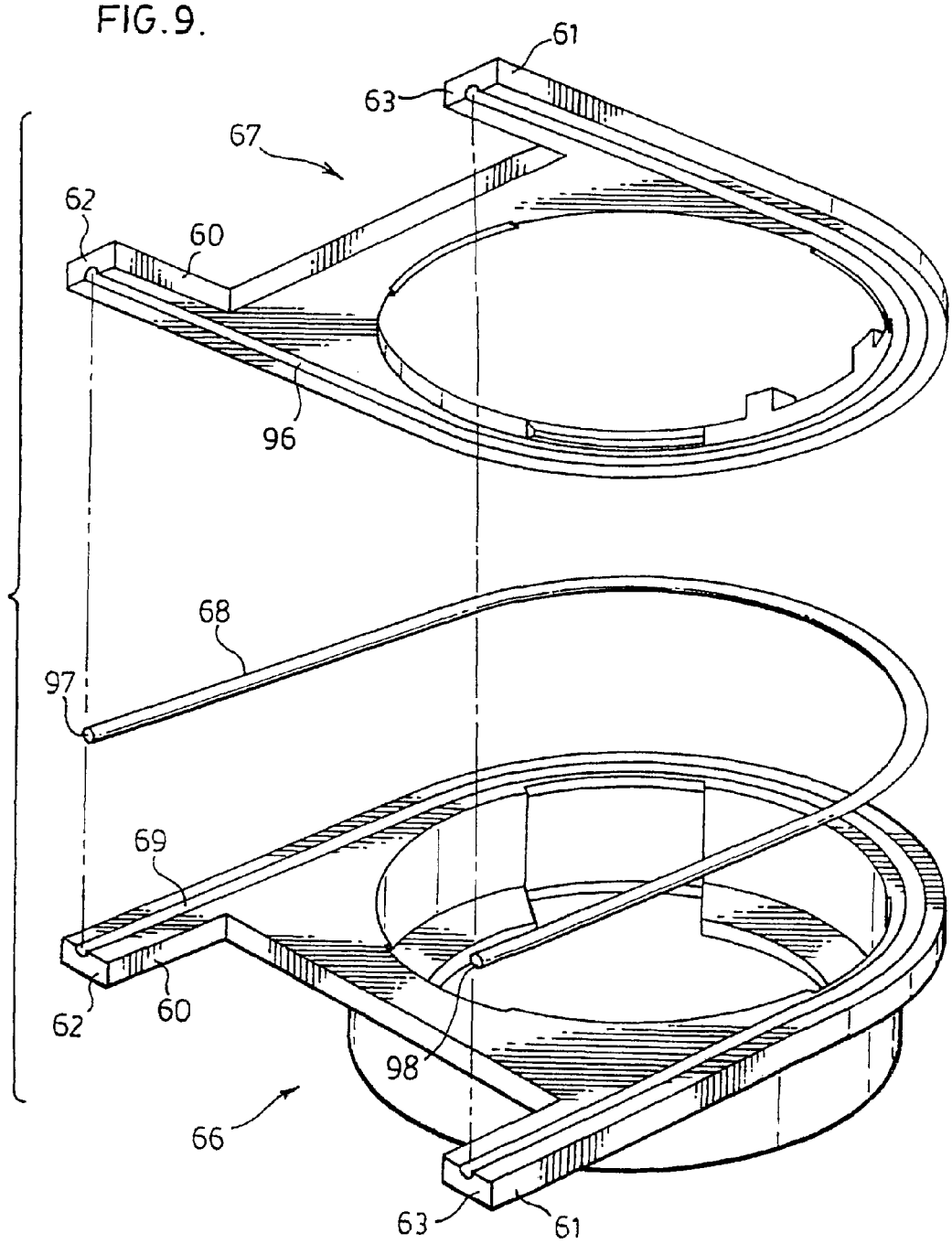

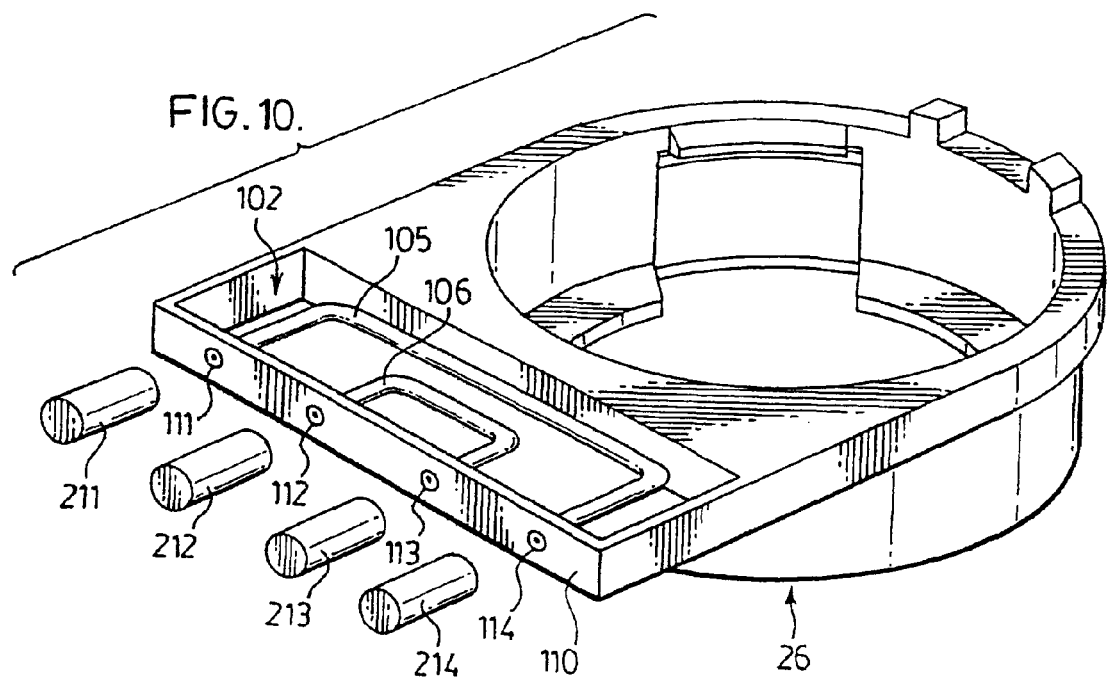
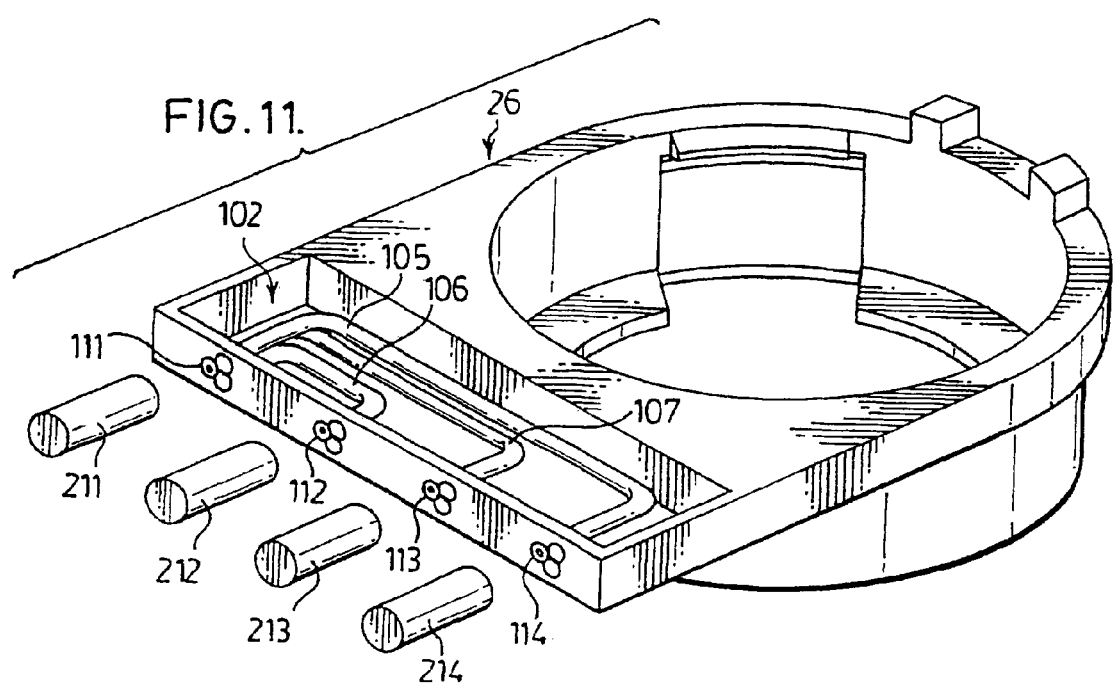

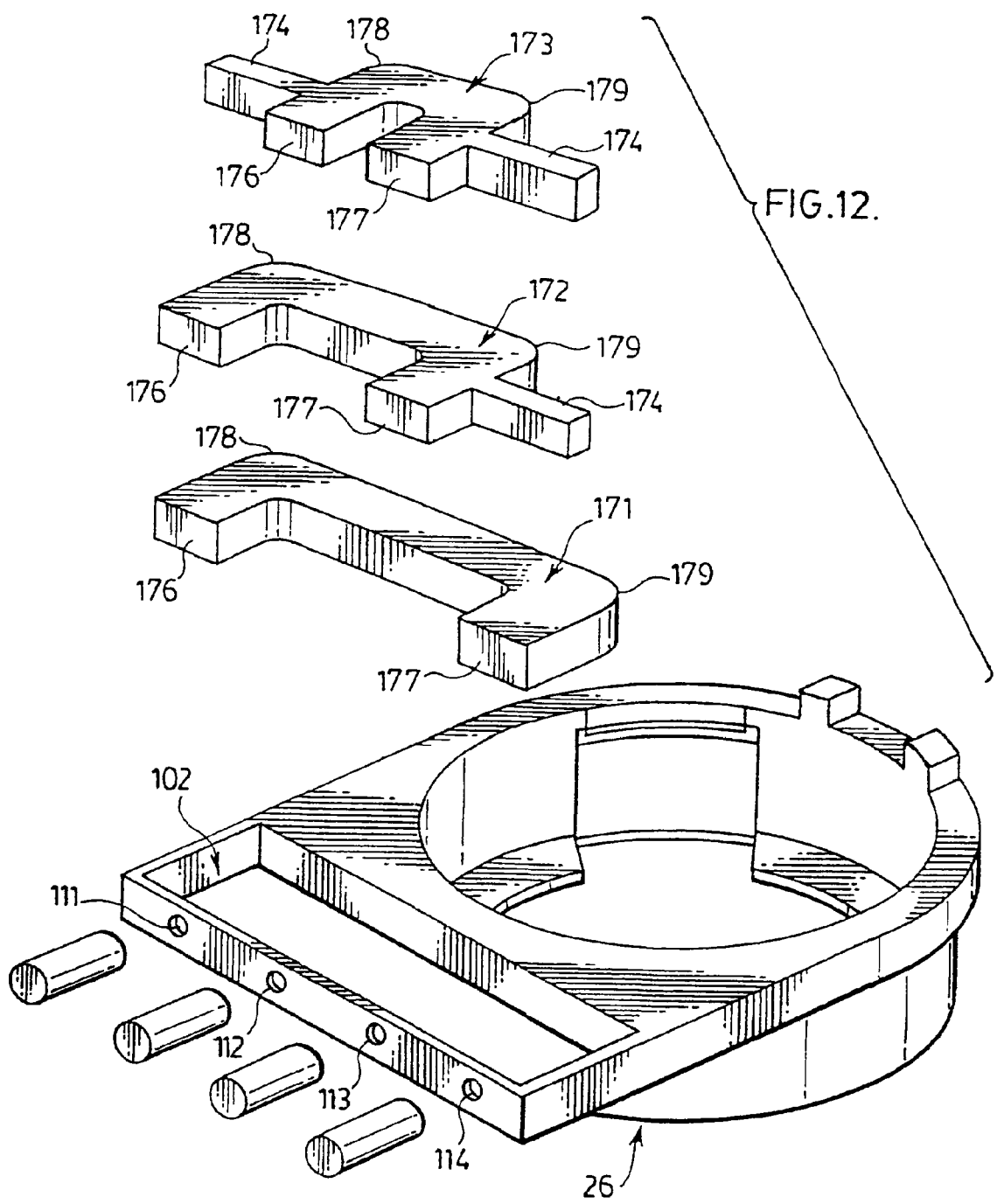

PHOTOCHROMIC OPTICALLY KEYED DISPENSER

RELATED APPLICATIONS

This application is a continuation of U.S. application Ser. No. 13/308,774 filed Dec. 1, 2011 which is a continuation of U.S. application Ser. No. 12/654,453 filed Dec. 18, 2009, issued to U.S. Pat. No. 8,071,933 which is a continuation-in-part of U.S. patent application Ser. No. 11/881,753 filed Jul. 30, 2007, issued as U.S. Pat. No. 7,984,825 and U.S. patent application Ser. No. 12/155,763 filed Jun. 9, 2008, issued to U.S. Pat. No. 7,980,421 and claims the benefit of 35 U.S.C. 120.

SCOPE OF THE INVENTION

This invention relates to a key system for determining conditions of compatibility of a replaceable component of a mechanism, preferably a dispenser such as a fluid dispenser and, more particularly, to an optical key system sensing electromagnetic waves transmitted through a waveguide to determine if the waveguide has a photochromic portion.

BACKGROUND OF THE INVENTION

Key systems are known in which a particular key is required to be received in a key system as to control an aspect of operation. Many different types of keys are used as, for example, keys to open locks in doors and operate machinery such as automobiles.

In the context of dispensing systems, U.S. Patent Publication US 2006/0124662 to Reynolds et al, the disclosure of which is incorporated herein by reference, teaches an electrically powered key device on a refill container to determine if the refill container is compatible with a fluid dispenser. The refill container provides a coil terminated by one of a number of capacitors and the container is received in a housing that provides a pair of coils that are in spacial relationship with the installed refill coil. By energizing the housing's coil, the other coil detects the unique electronic signature which, if acceptable, permits the dispensing system to dispense material. The system thus utilizes a near field frequency response to determine whether the refill container is compatible with the dispensing system.

Such previously known key devices using near field frequency response suffer the disadvantage that they are relatively complex and require a number of metal coils. This has the disadvantage of precluding substantially the entirety of the key device to be manufactured from plastic material and causes difficulties in recycling.

Photochromic and the related word photochromism are words which do not have a rigorous technical definition.

Photochromic is often defined as describing compounds that undergo a transformation of a chemical species between two forms by the absorption of electromagnetic radiation where the two forms have different absorption spectra, that is, different abilities to absorb electromagnetic radiation in a range of "test wavelengths", as in wavelength or strength. Often the word photochromic is used to describe a "reversible" reaction where an absorption band of the electromagnetic spectrum, typically in the visible part of the electromagnetic spectrum, changes dramatically in strength or wavelength. Typically, the reaction is a photochemical reaction by the absorption of "activating electromagnetic radiation" in a range of "activating wavelengths".

However, photochromic compounds can be considered to be either reversible or irreversible. Thus, while many technical definitions refer to photochromism as reversible, in this application and in the following claims:
1. the term "irreversible photochromic" is used to refer to photochemical reactions that yield a permanent change by the absorption of electromagnetic radiation;
2. the term "reversible photochromic" is used to refer to photochemical reactions by the absorption of electromagnetic radiation that are reversible; and
3. the term "photochromic" as used includes reactions which are reversible polychromic as defined in (2) above and reactions which are irreversible photochromic as defined in (1) above.

The activating electromagnetic radiation absorbed in the photochromic reaction is to be considered as being in a range of activating wavelengths which may be any wavelength electromagnetic radiation but is preferably light, more preferably near visible light, ultraviolet light, and visible light.

The different abilities of the two forms of a chemical species of a photochromic compound to absorb electromagnetic radiation may be different abilities to absorb electromagnetic radiation in any range of test wavelengths which may be any wavelength electromagnetic radiation but is preferably light, more preferably, near visible light, ultraviolet light, infrared light and visible light.

The two forms of a reversible photochromic compound may be considered to be an unactivated form in which the compound or dye is in an unactivated state and an activated form in which the compound or dye is in an activated state.

Another somewhat arbitrary requirement of reversible photochromic compounds is that they require the two forms to be stable under ambient conditions for a reasonable time. The timescale of reversion is important for many embodiments of the invention considered in this application, and photochromic compounds may be selected or molecularly engineered with timescale of reversion as may be desired. For example, a reversible photochromic compound in an unactivated state may on receiving an adequate "dose" of activating electromagnetic radiation change from an unactivated state to an activated state and in the activated state will inherently in the absence of the activating electromagnetic radiation inherently return to the unactivated state. As one alternative, the reversible photochromic dye in the activated state may on receiving an adequate "dose" of unactivating electromagnetic radiation change from the activated state to the unactivated state. The timescale of reversion may be the only significant difference between what might be considered an irreversible photochromic compound and reversible photochromic compound.

Reversion of reversible photochromic compounds may also be affected by the absence or presence of electromagnetic radiation in a range of wavelengths, notably light and therefore by darkness, being the absence of light.

The timescale of reversion of reversible photochromic compounds is often shorter at higher temperatures and accelerated by heating. A close relationship exists between photochromic and thermochromic compounds.

The extent to which photochromic compounds considered to be stable at ambient conditions and particularly thermally stable at ambient temperatures may be significant and photochromic compounds may be selected or can also be molecularly engineered with stability including thermal stability as may be desired.

The time that a reversible photochromic compound may be considered to revert from the activated state to the unactivated state at normal ambient room temperatures, may be referred to as the "reversion time period". The time that a reversible photochromic compound may be considered to change from an unactivated state to an activated state at normal ambient room temperature may be referred to as the "activation time period".

The ability of a waveguide containing a reversible photochromic compound in an unactivated state to transmit electromagnetic radiation in a range of test wavelength is referred to as the "inherent transmission characteristic" or the "unactivated transmission characteristic". The ability of a waveguide containing a reversible photochromic compound in an activated state to transmit electromagnetic radiation in the range of test wavelengths is referred to as the "activated transmission characteristic".

Compounds which are known and can be used as reversible photochromic dye include spiropyrans, spirooxazines, diarylethenes, azobenzenes, photochromic quinones and inorganic photochromics including silver and zinc halides and silver chloride. U.S. Pat. Nos. 4,913,544 and 4,851,530 teach exemplary known photochromic compounds and dyes. Such photochromic compounds and dyes are known for use in a variety of materials including plastic and glass. For example, photochromic dyes sold under the trade mark REVERSA-COL by James Robertson Ltd. are dyes which are preferably activated light from 350-410 nm and may be readily incorporated into various materials including low density polyethylene at, for example, 0.05% concentration. Such photochromic dyes may be selected so as to provide for different activation time periods and different reversion time periods for the activated dyes to fade from an activated state with maximum absorbance of test wavelengths of light to an inactivated state with lower absorbance of test wavelengths of light. Such REVERSACOL photochromic dyes may be used in various polymer matrix including polyolefins, vinyls, acrylic resins and styrenes. The preferred usage can be in relatively inexpensive low density polyethylene in the range of 0.1% to 2% by weight.

SUMMARY OF THE INVENTION

To at least partially overcome these disadvantages of the previously known devices, the invention provides each of: (a) a replaceable key component including photochromic waveguide, (b) a mechanism, preferably a dispenser for use with a key component including a photochromic waveguide, and (c) a method of operation of such a mechanism.

To at least partially overcome other disadvantages of the previously known devices, the present invention provides a method of controlling the operation of a mechanism, preferably a dispenser, having a removable component with a waveguide by selectively passing electromagnetic radiation through the waveguide and sensing electromagnetic radiation transmitted through the waveguide so as to determine if the waveguide includes a compatible photochromic portion.

An object of the present invention is to provide an optical key system in which compatibility of a component is tested by measuring the electromagnetic radiation passed through a waveguide to see if it is photochromic.

Another object is to provide an inexpensive system for determining whether a refill container is compatible with a dispensing system.

Another object is to provide an improved method of controlling the operation of a mechanism having a removable component.

In accordance with the present invention, a method is provided for controlling operation of a mechanism dependent upon whether a waveguide includes a photochromic dye.

The present invention provides a method of controlling the operation of a mechanism, preferably a dispensing mechanism, by selectively inputting electromagnetic radiation into a waveguide, sensing transmitted electromagnetic radiation through the waveguide and controlling operation based on whether or not the sensed radiation indicates the waveguide may have a photochromic dye, including one or more of a reversible photochromic portion and an irreversible photochromic portion. The invention also provides a dispenser having the components necessary to carry out the method. The invention also specifically covers a removable component for a mechanism in which the removable component includes a waveguide including at least one photochromic portion including one or more of: (1) a photochromic portion which contains a reversible photochromic dye, and (2) an irreversible photochromic portion. In this regard, the invention provides a novel removable component, preferably for use in a dispenser, preferably a fluid dispenser, which removable component includes a novel waveguide including a photochromic portion.

In accordance with the present invention, there is provided various combinations of features of the optical waveguide, the electromagnetic emitter and the electromagnetic sensor for determining whether any particular waveguide is compatible with a mechanism with which it is to be associated. The waveguides may have a varying combination of features of: (1) permanent capabilities for specific electromagnetic light wave absorption and transmission as by having a permanent colour, and (2) variable capabilities for light absorption and transmission as via the use of photochromic dyes which may be reversible and/or irreversible. Any combination of one or more of these features may be used alone or together in combination with other features such as size, position and placement of the waveguides and the use of frangible elements on the waveguide to provide advantageous arrangements for uniquely coding and keying waveguide containing components for use in specific mechanisms and methods for determination if any of the waveguide containing components meet the criteria of any specific of the mechanisms.

In a first aspect, the present invention provides a removable and replaceable keying component which is required for operation of a mechanism, the keying component including an electromagnetic radiation waveguide, the waveguide having an inlet for electromagnetic radiation and an outlet electromagnetic radiation, the waveguide providing a path for transmission of electromagnetic radiation from the inlet to the outlet, the waveguide includes a photochromic portion which contains a photochromic dye which has an inherent unactivated state and an activated state, on radiating with a dose of activation electromagnetic radiation in a range of activation wavelengths the photochromic dye changing from the unactivated to the activated state, with the photochromic dye in the unactivated state the photochromic portion having an inherent first transmission characteristic of electromagnetic radiation in a range of test wavelengths, and with the photochromic dye in the activated state the photochromic portion having a second transmission characteristic of electromagnetic radiation in the range of test wavelengths different than the first transmission characteristic, the keying component serving a function in the operation of the mechanism in addition to the function of providing the waveguide. Preferably, the keying component comprises a replacement component for an apparatus for dispensing material, the replacement component selected from the group consisting of: (a) wherein the apparatus for dispensing material is a dispenser for flowable material: (i) a chamber forming body for a pump having a chamber for receiving a movable material displacing element therein, (ii) a movable material displacing element to be received in a chamber of a chamber forming body for a pump, (iii) a chamber forming body for a fluid rotary pump having a chamber for receiving a rotatable fluid displacing element therein, (iv) a pump impeller, (v) a piston chamber forming body for a fluid piston pump having a chamber for slidably receiving a piston element coaxially therein, (vi) a piston element for a fluid piston pump, (vii) a reservoir for containing flowable material to be dispensed, (viii) a connecting collar for engagement about an outlet of a reservoir for containing flowable material to be dispensed to secure the reservoir to a conduit via which the flowable material is dispensed, (ix) a pump assembly for a fluid dispenser, and (x) a reservoir assembly including a reservoir containing material to be dispensed in which the reservoir having an outlet and a valve mechanism across the outlet; and (b) wherein the apparatus for dispensing material is a dispenser for sheet material wound on in roll; (i) a roll about which the sheet material to be dispensed is wound, and (ii) an engagement member on a roll about which the sheet material to be dispensed is wound, which engagement member provides for operative coupling of the roll to the dispenser for sheet material.

In a second aspect, the present provides a method of controlling the operation of a mechanism having a removable component removably coupled thereto, comprising the steps of:

selectively inputting input electromagnetic radiation into a waveguide carried on a removable, replaceable component for transmission through the waveguide;

sensing transmitted electromagnetic radiation transmitted through the waveguide; and permitting operation of the dispensing mechanism only if the step of sensing electromagnetic radiation determines that the waveguide includes a photochromic portion which contains a first photochromic dye which is activated by a dose of first activation electromagnetic radiation in a first range of activation wavelengths.

In a third aspect, the present invention provides a method of controlling the operation of a mechanism having a removable component removably coupled thereto, comprising the steps of:

selectively inputting input electromagnetic radiation into a first waveguide carried on the removable, replaceable component for transmission through the first waveguide;

sensing transmitted electromagnetic radiation transmitted through the first waveguide, determining from the transmitted electromagnetic radiation sensed as transmitted through the first waveguide whether the first waveguide includes a primary photoreactive portion which contains a photoreactive first dye, the first dye when unactivated is activated by radiation with the dose of first activation electromagnetic radiation in the first range of activation wavelengths, when the first dye is not activated, the primary portion having an inherent transmission characteristic for relative transmission of electromagnetic radiation in a first range of test wavelengths, when the first dye is activated, the primary portion having an activated first transmission characteristic for relative transmission of electromagnetic radiation in the first range of test wavelengths different from the inherent transmission characteristic of the primary photochromic portion, preferably the method including the steps of:

inputting into the first guideway for transmission through the first waveguide as input electromagnetic radiation the dose of the first activation electromagnetic radiation in the first range of activation wavelengths, after inputting the dose of the first activation electromagnetic radiation in the first range of activation wavelengths into the first guideway: (i) further inputting into the first guideway for transmission through the first waveguide as input electromagnetic radiation test electromagnetic radiation in the first range of test wavelengths, (ii) sensing transmitted electromagnetic radiation transmitted through the first waveguide for electromagnetic radiation in the first range of test wavelengths and (iii) determining from the electromagnetic radiation in the first range of test wavelengths sensed in step (ii) if the first waveguide has the first transmission characteristic of the portion, and (iv) if the first waveguide is determined in step (iii) to have the first transmission characteristic assuming the first waveguide includes the primary photochromic portion and if the first waveguide is determined to have the inherent transmission characteristic of the primary photochromic portion assuming the first waveguide does not includes the primary photochromic portion, and controlling operation of the mechanism dependant on whether the first waveguide is assumed to include the primary photochromic portion.

Preferably, in accordance with the third aspect of the invention, the method includes determining from the transmitted electromagnetic radiation sensed whether the first waveguide includes a photochromic portion which contains a photochromic second dye which has been activated by radiation with a dose of second activation electromagnetic radiation in a second range of activation wavelengths, the second dye when unactivated is activated by radiation with the dose of second activation electromagnetic radiation in the second range of activation wavelengths, and inherently returns to being unactivated after the passage of a second period of time from last being radiated with the dose of second activation electromagnetic radiation, when the first dye is not activated and the second dye is not activated, the photochromic portion having the inherent transmission characteristic for relative transmission of electromagnetic radiation in a first range of test wavelengths, when the first dye is not activated and the second dye is activated, the photochromic portion having an activated second transmission characteristic for relative transmission of electromagnetic radiation in the first range of test wavelengths different from the inherent transmission characteristic, inputting into the first guideway for transmission through the first waveguide as input electromagnetic radiation the dose of the second activation electromagnetic radiation in the second range of activation wavelengths, in the second period of time after inputting the dose of the second activation electromagnetic radiation in the second range of activation wavelengths: (i) further inputting into the first guideway for transmission through the first waveguide as input electromagnetic radiation test electromagnetic radiation in the second range of test wavelengths, (ii) sensing transmitted electromagnetic radiation transmitted through the first waveguide for electromagnetic radiation in the second range of test wavelengths and (iii) determining from the electromagnetic radiation in the second range of test wavelengths sensed in step (ii) if the first waveguide has one of the inherent transmission characteristic and the second transmission characteristic, and (iv) if the first waveguide is determined in step (iii) to have the second transmission characteristic assuming the first waveguide includes the photochromic portion and if the first waveguide is determined to have the inherent transmission characteristic assuming the first waveguide does not includes the photochromic portion, and controlling operation of the mechanism dependant on whether the first waveguide is assumed to include the photochromic portion.

Preferably, in accordance with the third aspect of the invention, the invention includes selectively inputting input electromagnetic radiation into a second waveguide carried on the removable, replaceable component for transmission through the second waveguide;

sensing transmitted electromagnetic radiation transmitted through the second waveguide, determining from the transmitted electromagnetic radiation sensed as transmitted through the second waveguide whether the second waveguide includes a secondary photochromic portion which contains a photochromic secondary dye which has been activated by radiation with a dose of secondary activation electromagnetic radiation in a secondary range of activation wavelengths, the secondary dye when unactivated is activated by radiation with the dose of secondary activation electromagnetic radiation in the secondary range of activation wavelengths, and inherently returns to being unactivated after the passage of a secondary period of time from last being radiated with the dose of secondary activation electromagnetic radiation, when the secondary dye is not activated, the secondary photochromic portion having an inherent transmission characteristic for relative transmission of electromagnetic radiation in a first range of test wavelengths, when the secondary dye is activated, the secondary photochromic portion having an activated secondary transmission characteristic for relative transmission of electromagnetic radiation in the secondary range of test wavelengths different from the inherent transmission characteristic of the secondary photochromic portion, inputting into the second guideway for transmission through the second waveguide as input electromagnetic radiation the dose of the secondary activation electromagnetic radiation in the secondary range of activation wavelengths, in the secondary period of time after inputting the dose of the secondary activation electromagnetic radiation in the secondary range of activation wavelengths into the second guideway: (i) further inputting into the second guideway for transmission through the second waveguide as input electromagnetic radiation test electromagnetic radiation in the secondary range of test wavelengths, (ii) sensing transmitted electromagnetic radiation transmitted through the second waveguide for electromagnetic radiation in the secondary range of test wavelengths and (iii) determining from the electromagnetic radiation in the secondary range of test wavelengths sensed in step (ii) if the second waveguide has the secondary transmission characteristic, and (iv) if the second waveguide is determined in step (iii) to have the inherent transmission characteristic of the secondary photochromic portion assuming the second waveguide does not includes the secondary photochromic portion, and controlling operation of the mechanism dependant on whether the second waveguide is assumed to include the secondary photochromic portion.

In a fourth aspect, the present invention provides a method of controlling operation of a mechanism, preferably a dispenser, having a removable component comprising the steps of measuring electromagnetic radiation passing through a waveguide carried at least in part on the removable component and controlling operation of the mechanism based on sensed electromagnetic radiation transmitted through the waveguide. Preferably, the method involves directing into the waveguide emitted electromagnetic radiation with pre-selected input parameters selected from a plurality of input parameters. The waveguide preferably is provided with pre-selected radiation transmission properties selected from a plurality of electromagnetic radiation transmission properties. The waveguide preferably includes a photochromic portion which has transmission properties which can be varied. The input parameters and radiation transmission properties may be selected from wavelength, intensity, duration and placement in time. Preferably, the method is used to control the operation of a dispensing mechanism having as a removable component a replaceable reservoir containing material to be dispensed by operation of the dispenser. Preferably, the waveguide is at least partially carried by the reservoir and is coupled against removal to the reservoir or coupled to the reservoir in a manner that separation of the waveguide and the reservoir results in destruction of the waveguide and/or the reservoir. Preferably, at least part of the waveguide is carried on the removable component such that coupling or uncoupling of the removable component changes the transmission characteristics of the waveguide as, for example, by the waveguide comprising a frangible member broken on removal of the removable component. Preferably, the removable component has a plurality of waveguides and the method includes measuring the electromagnetic radiation passing through two or more of the waveguides, preferably preventing operation of the dispenser when the measured electromagnetic radiation of a first of two of the waveguides does not comply with its pre-selected output parameters and the measured electromagnetic radiation of a second of two of the waveguides does not comply with its pre-selected output parameters.

The invention, in a fifth aspect, provides a dispensing system including a reservoir assembly including a reservoir containing material to be dispensed in an activation unit. The reservoir assembly is removably coupled to the activation unit for replacement by a similar reservoir assembly. An electromagnetic radiation waveguide is provided having an inlet and an outlet and providing a path for transmission of electromagnetic radiation from the inlet to the outlet. An electromagnetic radiation sensor is carried on the activation unit sensing electromagnetic radiation from the waveguide by the outlet. At least part of the waveguide is carried by the reservoir and removable therewith. A control mechanism is provided to control operation of the dispenser depending upon whether the electromagnetic radiation sensed by the sensor indicates that a portion of the waveguide carried on the reservoir is photochromic.

In a sixth aspect, the present invention provides a method of controlling the operation of a mechanism, preferably a dispenser, having a removable component removably coupled thereto comprising the steps of:

measuring electromagnetic radiation passing through a waveguide carried on a removable, replaceable component, and permitting operation of the dispensing mechanism only when the measured electromagnetic radiation complies with one or more pre-selected output parameters.

In a seventh aspect, the present invention provides a dispensing system comprising:

a reservoir assembly including a reservoir containing material to be dispensed and an activation unit, the reservoir assembly removably coupled to the activation unit for replacement by a similar reservoir assembly, an electromagnetic radiation waveguide having an inlet and an outlet and providing a path for transmission of electromagnetic radiation from the inlet to the outlet, an electromagnetic radiation sensor carried by the activation unit sensing electromagnetic radiation from the waveguide via the outlet, at least part of the waveguide carried by the reservoir assembly and removable therewith, a control mechanism to control operation of the dispenser based on whether the electromagnetic radiation sensed by the sensor appropriately correlates to pre-selected electromagnetic radiation profiles.

In yet another aspect, the present invention provides a replaceable reservoir assembly having a photochromic waveguide for use in a dispensing system.

In an eighth aspect, the present invention provides a dispensing system comprising:

a reservoir assembly including a reservoir containing material to be dispensed;

an activation unit, the reservoir assembly removably coupled to the activation unit for replacement by a similar reservoir assembly, an electromagnetic radiation waveguide having an inlet and an outlet and providing a path for transmission of electromagnetic radiation from the inlet to the outlet, an electromagnetic radiation emitter carried by the activation unit directing electromagnetic radiation into the waveguide via the inlet, an electromagnetic radiation sensor carried by the activation unit sensing electromagnetic radiation from the waveguide via the outlet, at least part of the waveguide carried by the reservoir assembly and removable therewith, and a control mechanism to control the operation of the emitter and receive input from the sensor to determine whether the electromagnetic radiation sensed by the sensor indicates that a portion of the waveguide carried on the reservoir is photochromic.

BRIEF DESCRIPTION OF THE DRAWINGS

Further aspects and advantages of the present invention will be come apparent from the following description taken together with the accompanying drawings in which:

FIG. 9 is an exploded pictorial view of a second embodiment of a collar which, when assembled, would have external features identical to that shown in FIG. 7;

FIG. 10 is a schematic pictorial view showing a third embodiment of a collar similar to that in FIG. 7 juxtapositioned with four key emitters/sensors to be carried on the backplate assembly;

FIG. 11 is a schematic pictorial view similar to FIG. 10 but showing a fourth embodiment of a collar, FIG. 12 is a schematic exploded pictorial view similar to FIG. 10 but showing a fifth embodiment of a collar with three alternate waveguide inserts for use therewith;

DETAILED DESCRIPTION OF THE DRAWINGS

Figure 1:
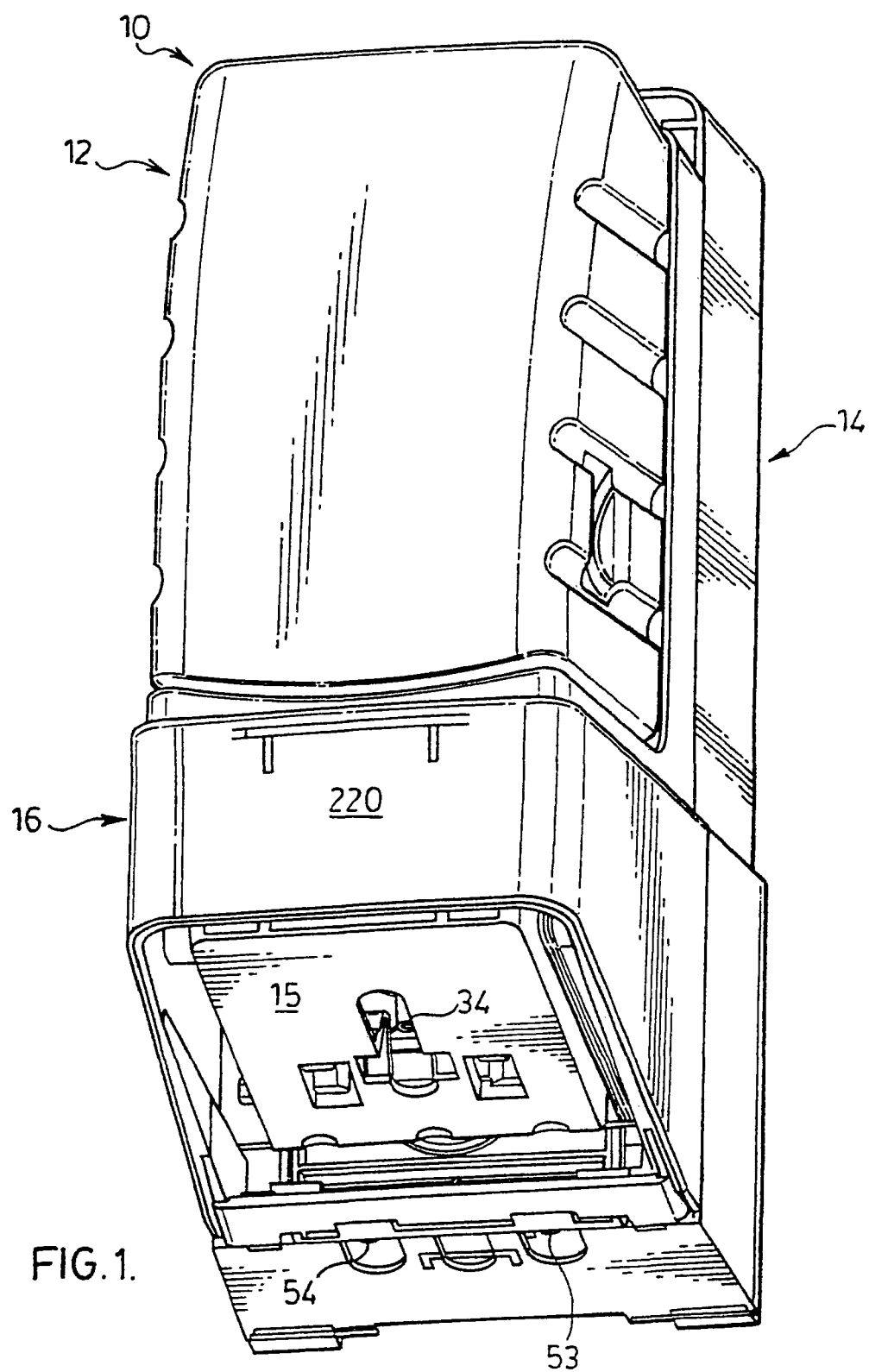
FIG. 1 is a pictorial view of a dispenser assembly in accordance with a first preferred embodiment of the present invention.
Figure 2:
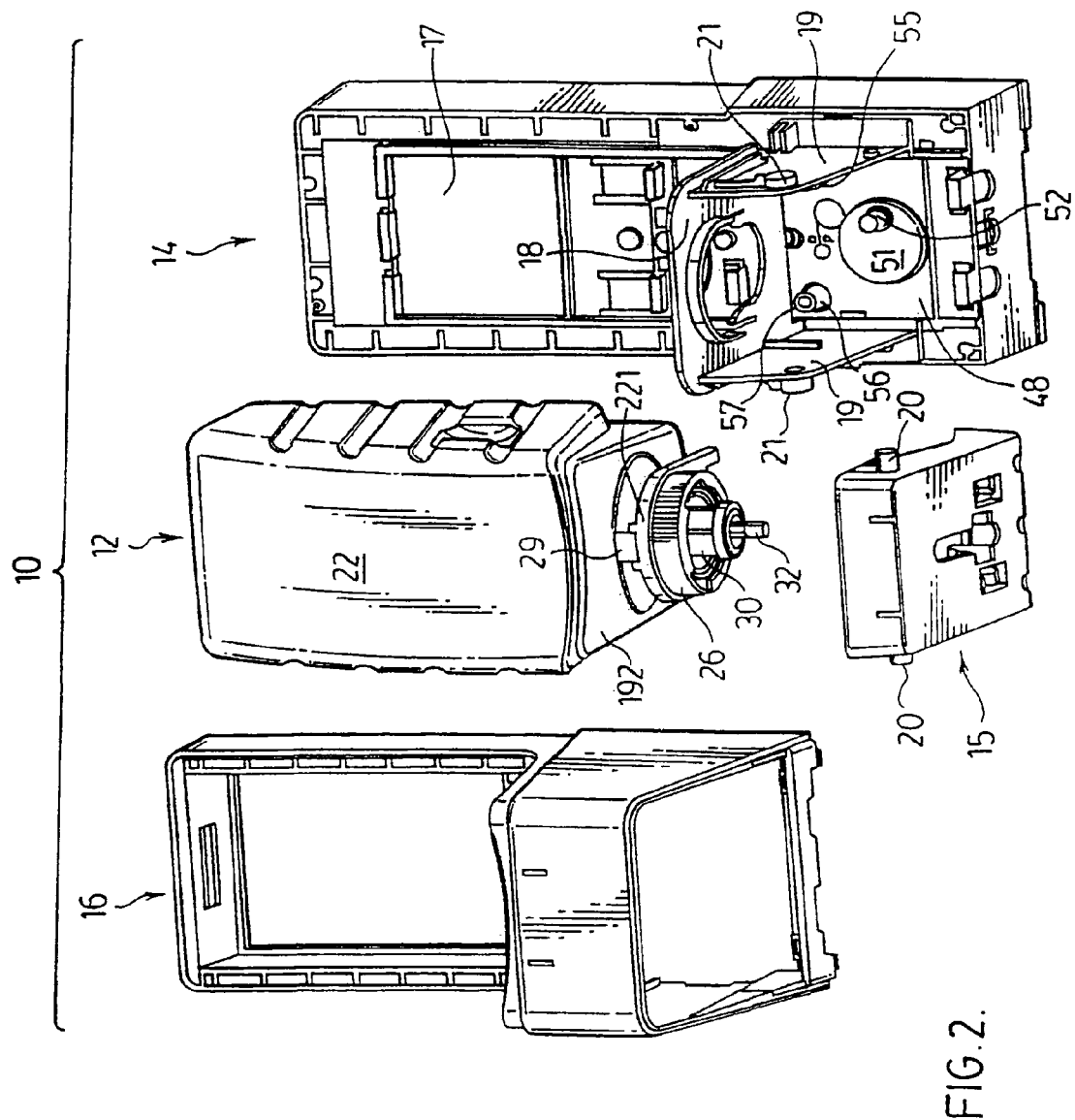
FIG. 2 is a pictorial exploded view of the dispenser assembly shown in FIG. 1.
Figure 3:
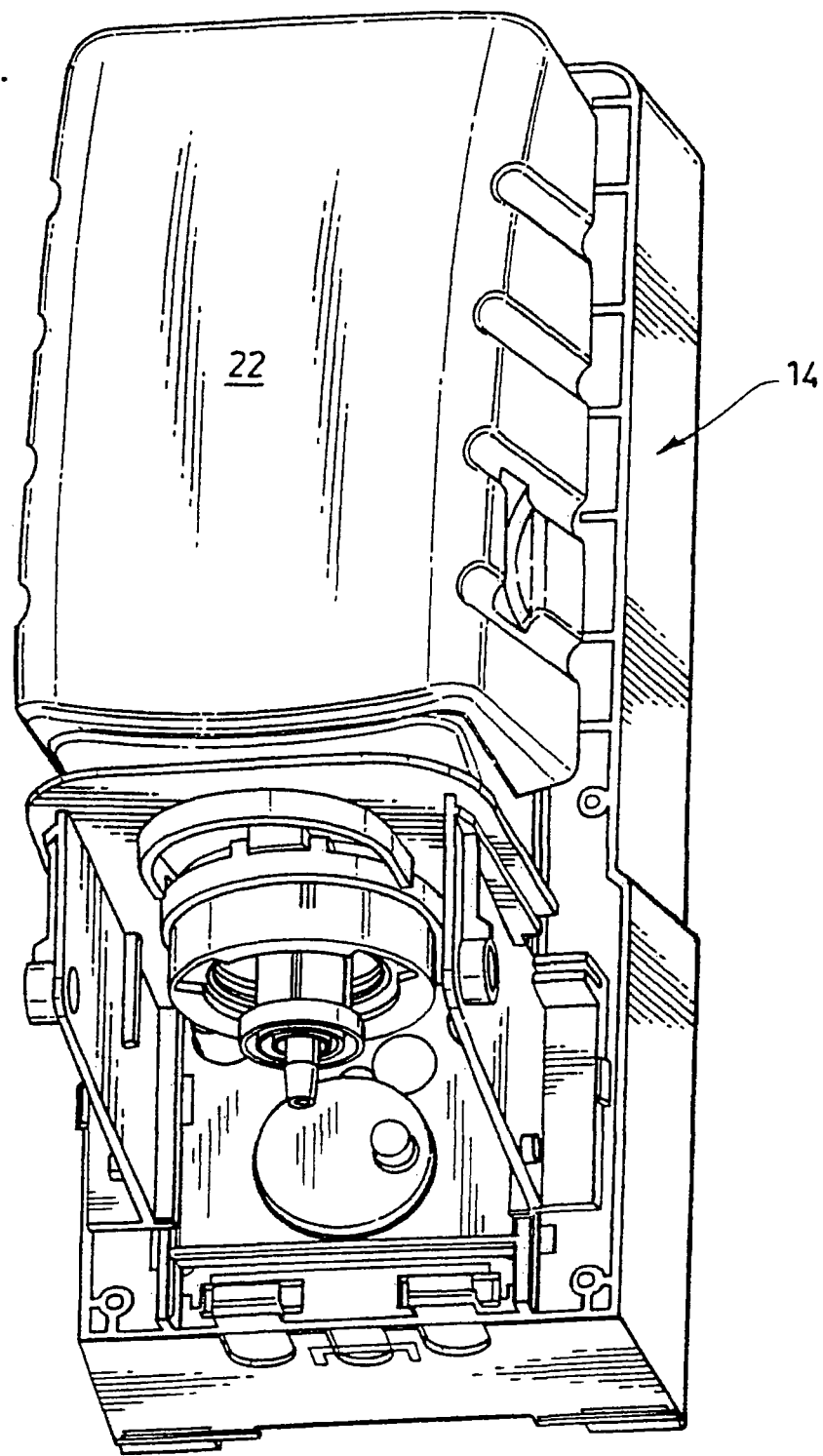
FIG. 3 is a pictorial view showing assembly of the reservoir assembly and backplate assembly shown in FIG. 2.

Reference is made to FIG. 1 which illustrates a dispenser assembly 10 in accordance with a first preferred embodiment of the present invention. The dispenser assembly 10, as best seen in FIG. 2, includes a removable reservoir assembly 12 adapted to be secured to a housing formed by a combination of a backplate assembly 14, a presser member 15 and a shroud 16. The backplate assembly 14 has a generally forwardly directed faceplate 17 from which a horizontally disposed support plate 18 extends forwardly supported by two side plates 19. The presser member 15 is pivotally mounted to the backplate assembly 14 between the two side plates 19 with stub axles 20 received in journaling bores 21 in each of the side plates 19. The housing is completed by the shroud 16 being coupled to the backplate assembly 14 to substantially enclose the support plate 18 and the presser member 15. The reservoir assembly 12 is adapted to removably couple to the assembled housing.

Figure 5:
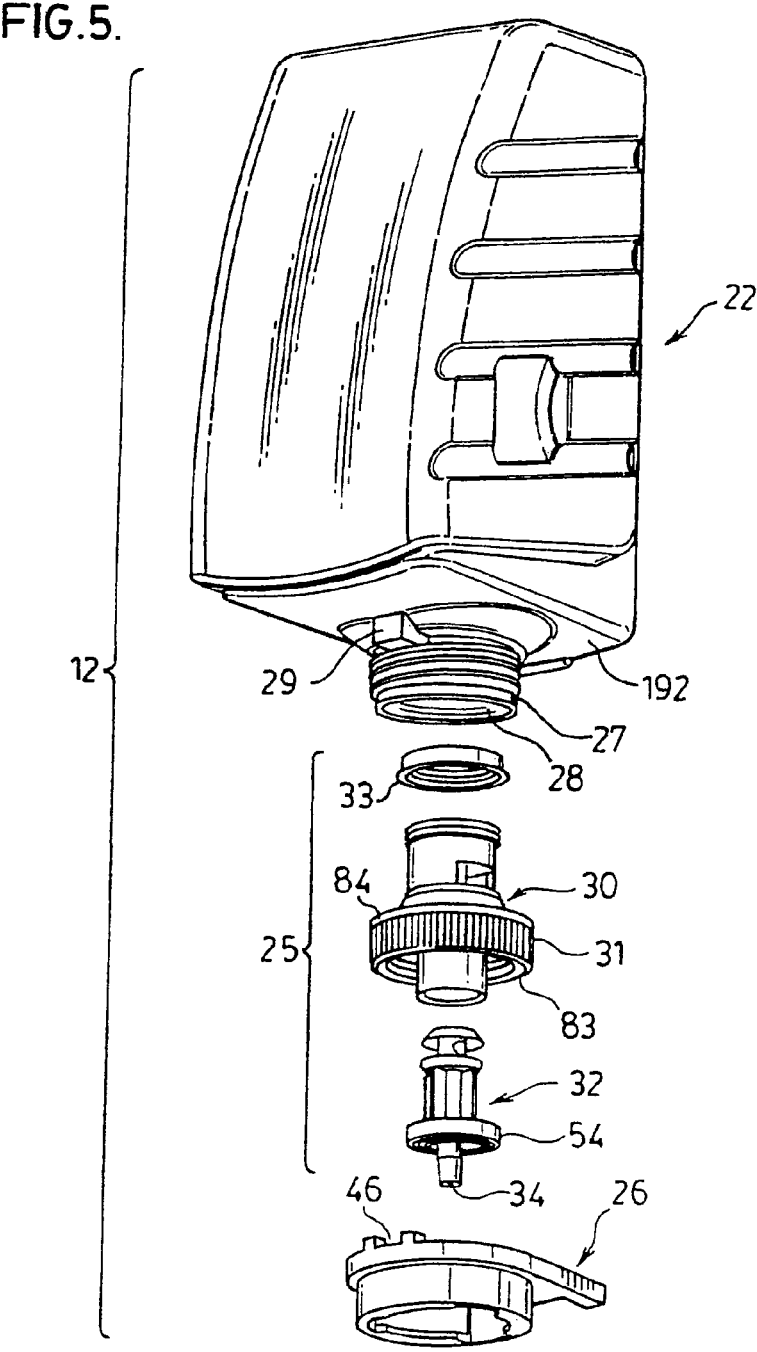
FIG. 5 is an exploded pictorial view of the reservoir assembly shown in FIGS. 2 and 3.

As best seen in FIG. 5, the reservoir assembly 12 comprises a reservoir bottle 22, a pump assembly 25 and a key collar 26. The bottle 22 has a threaded neck 27 about an outlet 28. A locking tab 29 extends forwardly and axially relative to the threaded neck 27 and is of generally rectangular shape in horizontal, axial cross-section having flat parallel side faces and an end face normal thereto. The pump assembly 25 includes a piston chamber-forming member 30 having an outer flange 31 which is internally threaded such that the outer flange 31 may be threadably engaged onto the threaded neck 27. The pump assembly 25 further includes a piston 32 and a valve member 33. The piston 32 is reciprocally movable coaxially within a cylindrical chamber formed within the piston chamber-forming member 30 so as to dispense fluid from inside the bottle 22 out of the outlet 28 internally through the piston 32 and out a discharge opening 34 of the outer end of the piston 32.

Figure 6:
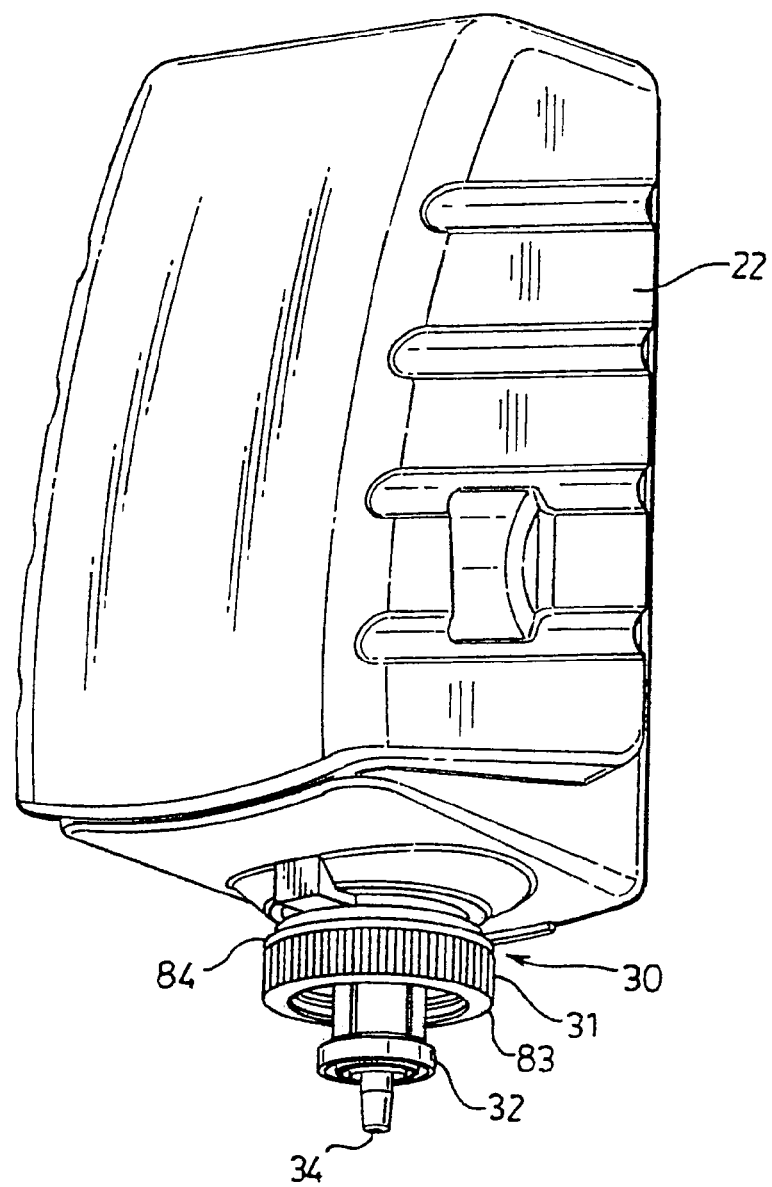
FIG. 6 is a pictorial view showing the assembled bottle, valve member, piston chamber forming member and piston shown in FIG. 5.
Figure 7:
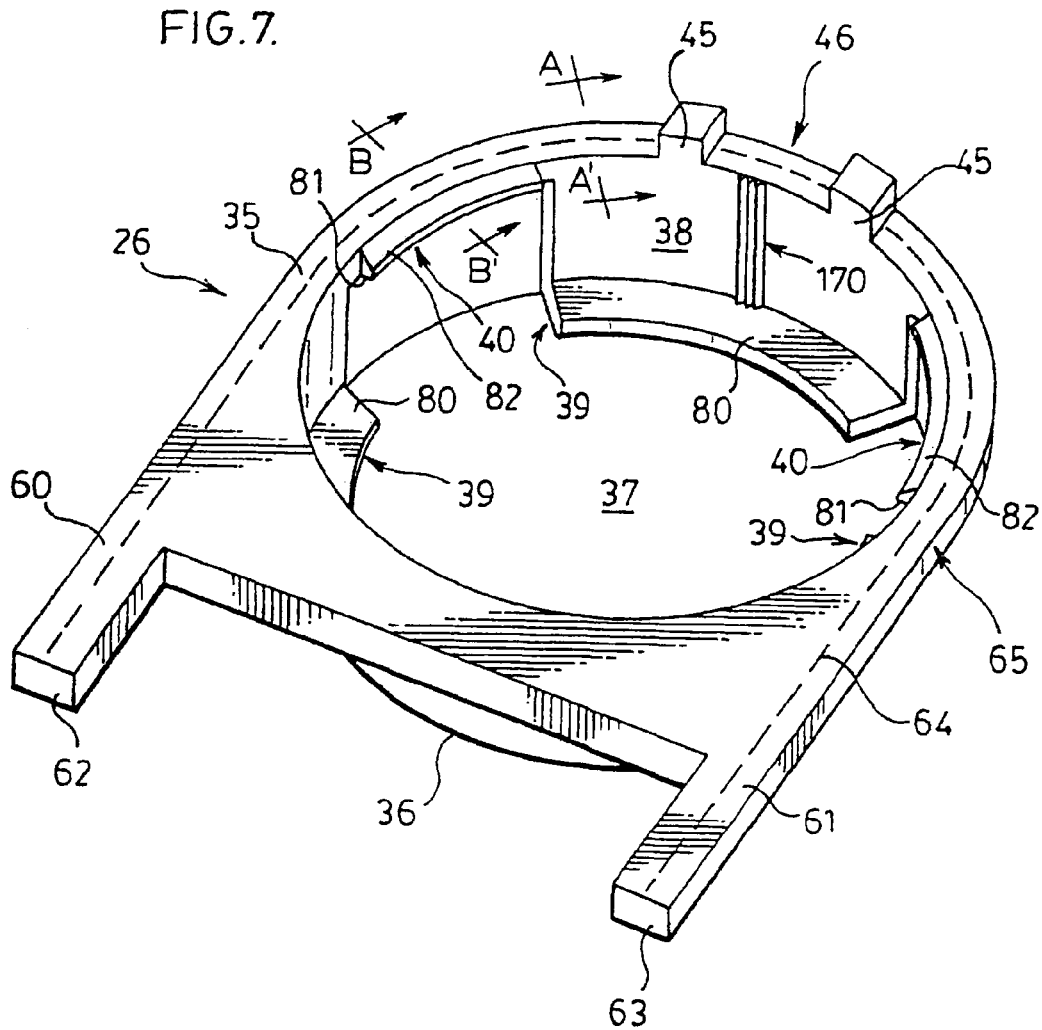
FIG. 7 is a pictorial top rear view of the collar shown in FIG. 5.

The bottle 22 and pump assembly 25 is shown assembled in FIG. 6. To the assembly as shown in FIG. 6, the key collar 26 is applied by sliding the collar 26 axially upwardly such that the collar 26 comes to be engaged in a snap-fit upon the outer flange 31 against removal from the outer flange 31 and with the locking tab 29 engaging in a slotway 46 on the collar 26 so as to prevent rotation of the collar 26 relative to the bottle 22. As seen in FIG. 7, the collar 26 has an axial upper end 35 and an axial lower end 36 with a central, generally cylindrical opening 37 extending therethrough. A generally cylindrical side wall 38 about the opening 37 carries approximate the lower end 36 three radially inwardly extending lower shoulder members 39 presenting stop shoulders 80 directed axially toward the upper end 35. Approximate the upper end 35, the side wall 38 includes three radially inwardly directed upper shoulder members 40. The upper shoulder members 40 have a catch surface 81 directed towards the lower end 36 and a bevelled camming surface 82 directed towards the upper end 35. On sliding of the collar 26 coaxially upwardly onto the outer flange 31, the camming surface 82 of the upper shoulder members 40 engage with an outer lower surface 83 of the outer flange 31 biasing the upper shoulder members 40 radially outwardly to permit the outer flange 31 to move relative the collar 26 axially toward the lower end 36 into the opening 37 of the collar 26. Once an upper end 84 of the outer flange 31 becomes located below the upper shoulder member 40, the upper shoulder member 40 returns to its inherent unbiased position with the catch surface 81 disposed above the upper end 84 of the outer flange 31 radially inwardly therefrom thus locking the outer flange 31 between the stop shoulders 80 of the lower shoulder member 39 and the catch surface 81 of the upper shoulder member 40.

The collar 26 carries on its upper end 35 a pair of upwardly extending lock tabs 45 providing a slotway 46 therebetween. The slotway 46 is sized to closely receive the locking tab 29 of the bottle 22 therebetween. When coupling the collar 26 onto the assembled bottle 22 and pump assembly 25, the slotway 46 is circumferentially aligned with the locking tab 29 on the bottle 22 such that the reservoir assembly 12 when fully assembled as shown in FIG. 2 has the locking tab 29 on the bottle 22 received within the slotway 46 preventing relative rotation of the collar 26 and bottle 12. In the reservoir assembly 12 as shown in FIG. 2, the piston chamber-forming member 30 and the collar 26 are secured to the bottle 22 against removal. That is, the key collar 26 and piston chamber-forming member 30 are preferably secured on the bottle 22 substantially against removal other than by significant breaking or deformation of the bottle 22 or key collar 26.

The extent to which removal or attempted removal of the collar 26 and/or pump assembly 25 is possible or is not possible, or may require destruction of one or more of the bottle 22, key collar 26 or piston chamber-forming member 30 can be selected as desired. For example, at the time of assembly, the bottle 22, piston chamber forming member 30 and collar 26 can be permanently secured together as with glue or by sonic welding.

In a preferred embodiment, the interior side wall 38 of the collar 26 may be knurled with axially extending alternating ribs and slotways only partially shown at 170 in FIG. 7 such that a complementarily knurled outer surface of the outer flange 31 having axially extending alternating ribs and slotways may couple with ribs on the side wall 38 preventing relative rotation of the piston chamber-forming member 30 relative to the collar 26 once the collar is applied.

With the backplate assembly 14, presser member 15 and shroud 16 assembled and, for example, secured to a wall, the assembled reservoir assembly 12 may be coupled thereto by the reservoir assembly 12 moving vertically downwardly relative the backplate assembly 14 with the collar member 26 and pump assembly 25 to pass vertically downwardly through an opening 190 in the plate 18, and the entire reservoir assembly 12 then being urged rearwardly to engage a rear support portion 191 of the plate 18 above the collar 26 and below a lower shoulder 192 on the bottle placing the piston 32 into a position for coupling with or in which it is coupled with the presser member 15. Removal of the reservoir assembly 12 is accomplished by reversed movement forwardly then upwardly.

Figure 4:
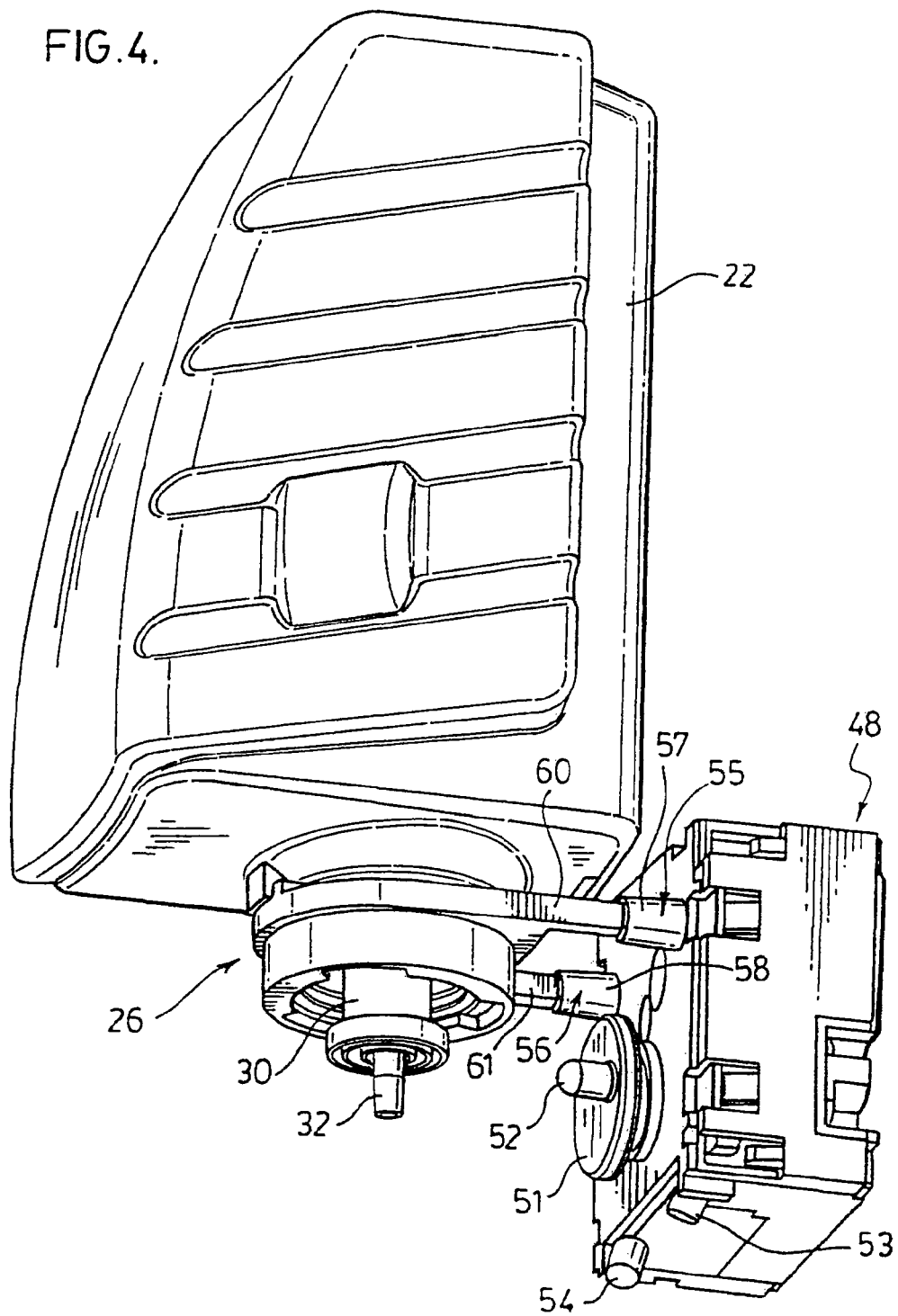
FIG. 4 is a schematic pictorial side view showing the relative positioning of the reservoir assembly and an activation unit in the assembled dispenser of FIGS. 1 and 3.

The backplate assembly 14 includes and carries an activation unit 48 best seen in FIG. 4. The activation unit 48 includes as only schematically shown in FIG. 8, an electric motor 49 which rotates via a series of gears 50, a drive wheel 51 carrying an eccentrically mounted axially extending cam post 52 shown in FIG. 4. The cam post 52 couples to an inner end of the presser member 15 such that in rotation of the drive wheel 51 in one full revolution, the presser member 15 is pivoted about its stub axles 20 downwardly and then upwardly, returning to the same position. The presser member 15 is coupled to the piston 32 by engagement between catch members (not shown) carried by the presser member 15 with an engagement flange 54 on the piston 32. Such catch members and engagement may be similar to that described in U.S. Pat. No. 5,373,970 to Ophardt dated Dec. 20, 1994, the disclosure of which is incorporated herein by reference, which engagement necessarily results on coupling of the reservoir assembly 12 with the backplate assembly 14.

In one cycle of operation, the motor 49 is operated so as to rotate the drive wheel 51 360 degrees and thus move the piston 32 in a single stroke inwardly and outwardly to dispense an allotment of fluid from the bottle 22. The motor 49 is an electric motor and its operation may be controlled by a control mechanism receiving various inputs. The activation unit 48 shown is adapted to be used as a touchless dispenser in which the presence of a user's hand below the presser member 15 underneath the discharge outlet 34 is sensed by a hand sensing system including an electromagnetic radiation emitter 53 located at the bottom front of the activator unit 48 to direct radiation downwardly and forwardly towards the position the user's hand is to be placed and an electromagnetic radiation sensor 54 also located near the bottom front of the activation unit 48 adapted to sense radiation reflected off the user's hand. The hand sensing system, on suitable receipt of reflected radiation from the hand, provides a suitable signal to the control mechanism indicating the presence of the hand, for example, satisfying at least one condition for operation of the motor.

While the use of a hand sensing mechanism involving electromagnetic emitter 53 and sensor 54 is illustrated, many other systems may be provided to provide a primary indication that fluid should be dispensed. For example, these could include providing a simple on/off switch to be manually activated, or a requirement for identification as by use of a fingerprint as disclosed, for example, in U.S. Pat. No. 6,206,238 to Ophardt, issued Mar. 27, 2001.

The activation unit 48 also includes portions of an optical key system towards determining if the reservoir assembly 12 is compatible with the activation unit 48, that is, whether the reservoir assembly 12 meets pre-selected criteria to permit use with the activation unit 48. The activation unit 48 includes an electromagnetic radiation key emitter 55 and an electromagnetic radiation key sensor 56. Each is provided on the front face of the activation unit 48 on an upper portion of the activation unit and directed forwardly. As best seen in FIG. 2, the key emitter 55 includes a generally cylindrical shroud 57 about its lamp and the key sensor 56 includes a similar shroud 58 about its sensor, which shrouds 57 and 58 substantially prevent any transmission of electromagnetic radiation therethrough and effectively serve to directionalize the key emitter 55 and key sensor 56 so as to restrict emissions or receptions of either to light passing through the outer end of the shrouds 57 and 58. As best seen in FIGS. 4 and 7, the collar 26 has two arms 60 and 61 which extend rearwardly from the collar 26 toward each of the key emitter 55 and key sensor 57. The collar 26 provides an electromagnetic radiation waveguide from an end face 62 at the end of arm 60 through the collar 26 to the face 63 at the end of the arm 61 providing an outlet to the waveguide. The waveguide is schematically illustrated in dashed lines as 64 in FIG. 7 as extending in a generally U-shape within a U-shaped rim 65 of material disposed proximate the upper end 35 of the collar 26 about its outer periphery.

Referring to FIG. 4, electromagnetic radiation emitted by the key emitter 55 enters the waveguide 64 via the inlet end face 62 and is conducted via the waveguide 64 through the collar 26 with electromagnetic radiation to exit the waveguide 64 via the outlet end face 63 with the radiation exiting the waveguide via the outlet end face 63 to be sensed by the key sensor 56. The activation unit 48 includes a key control system under which as a prerequisite to dispensing, having regard to the electromagnetic radiation emitted by the key emitter 55, the electromagnetic radiation sensed by the key sensor 56 is to comply with one or more pre-selected parameters. As by way of a non-limiting example, the key emitter 55 may emit electromagnetic radiation within a selected range of wave lengths and, in the absence of the key sensor 56 sensing electromagnetic radiation within the range of emitted radiation, the motor 49 may not be permitted to operate. Thus, in the simplest case, should a non-compliant reservoir assembly 12 which has the bottle 22, pump assembly 25 but not the collar 26, be coupled to the backplate assembly 14 and would not have a waveguide, the radiation of a selected wavelength emitted by key emitter 55 would not be directed to or sensed by the key sensor 56 and the control mechanism of the activation unit would not permit dispensing.

In the preferred embodiment, the collar 26 may preferably be formed as by injection moulding from a plastic material which permits transmission of electromagnetic radiation therethrough. As is known to a person skilled in the art, various plastic materials such as polycarbonate plastics can be used which provide a resultant product having electromagnetic radiation transmitting properties. Radiation which may enter the light transmitting collar 26 as by being directed normal to the inlet end face 62 will, to some extent, be reflected internally by reason of such light impinging at relatively low angles on the external surfaces of the collar forming effectively the sides of the wave guide. A portion of the radiation directed into the collar 26 is passed through the collar 26 as around the U-shaped external rim 65 with some proportion of the radiation to be directed substantially perpendicular to the exit end face 63 to exit the waveguide and be sensed by the key sensor 56.

The collar 26 may be formed as unitary element all from the same radiation transmitting properties or may be formed from a number of different materials. For example, to increase internal reflection, exterior surfaces of the collar 26 especially about the rim 65 could be coated with a reflective material other than on the inlet end face 62 and the outlet end face 63. The collar 26 may be formed such that merely a U-shaped portion of the collar, for example, substantially corresponding to the U-shaped rim 65 may comprise light transmitting materials and the remainder of the collar may be formed of other plastic materials.

The collar 26 may be formed to incorporate therein one or more pre-existing optical fibres, for example, disposed to extend internally within the U-shaped rim as with an inlet end of an optical fibre to be presented at the inlet end face 62 and an outlet end of the optical fibre to be presented at an outlet end face 63.

Reference is made to FIG. 9 which shows a second embodiment of a collar 26 in accordance with the present invention which will have, when assembled, an identical appearance to the collar 26 shown in FIG. 7. The collar 26 as shown in FIG. 9 is formed from three pieces, namely, a base 66, a top 67 and an optical fibre member 68. The base 66 and top 67 are injection moulded from plastic and are adapted to snap-fit together against separation. The base 66 has an upwardly directed U-shaped half channel 69 formed therein and the top 67 has a similar downwardly directed U-shaped half channel 96. The optical fibre 68 is positioned sandwiched between the base 66 and top 77 received between the half channel member 69 carried on the base and the half channel member 96 carried on the top. The optical fibre 68 has a first end 97 open to the end face 62 of the arm 60 and a second end 98 open to the end face 63 of the arm 61 such that the optical fibre member 68 provides the waveguide through the collar 26. In the assembled collar 26, the optical fibre member 68 is secured within the collar 26 against removal. The optical fibre member 68 may comprise a short length of a conventional optical fibre or may preferably comprise an extrusion of plastic material having appropriate light transmitting properties such as a cylindrical extrusion of flexible polycarbonate or other plastic.

The channelway which is formed by combination of the half channels 69 and 96 may preferably have adjacent each end face 62 and 63 a port portion of restricted cross-sectional closely sized to tightly hold each end of the optical fibre member 68 therein and with interior portions of the channelway interior from the port portions of increased diameter to facilitate easy insertion of interior portions of the optical fibre members 68.

Reference is made to FIG. 10 which illustrates a third embodiment of a collar 26. As seen in FIG. 10, at the rear end of the collar 26, an internal compartment 102 is provided closed at its rear by a rear wall 110 having four port portions 111, 112, 113 and 114 therethrough. Two optical fibre members 105 and 106 are shown. Each optical fibre has a first end secured in one of the port portions and a second end secured in another of the port portions such that each optical fibre member provides a respective waveguide from one port portion to a second port portion. Opposite each of the port portions, four elements 211, 212, 213 and 214 are schematically shown, each of which is intended to schematically illustrate either a key emitter or a key sensor to be carried on an activation unit such as shown, for example, in FIG. 4 suitably located in front of a respective of the port portions. Of the four elements, preferably, at least one comprises an emitter and at least one comprises a sensor. In one preferred embodiment, each of these elements may each comprise either an emitter or a sensor or, preferably, both. Preferably, each of the elements 211, 212, 213 and 214 are carried on a computerized control circuit permitting selected operation of each of the elements either as an emitter or a sensor or to be inoperative. Such an activation unit can be electronically keyed to adopt a particular configuration of sensors and emitters.

In the embodiment illustrated in FIG. 10, two optical fibre members 105 and 106 are shown. It is to be appreciated that merely one optical fibre member need to be provided. For example, a single optical fibre member could be provided to connect any two of the port portions. For example, an optical fibre could have one end connected to the port portion 111 and a second end connected to any one of the port portions 112, 113 or 114. In a simple configuration, the element 121 could be programmed to be a key emitter and a selected one of the elements 212, 213 and 214 could be selected to be a sensor having regard to the corresponding port portion to which the end of a single optical fibre member may be connected. The collar member thus, by suitable positioning of the optical fibre member, may be configured to provide a waveguide at a matching location. If desired, a second optical fibre member could be used to couple the remaining two of the port portions which are not assumed by the first optical fibre member as seen in FIG. 10.

Each of the optical fibres which is used may have different radiation transmission characteristics. For example, one of the optical fibre members may be tinted blue such that that optical fibre serves as a filter to prevent passage therethrough of light which is not within a range of corresponding blue wavelengths. Similarly, the other optical fibre could be tinted red and yellow so as to act as filters merely permitting the passage of red or yellow wavelength light.

Reference is made to FIG. 11 which illustrates a fourth embodiment of a wave guide in accordance with the present invention similar to that shown in FIG. 10, however, incorporating three different optical fibres 105, 106 and 107. Additionally, each of the port portions 111, 112, 113 and 114 are each shown as having three opening therethrough, each of which opening is adapted to receive the end of one optical fibre member. Thus, up to three optical fibre members can be received in each port portion. In the particular configuration shown in FIG. 11, a first end of each of the three optical fibres is connected to the port portion 111, however, merely one end of a different one of the three optical fibres is connected to each of the ports 112, 113 and 114. In the embodiment illustrated in FIG. 11 as one preferred non-limiting example, the optical fibre 105 preferably is tinted blue so as to act as a filter and prevent the passage of light other than of corresponding blue wavelength light therethrough. The optical fibre 106 is tinted red and acts as a filter to prevent the passage of light other than corresponding red wavelength light therethrough. The optical fibre 107 is tinted yellow and acts as a filter to prevent the passage of light other than corresponding yellow wavelength light therethrough. The element 211 may be adapted to selectively emit light containing all of blue, red and yellow light or merely one or more of blue, red or yellow light at different times and each of the sensors 212, 213 and 217 will look at an appropriate time for light, the absence of light of any wavelength or, alternatively, light at a selected blue, red and/or yellow wavelength.

Figure 15:
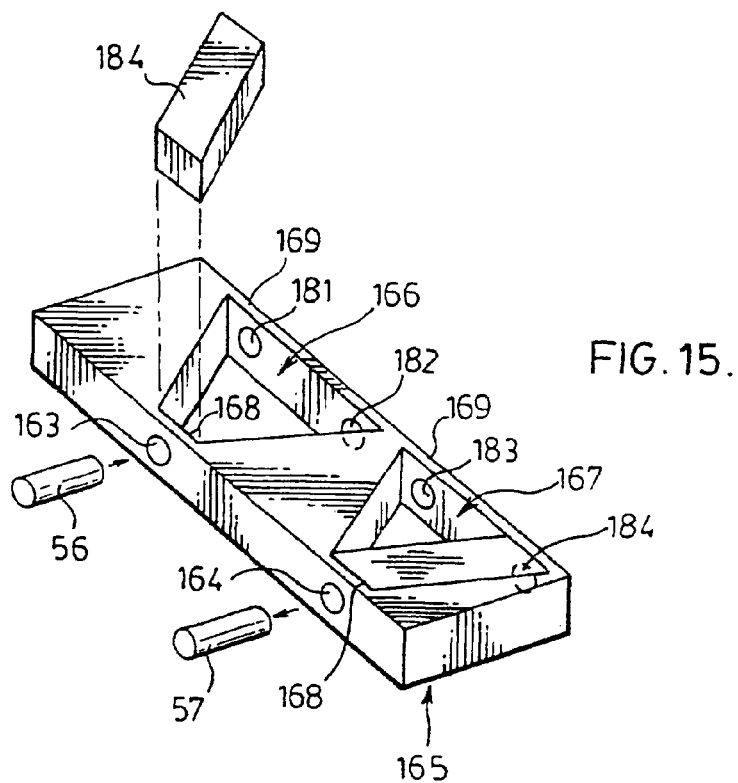
FIG. 15 is a schematic pictorial view of a selective optical coupling device in accordance with the present invention.

Reference is made to FIG. 12 which illustrates a fifth embodiment of a collar member 26 having similarities to that illustrated in FIG. 10, however, in which the optical fibre members have been removed and are to be replaced by one of the three waveguide inserts shown as 171, 172 and 173 in schematic exploded perspective in FIG. 15. Each of the waveguide inserts is preferably injection moulded from a light transmitting material such as polycarbonate. Insert 171 is adapted to provide light transmission from the portal portion 111 to the portal portion 114. An insert 172 is adapted to be inserted as shown to provide communication between portal 111 and portal 113 or if inverted 180 degrees to provide communication between portal 112 and portal 114. Insert 173 is adapted to provide communication between portals 112 and 113. By the suitable selection of a relatively simple injection moulded plastic insert 171, 172 or 173, the collar member 26 may be configured to have a desired waveguide therein. Each of the inserts may be provided to have different radiation transmission properties and may, for example, act as a colour filter. Each insert 171, 172 and 173 is sized to closely fit inside the compartment 102 with side locating tabs 174 provided to extend the side-to-side dimension of inserts 172 and 173. Each insert has two faces 176 and 177 to serve as an inlet/outlet to its waveguide relative its respective portals. Curved portions 178 and 179 of the wall of the insets opposite the faces 176 and 177 assist in directing radiation internally from one face to the other.

Figure 13:
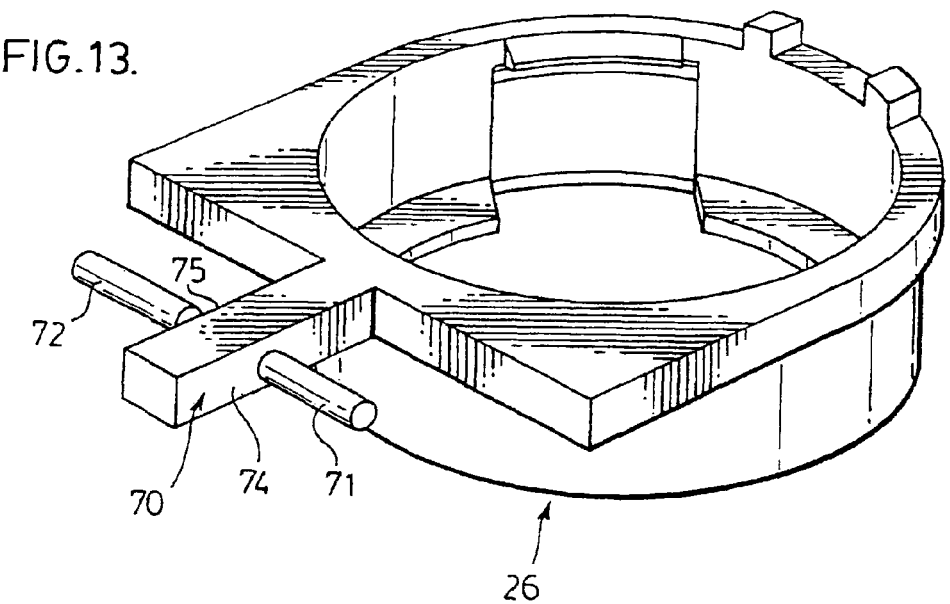
FIG. 13 is a schematic pictorial view of a sixth embodiment of a collar also schematically showing a key emitter and key sensor to be carried on a backplate assembly.

Reference is made to FIG. 13 which schematically illustrates a sixth embodiment of the collar and key sensing system in accordance with the present invention. As seen in FIG. 13, the collar 26 is identical to the collar in the first embodiment of FIG. 7 with the exception that the arms 60 and 61 are removed and a key member 70 is provided to extend rearwardly. The actuation unit 48 is modified such that a key emitter 71 is located to one side of the key member 70 directing radiation sideways through the key member 70 and a key sensor 72 is on the other side of the key member 70 directed sideways. In this manner, the key emitter 71 directs radiation into an inlet face 74 on one side of the key member 70 and the key sensor 72 senses radiation passing outwardly through an outlet face 75 on the other side of the key member 70. The key member 70 preferably provides a waveguide for transmission of electromagnetic radiation. As one non-limiting example, the waveguide may include a waveguide which acts like a filter which substantially prevents any transmission of radiation therethrough of light of a first certain characteristic or wavelength yet lets light of a second characteristic or wavelength pass through, and the key sensor 72 at the time light of both the first and second certain characteristic or wavelengths is emitted by the key emitter 71 looks for the absence of light of the first characteristic or wavelength and the presence of light of the second characteristic or wavelength.

With the key member 70 located in a vertical slotway between the key emitter 71 and the key sensor 72, their engagement can prevent relative rotation of the reservoir assembly 12 relative the backplate assembly 14.

While the embodiment illustrated in FIG. 13 shows a collar merely with the key members, it is to be appreciated that a modified collar could be provided in having both the arms 64 and 65 providing a first waveguide and the key block providing a second guide and that two separate key emitters may be provided and two separate key sensors may be provided.

Figure 14:
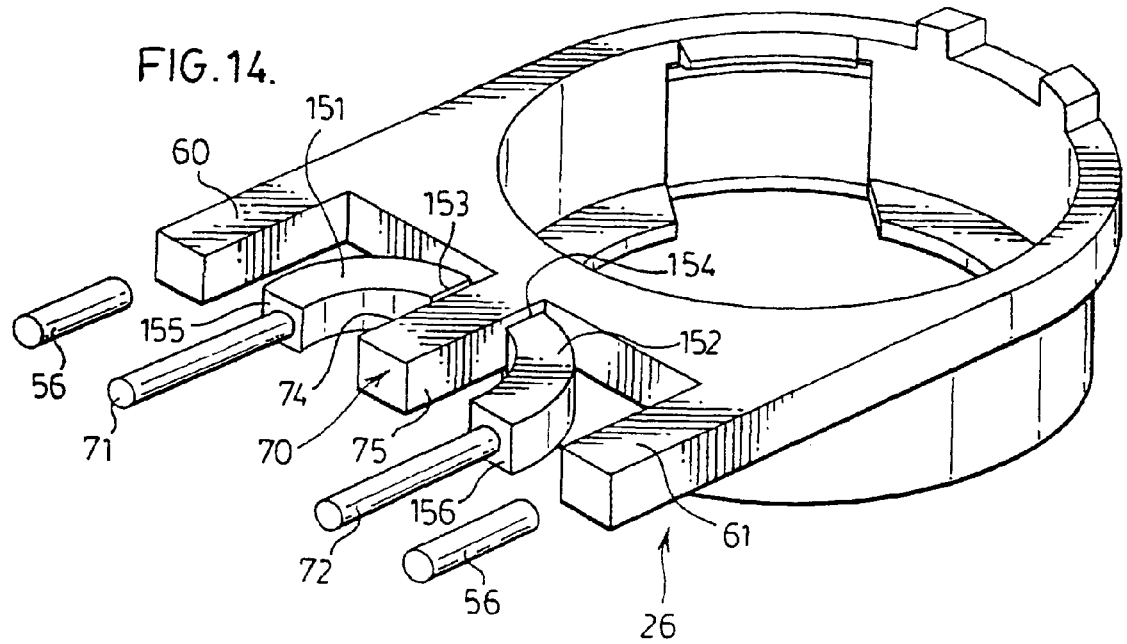
FIG. 14 is a schematic pictorial view of a seventh embodiment of a collar also schematically illustrating four key emitters/key sensors to be carried on the backplate assembly.

Reference is made to FIG. 14 which illustrates a seventh embodiment of a key member in accordance with the present invention which has features similar to those shown in FIG. 7 and in FIG. 13. In FIG. 14, a central key member 70 is provided serving as a waveguide for passage of radiation laterally therethrough. On either side of the key member 70, there are provided a pair of waveguide extensions 151 and 152 adapted to be securely carried on the backplate assembly. Each waveguide extension includes an outer face 153 or 154 directed laterally towards a respective face 74 or 75 of the key member 70 and an inner end 155 or 156 directed rearwardly and adapted for optical coupling with a key emitter/sensor element 71 or 72 also carried on the backplate assembly. As in the embodiment of FIG. 7, the collar 26 includes at the end of each arm 60 and 61, end faces 62 and 63 served to be optically coupled with two key emitters/sensors 56 and 57 carried on the activation unit.

In the embodiment illustrated in FIG. 13, a portion of the waveguide is provided as the waveguide extensions 151 and 152 on the activation unit and a portion of the waveguide is provided as the key member 40 on the collar member 26.

Reference is made to FIG. 15 which illustrates a selective optical coupling mechanism illustrating a pair of key emitter or sensor elements 56 and 57 disposed opposite to optical first windows 163, 164 carried in a coupling unit 165. The coupling unit 165 is a generally rectangular shaped member with a pair of cavities 166, 167 having a narrow end 168 open to the first windows 163, 164 and a wide end 169 open to second windows 181, 182, 183 with two for each of the cavities. A waveguide member 184 having a generally parallelogram shape is adapted to be received within either cavity 166 or 167 in a position which connects a first window to one of the second windows. The waveguide member 184 can be rotated 180 degrees and placed in a cavity so as to provide a waveguide between a first window at the first end and a different other of the second window at the second end. Such an arrangement can be provided either in a cavity in the collar member 26 or in a portion of a cavity on the activation unit and thus can form another method for mechanically selecting a relative path of a portion of the waveguide either carried by the collar 26 or the activation member 48.

It is to be appreciated that different waveguide members 184 may have different properties such as different abilities to transmit, filter, block or polarize electromagnetic radiation passed therethrough. For example, a plurality of such members could be provided of different tinted colours, blue, red, yellow, green and the like and provide simple members which can be readily manually inserted to a customized activation member or a collar member for a particular desired configuration.

In accordance with the present invention, the electromagnetic radiation may be selected having regard to pre-selected parameters. These parameters may include radiation within one or more ranges of wavelengths, electromagnetic radiation within one or more ranges of intensity, polarized electromagnetic radiation, and electromagnetic radiation within one or more ranges of duration and at one or more different points in time.

The waveguide which is provided may have electromagnetic radiation transmitted properties selected from a plurality of properties and including the ability to transmit one or more ranges of wavelengths and or the ability to block one or more ranges of wavelengths, the ability to restrict the intensity of electromagnetic radiation which can be transmitted through the waveguide, preferably, as a function of most of the waveguide. The transmission properties may restrict the transmission of radiation having a first range of wavelengths yet permit transmission of radiation having a range of second wavelengths.

Figure 16:
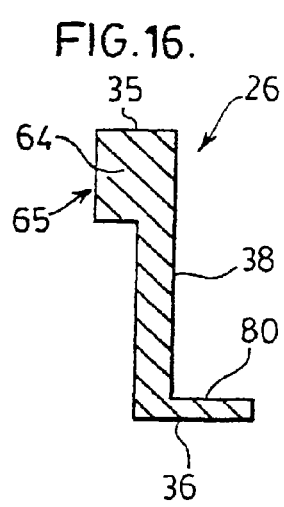
FIG. 16 is a radial cross-section through one side of the wall of the collar shown in FIG. 7 along section line A-A'.
Figure 17:
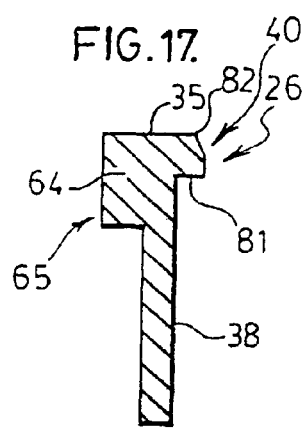
FIG. 17 is a cross-section similar to that shown in FIG. 16, however, along section line B-B' in FIG. 7.

Reference is made to FIGS. 16 and 17 which illustrate cross-sections through the collar 26 shown in FIG. 7 along section lines A and B, respectively, in axially extending planes which extend radially from a center through the central opening 37. In each of FIGS. 16 and 17, the radially extending rim 65 is shown as rectangular in cross-section containing and effectively forming throughout the inner rectangular cross-sectional area of the rim 65 the waveguide 64.

Figure 18:
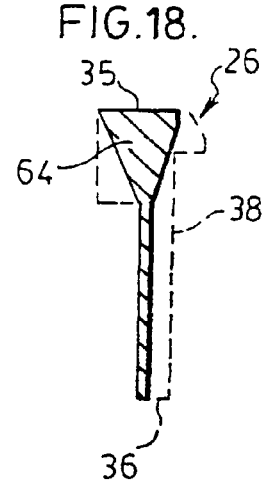
FIG. 18 is a schematic cross-section similar to that shown in FIG. 16 or 17, however, of a reduced cross-sectional area frangible portion of the wall of the collar.

FIG. 18 illustrates a schematic cross-sectional similar to that shown in FIGS. 16 and 17, however, at a cross-sectional point in between section lines A and B at a point in between a circumferential end of the shoulder member 40 and before the stop shoulder 80 is provided. The cross-sectional area shown in FIG. 18 superimposes a dashed line showing the outline of the cross-section of FIG. 17. The cross-section in FIG. 18 is of a considerably reduced cross-sectional area compared to that shown in either FIG. 16 or 17. That circumferential portion of the collar 26 represented by the cross-section of FIG. 18 comprises, in effect, a frangible portion. Insofar as a person may attempt to remove the collar 26 from engagement on the reservoir assembly, circumferentially applied forces on being transmitted to the reduced cross-sectional segment shown in FIG. 18 will result in breaking and rupture of the collar through this reduced cross-sectional area, thus, breaking and rupturing the wave guide 64. In FIG. 18, the cross-sectional area of the waveguide 64 is shown to be a reduced sized triangular portion compared to the rectangular area shown in FIGS. 16 and 17. The cross-sectional area of the waveguide through the frangible portion is selected to be adequate to permit radiation to pass through the waveguide in normal use. When the collar member 26 may be broken by circumferential severing through the reduced cross-sectional area portion of FIG. 18, the waveguide 64 will be broken with the broken waveguide preferably preventing or impairing the ability of the waveguide to transfer radiation through the break point. In the embodiment illustrated in FIG. 18, it is expected that initial fracture may occur in the lower portion below the triangular waveguide which may assist in splitting through the waveguide from the lower apex of the triangular waveguide upwardly to a wider portion at the top.

Many modifications and variations of frangible waveguides or waveguides which will break if a collar is attempted to be physically removed can be envisioned. For example, in the context of a waveguide which incorporates a pre-existing optical fibre member such as shown in FIG. 9, a mechanism can be structured to sever the optical fibre member as a requirement of removal of the collar.

Figure 19:
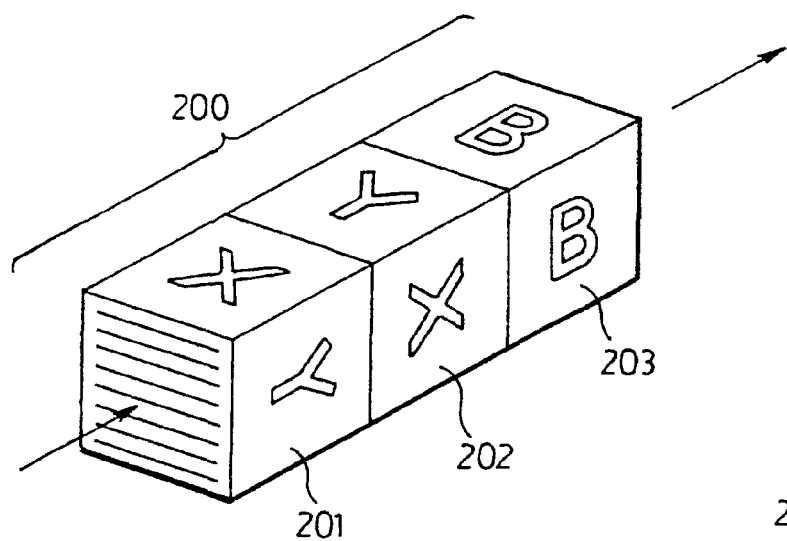
FIG. 19 is a schematic pictorial representation of a section of a waveguide comprised of three modular waveguide members.
Figure 20:
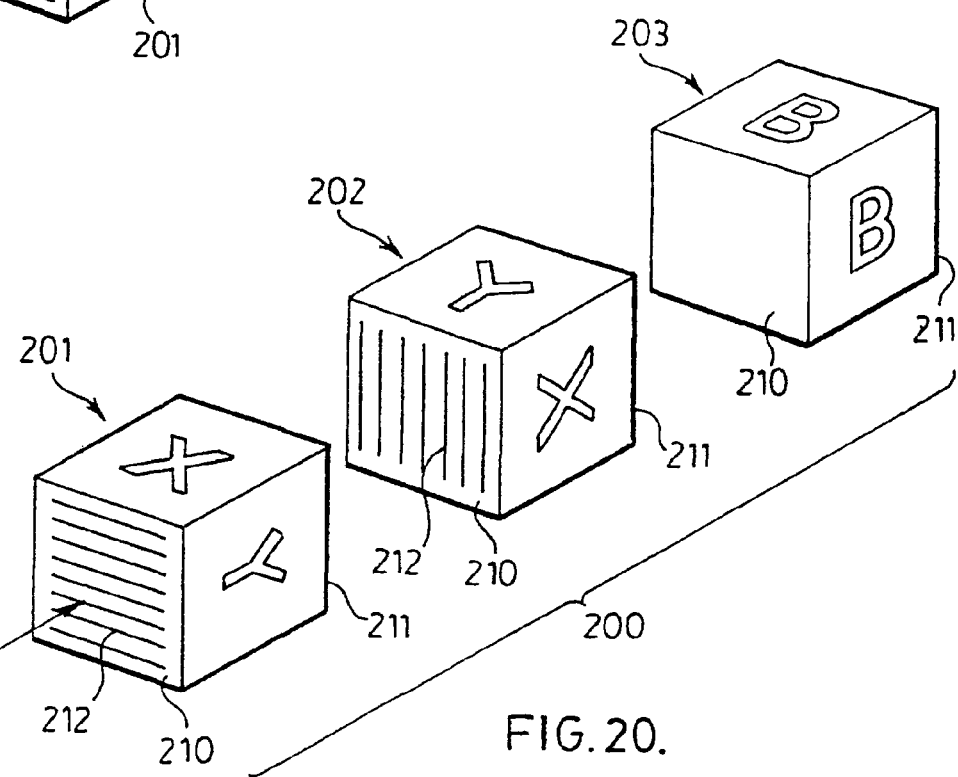
FIG. 20 is a schematic exploded pictorial view of the waveguide members of FIG. 19.

Reference is made to FIG. 19 which illustrates a schematic pictorial view of a portion of a waveguide 200 formed from three modular waveguide elements 201, 202 and 203. The waveguide element 201 has a first end face 210 and a second end face 211. The member 201 is a constant cross-sectional shape between the end faces. As schematically illustrated by the parallel lines 212, the guide wave member 201 is polarized so as to restrict light passing between the end faces 210 and 211 to being light which propagates parallel to each other in a certain direction. Waveguide member 212 is identical to waveguide member 210, however, is shown in the embodiment as rotated 90 degrees such that it has the schematic parallel lines 212 of waveguide member 202 is perpendicular to the parallel lines 212 on the waveguide member 201. When arranged in this configuration as shown in FIGS. 19 and 20, the waveguide members 201 and 202 effectively block all light transmission therethrough. Waveguide member 203 is shown as a similarly sized waveguide member which may be selected, for example, to be of a particular colour such as the colour blue. The waveguide members 201, 202 and 203 are each modular members which can be replaced or substituted by other members and thus by simple insertion or removal of different modular members provide for different light transmission characteristics of the resultant waveguide. While the waveguide member 203 is shown as being of a particular colour, it is to be appreciated that each of the waveguides 201 and 202 could be provided as modular elements in a plurality of different colours.

Each of the waveguide members 201, 202 and 203 may be stacked immediately adjacent to each other and, for example, to form a central portion of the replaceable waveguide 184 is shown in FIG. 15. It is to be appreciated that in a manner similar to that shown in FIG. 15, a coupling unit similar to 165 could be provided as with a rectangular recess so as to receive each of the three waveguide members 201, 202 and 203 aligned in a row.

One or more of the waveguide members 201, 202 and 203 may be provided as part of a waveguide on the activation unit and any one or more of the waveguide members 201, 202 or 203 or other similar modular waveguide members may be provided on the collar 26. Further, insofar as the waveguide may have different abilities to polarize light passing therethrough, such a waveguide may be used with either an emitter of polarized light or a sensor sensitive to polarized light.

The use of a plurality of different modular guide members such as 201, 202 and 203 to form the waveguide can provide a simplistic mechanism for customizing the waveguide to have selected key features.

In the preferred embodiments illustrated, for example, in FIG. 4, in combination with a suitable waveguide, there is shown both a key emitter 55 and a key sensor 56. It is not necessary in accordance with the present invention that a key emitter 55 be provided. The electromagnetic radiation to pass through the waveguide and be sensed by the key sensor may originate from an external light source such as, for example, the ambient light in any environment, for example, ambient light from lighting within a washroom or natural sunlight. For example, as seen in FIG. 1, the front portion of the shroud 16 indicated as 220 in FIG. 1 could be provided to transmit electromagnetic radiation therethrough which may impinge on a frontmost surface 221 of the collar 26 as shown in FIG. 2 which could be flattened and directed forwardly so as to provide an entry point for light into the waveguide contained in the collar. In this case, merely the radiation sensor 56 need be provided.

Alternatively, entrance for ambient air to the waveguide could be provided at the sides or bottom of the waveguide through a suitable face in the waveguide disposed to permit entry into the waveguide of electromagnetic radiation from an external source. As another example, in the context of FIG. 2, the bottle and fluid within the bottle 22 may be provided to be electromagnetic radiation transmitting with light to pass downwardly through the bottle 22 through the lower shoulder 192 and down onto an upwardly directed surface of the collar 26. The waveguide may then comprise the walls and shoulder of the bottle 22, the fluid in the bottle as well as the collar 26. Suitable selection of the radiation transmission properties therefore of the bottle walls and bottom and the fluid to be dispensed can be utilized in establishing pre-selected keying features.

Insofar as light may pass downwardly through the shoulder 192 in the bottle 22 to the collar 26, it would be possible to incorporate a component of the pump assembly such as a radially outwardly extending flange of the piston chamber-forming member 30 as being part of the waveguide and in such an event, the waveguide might incorporate a path downwardly through the shoulder 192 of the bottle past or through the support plate 18 and axially through the outer flange 31 of the piston chamber-forming member 30 as to a portion of the waveguide as to a sensor disposed axially below the outer flange 31. Preferably, the waveguide would be at least partially through the collar 26 at some portion such as axially through the collar or radially outwardly through a portion of the collar 26 which would serve as a waveguide to couple light from the outer flange 31 to a sensor carried on the activation unit 12.

Rather than use ambient light to pass through portions of the bottle and/or fluid in the bottle, a separate emitter could be provided as, for example, to pass radiation downwardly or sideways or otherwise which would pass through a portion of the bottle and/or the fluid in the bottle to be received by a sensor.

As to the nature of electromagnetic radiation to be used, many conventionally available sensors and/or emitters are available for use in emitting and sensing electromagnetic radiation in the visible light spectrum. This is not necessary, however, and electromagnetic radiation outside the visible spectrum may be used. This could be advantageous as, for example, to mask the nature of any modular components which may comprise a portion of a waveguide. For example, whether or not any modular waveguide element may appear to have a visible colour such as blue, red or yellow, insofar as it is adapted for transmission of non-visible electromagnetic radiation, then the presence or absence of colour in the modular unit could assist in fooling an imitator.

Figure 21:
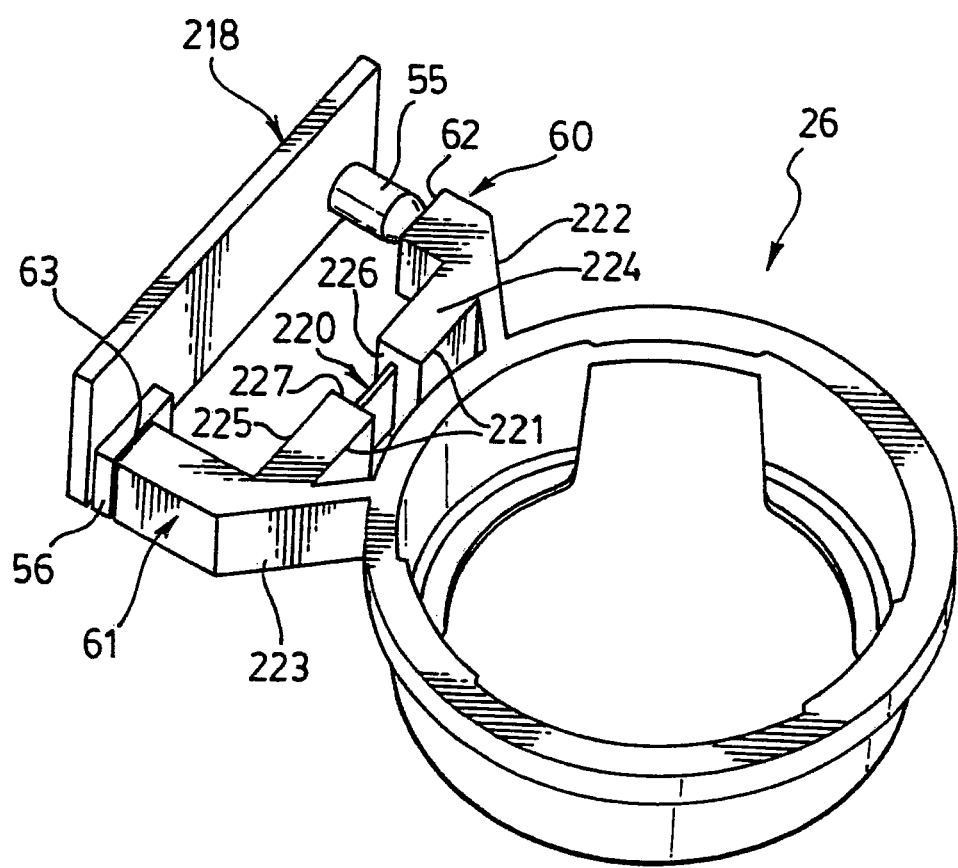
FIG. 21 shows a seventh embodiment of a collar similar to that shown in FIG. 7 and together with a board carrying a sensor and an emitter.

Reference is made to FIG. 21 showing a key collar 26 similar to that shown in FIG. 7 but for a few differences. Firstly, the lock tabs 45 of the collar 26 in FIG. 7 have been removed for simplicity in illustration. Providing such locking tabs are preferred, however, the locking tabs need not as in the context of FIG. 7 be provided on the front of the collar facing outwardly but could be provided at other locations as on the rear of the collar diametric to the position shown, for example, in FIG. 7. Secondly, as seen in FIG. 21, bridging between the arm 60 and the arm 61, there is provided a thin frangible member 220.

FIG. 21 shows in addition to the key collar 26, a separate board 218 which carries a key emitter 55 and a key sensor 56. Arm 60 includes an end face 62 normal to the key emitter 66 which face 62 is engaged by the key emitter with the end face 62 generally normal to the key emitter 55. Arm 61 includes an end face 63 which is shown as being normal to the key sensor 56 and is engaged by the key sensor. The arm 60 includes a reflecting outer side shoulder surface 222 disposed at 45 degrees to the end face 62. Arm 61 similarly includes a reflecting outer side shoulder surface 223 at 45 degrees to the end face 63. The arms 60 and 61 are joined by a bridge member 221 formed by a projection 224, the frangible member 220 and a projection 225. The arm 60 has the projection 224 extending laterally inwardly to an end face 226 disposed normal to the end face 62. The arm 61 similarly has the projection 225 extending laterally inwardly to an end face 227 normal to the end face 63 and spaced from and opposed from the end face 226. The frangible member 220 extends between the end face 226 and the end face 227 normal to each end face. The frangible member 220 has a cross-sectional area significantly less than the cross-sectional area of either of the projection 224 or the projection 225 measured parallel the end faces 226 and 227.

The frangible member 220 is preferably formed integrally with the key collar 26 as by injection moulding from plastic.

Figure 22:
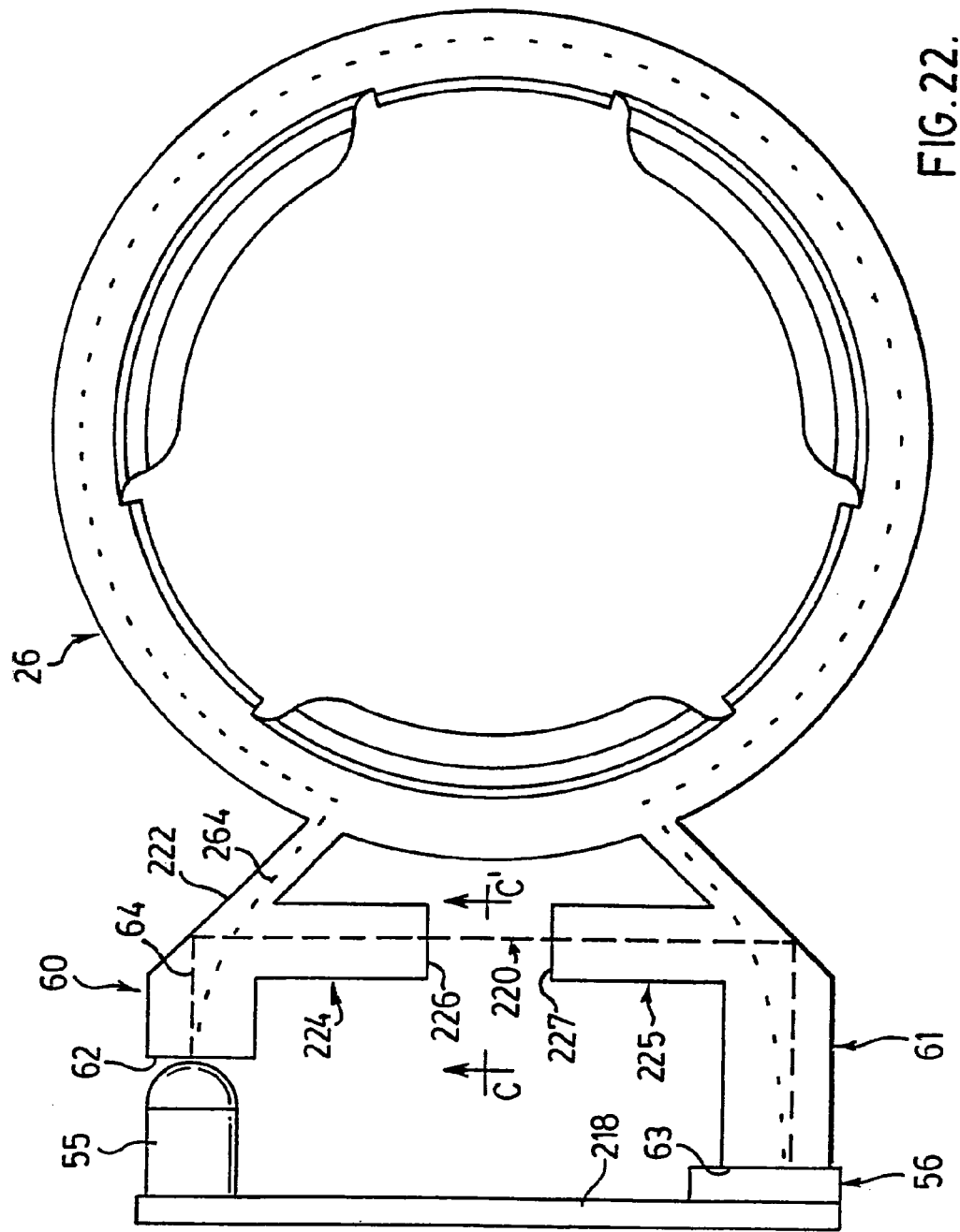
FIG. 22 shows a top view of the collar and board in FIG. 21.

FIG. 22 in top view schematically illustrates two paths that radiation may take on being transmitted through the key collar 26 from the key emitter 55 to the key sensor 56. A dashed line indicates a shorter optical path 64 in which radiation from the key emitter 55 perpendicular to the end face 62 is reflected off the shoulder surface 222 extends through the projection 224, through the frangible member 220, through the projection 225, is reflected off the shoulder surface 223 and passes through the arm 61 normal the end face 63 to be sensed by the key sensor 56. An alternate longer optical path 264 is shown in dashed lines in FIG. 22 as extending internally of the arm 60 and around the circumference of the key collar 26 and, hence, via the arm 61 to the key sensor 55.

Figure 23:
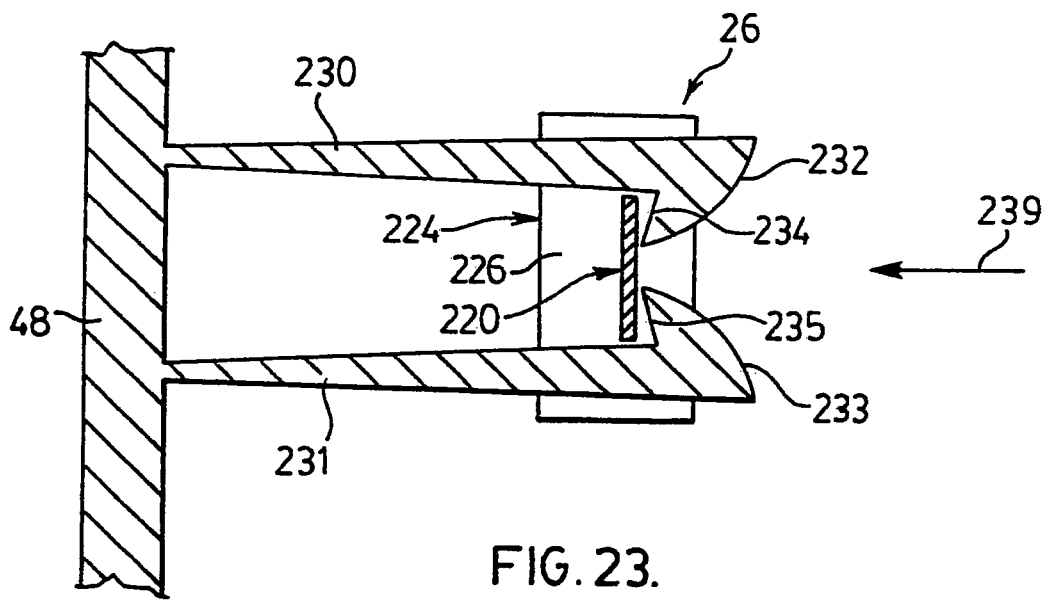
FIG. 23 schematically illustrates a cross-sectional side view along section line C-C' in FIG. 22 showing the collar in cross-section and also showing in cross-section, a schematic catch arrangement.

Reference is made to FIG. 23 which illustrates a cross-sectional side view along section C-C' in FIG. 22 through the frangible member 220 and which therefore shows the projection 224 not in cross-section. FIG. 23 schematically illustrates, as seen in cross-section, a pair of resilient catch members 230 and 231 secured to the activation unit 48 similar to the type shown in FIG. 2. Preferably, coupling of the key collar 26 to the activation unit 48 is accomplished by rearward sliding of the key collar 26 towards the activation unit 48 in a direction indicated by the arrow 239.

The two resilient catch members 230 and 231 are schematically shown in cross-section as secured to the activation unit 48. Each catch member 230 and 231 has a forwardly directed cam surface 232 and 233, respectively, which on relative rearward movement of the key collar 26 will engage the frangible member 220 and cause deflection of the resilient catch members 230 and 231 upwardly or downwardly out of the path of the frangible member 220 until the frangible member 220 is received rearward of the respective catch shoulders 234 and 235 on each of the catch members 230 and 231, whereupon the catch members 230 and 231 will under their inherent bias move to assume a latched position as shown in FIG. 23 with their catch shoulders 234 and 235 disposed forwardly of a forward surface of the frangible member 220.

With removal of the key collar 26 by forward sliding of the key collar away from the activation unit 48, the catch members 230 and 231 will engage the frangible member 220 and prevent its forward movement. The frangible member 220 is preferably of a material and has a construction which will be broken and severed under manual forces which can be readily applied in sliding the key collar 26 forwardly. As a result, with forward movement of the key collar 26 and removal of the key collar 26 from coupling with the activation unit 48, the frangible member 220 is broken and preferably severed from the key collar 26.

As a result, if the key collar 26 with the broken or removed frangible member 220 is reinserted into the dispenser, then there will no longer exist the optical path 64 for transmission of electromagnetic radiation through the frangible member 220. Thus, the electromagnetic transmission properties of the waveguide formed within the key collar 26 will have been changed by severing the frangible member 220 on removal of the key collar 26. The nature of the electromagnetic radiation sensed by the key sensor 26 will be altered and the dispenser control mechanism can give suitable instructions as to how to deal with this event as, for example, to not permit operation of the dispenser.

Figure 24:
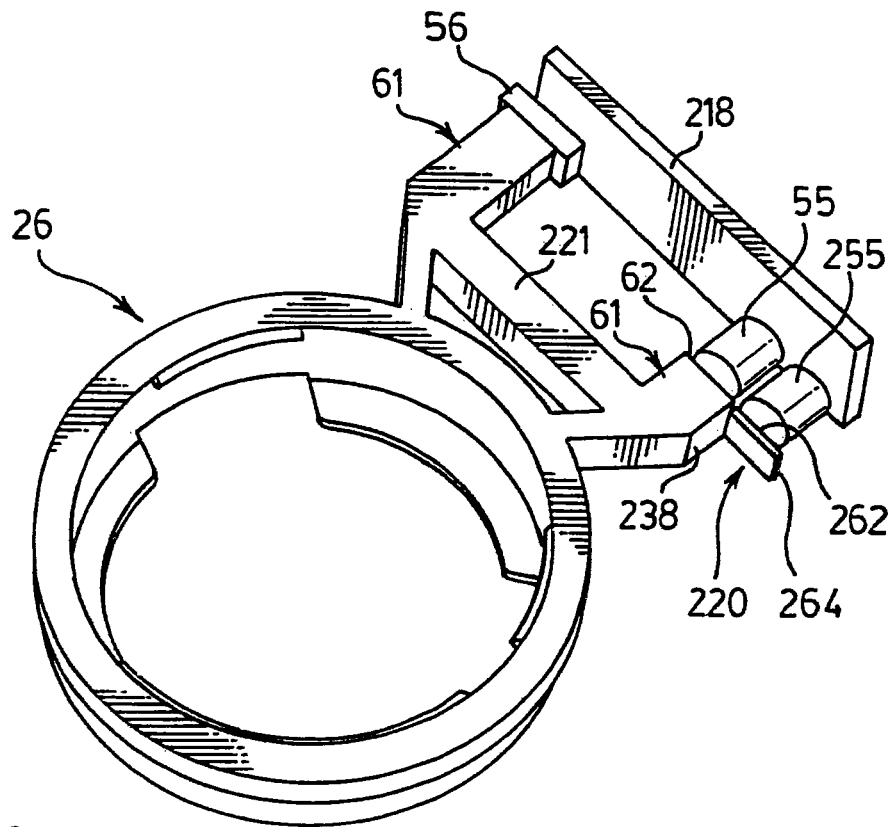
FIG. 24 shows an eight embodiment of a collar and a board carrying a sensor and an emitter similar to that shown in FIG. 21.

Reference is made to FIG. 24 which shows an eighth embodiment of the key collar 26 similar to that shown in FIG. 7 but with a few differences. Firstly, in FIG. 24, the arm 60 and the arm 61 are joined by the bridge member 221 which is of substantially constant cross-sectional area normal to the end faces 62 and 63 between the two arms 60 and 61.

Secondly, extending laterally from outside surface 238 of the arm 61, there is provided a cantilevered frangible member 220 having but one end secured to the arm 60. The frangible member 220 has a cross-sectional area normal to the end face 62 of the arm 61 which is significantly reduced compared to that of the arm 60.

As contrasted with the embodiment of FIG. 21, in FIG. 24, two key emitters are provided, a first key emitter 55 and a second parallel key emitter 255. The first key emitter 55 is disposed to direct radiation into the end face 62 of the arm 60. The second key emitter 255 is located to engage a surface 262 on the frangible member 220 and to direct radiation into the frangible member 220. The key sensor 56 engages the end face 63 of the arm 61. In the embodiment of FIG. 24, the frangible member 220 is adapted to be severed from or removed from the key collar 26 on removal of the key collar 26 from the dispenser.

While the frangible member 220 is coupled to the key collar 26 as shown in FIG. 24, then electromagnetic radiation from the second key emitter 255 will enter the waveguide via the frangible member 220 and will be picked up by the key sensor 56. However, insofar as a key collar is coupled on which the frangible member 220 has been severed from the key collar, then the key sensor 56 will not pick up radiation from the second emitter 255. While two key emitters 56 and 256 are provided, only the key emitter 255 is needed to sense the removal of the frangible member 220.

The frangible member 220 in FIG. 24 need not be severed from the key collar 26, rather, it may be bent forwardly into, for example, assume a position bent away from the second key emitter 256 as, for example, to a 45 degree position and would result in a significant change in the waveguide transmission characteristic such that radiation from the second key emitter 255 would be significantly lessened to the extent it may enter the waveguide and thus be sensed by the key sensor 56.

In FIG. 24, the radiation is directed into the frangible member via the surface 262 which is in the same plane as end face 62 on the arm 60. Alternatively, the key emitter 255 may direct radiation into the frangible member 220 at another location as, for example, at a lateral side surface 264 of the frangible member 220, with the sensor 256 suitably re-positioned.

FIG. 24 shows the use of a plurality of key emitters 55 and 255 and one key sensor 56. Of course, in a similar arrangement, one or more key sensors could be used with at least one key sensor coupled to the frangible member 220 and one key emitter to input radiation to arm 61.

Figure 25:
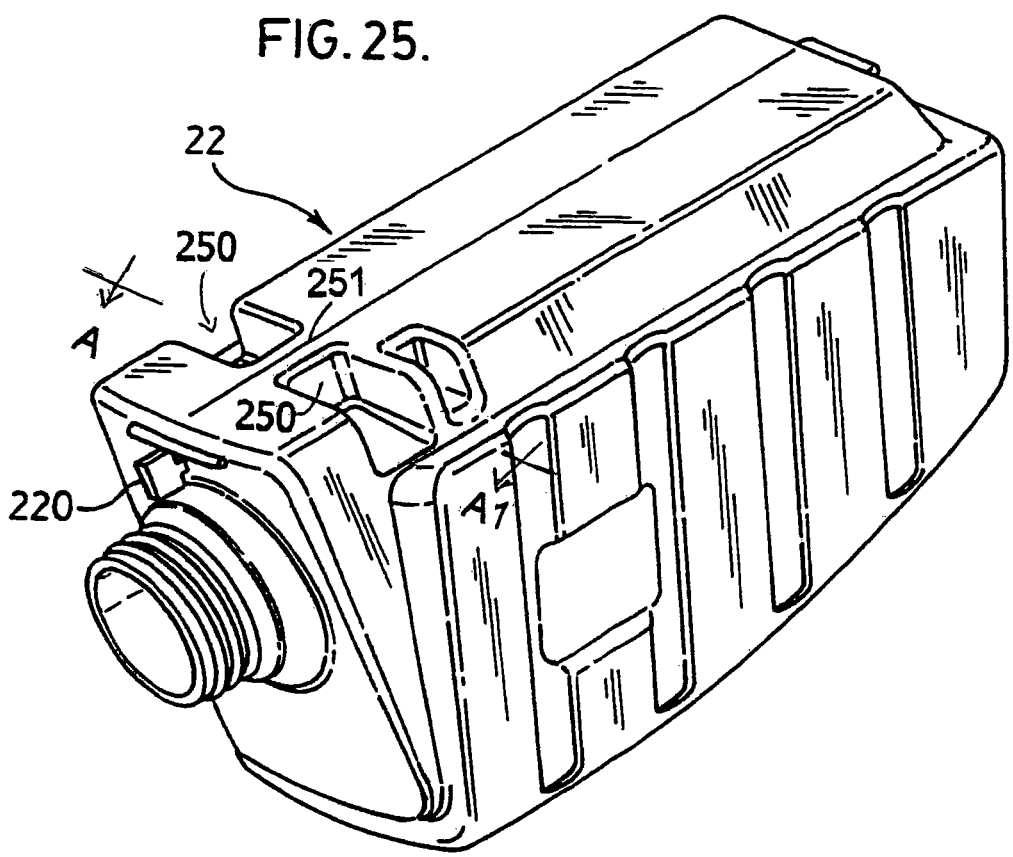
FIG. 25 is a schematic pictorial view of a reservoir bottle similar to that shown in FIG. 5.
Figure 26:
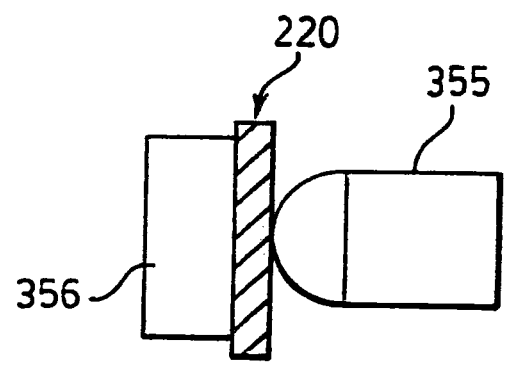
FIG. 26 is a schematic cross-section through a frangible member carried on the reservoir bottle of FIG. 25 showing positioning of a sensor and an emitter.

Referring to FIG. 25, a reservoir bottle 22 is shown which is similar to the reservoir bottle 22 shown in FIGS. 1 to 5. As a notable difference, however, the reservoir bottle 22 in FIG. 25 carries as extending downwardly from its lower edge, a frangible member 220 which is in the form of a relatively thin plate member formed integrally with the reservoir bottle 22 as, for example, from plastic material and which is adapted to serve as a portion of a waveguide. The frangible member 22 is adapted on rearward sliding insertion of the bottle 22 to slide rearwardly so as to be received between a key emitter 355 and a key sensor 356 as schematically illustrated in a horizontal cross-section in FIG. 26. The frangible member 220 is adapted to be severed or removed on removal of the reservoir bottle 22. The frangible member 220 on the reservoir bottle 22 is to serve as a portion of a waveguide. The frangible member 220 on the bottle 22 may be in substitution of the key collar 26 and its waveguide as in the other embodiments or in combination therewith.

Frangible members 220 have been shown as coupled to the reservoir bottle 22 in FIG. 25 and to the key collar 26 as in FIGS. 21 and 24. Similar frangible members forming part of a waveguide may be coupled to the pump assembly as preferably to the piston chamber forming member 30.

The particular nature of the frangible member 220 may vary widely. The objective is to provide an arrangement such that with insertion or removal of a removable component, comprising in the case of the preferred embodiment the reservoir assembly 12, a portion of a waveguide carried by the removable reservoir assembly 12 becomes changed such that a control system can recognize a reservoir assembly 12 which has been coupled or uncoupled more than once and make an appropriate selection as to how to deal with this in control of the dispenser as one example, when the control system recognizes that a reservoir assembly has been coupled or uncoupled more than once then the control system may prevent dispensing of the material.

As another example, when the control system recognizes that a reservoir assembly has been coupled or uncoupled more than once, then the control system may merely permit thereafter a given number of activations of the piston pump after which the control system will prevent dispensing. In the context of the embodiment in FIG. 24 there are two distinct optical paths, a first optical paths between key emitter 55 and key sensor 56 and a second optical path between key emitter and 255 and key sensor 56. The possibilities for the control system sensing include the following:

A: Double Positive—meaning sensing of electromagnetic radiation through the first optical path and sensing electromagnetic radiation through the second optical path;

B: Double Negative—meaning no sensing of electromagnetic radiation through the first optical path and no sensing electromagnetic radiation through the second optical path;

C: First Positive/Second Negative—meaning sensing of electromagnetic radiation through the first optical path and no sensing of electromagnetic radiation through the second optical path; and D: First Negative/Second Positive—meaning no sensing of electromagnetic radiation through the first optical path and sensing of electromagnetic radiation through the second optical path.

A first rule of operation for the control system preferably is that operation is only permitted when the control system senses passage of electromagnetic radiation through the first optical path, that is there is either (A) Double Positive or (C) First Positive/Second Negative.

A counter mechanism for the control system is to count activation of the piston 32 when there is electromagnetic radiation through the first optical path thus, under either condition (A) double positive or condition (C) First Positive/Second Negative. A second rule of operation is preferably is that after a maximum number of activations have been counted since the last resetting of the counter mechanism that operation of the pump is prevented. The maximum number of operations can be selected having regard to the volume of the fluid in any reservoir assembly which has been applied and the volume of dosage that is the amount of liquid which is to be dispensed by the piston 32 in a typical activation. If, for example, the reservoir assembly is a 1 liter and the dosage volume is 1 ml then a maximum number of activation could be selected to be, for example, 1000 activations, however, preferably there will be some buffer for inaccuracy of strokes, for example, an additional 5 percent to 25 percent thus representing, for example, as a maximum being selected between preferably 1050 and 1250 activations.

The count preferably may be reset to zero at a time when in sequence the control system after sensing no radiation through the first optical path, that is either condition (B) double negative or condition (D) First Negative/Second Positive the senses (A) Double Positive. This is equivalent to a situation in which the reservoir assembly is removed such that (B) the Double Negative is sensed and then a new reservoir assembly with its fragile member 220 in tact is applied, in which case the reservoir assembly would be expected to have its reservoir is filled of fluid and it is reasonable to reset the counter to zero and permit in the normal course operation of the dispenser for dispensing of all of the fluid from the reservoir, stopping operation, however, preferably if more than a maximum activations have been carried out as reasonably necessary to empty the reservoir. Having the maximum number of activations used to stop operation when there has been a continuous double positive is not necessary but preferred.

From a condition in which the counter mechanism is counting, if the reservoir assembly is then removed, condition B a Double Negative would be sensed. If the same reservoir assembly is removed and then recoupled, such reservoir assembly will not have the frangible member 220 attached. On recoupling, there will be a sensing of condition C being First Positive and Second Negative. On such sensing, the control system will not restart the counter to zero but will continue with the same count. This permits a reservoir assembly which has been removed and recoupled to continue to be dispensed, however, only to the maximum number of activations. The same reservoir assembly may thus be removed and recoupled a number of times with a counter mechanism continuing to count and operation being permitted until such time as the maximum number of activations has arisen.

If after removal of a reservoir assembly, a reservoir assembly is coupled which does not include either the first optical path or the second optical path then the condition (B) the double negative arises and no dispensing is permitted. Similarly, if a reservoir assembly might be applied which provides condition (D) of a First Negative and a second positive, then no dispensing arises.

Whether or not the counter mechanism may be operative such that it will stop dispensing during the condition (A) of continuous Double Positive when a mechanism is reached arises, it is preferred that when condition (C) arises with First Positive and Second Negative that the counter mechanism stop dispensing when the maximum number of activations have been reached.

The counter mechanism may have a separate total count function which counts the number of activations of the piston irrespective of whether or not anyone of the conditions A, B, C or D are present as, for example, to provide an indication of the life and overall usage of the dispenser. Of course, the counter mechanism and the maximum for each counter mechanism may be varied depending upon the volume of the reservoir, the nature of the fluid to be dispensed, the size and or stroke of the piston as would be appropriate. As well, the maximums of counter mechanism may be selected so as to ensure that all of the fluid is dispensed or to ensure that activations are stopped before all the fluid may be dispensed from the reservoir.

The present invention teaches the use of a dual key system in which two key systems are sensed to control operation of the dispenser. The preferred embodiments teach that both key systems are optical systems. However, this is not necessary and the present invention includes a dual key system where one or both of the key systems are not optical but rather are another type of keying system. Such other types of key systems can include mechanical, magnetic, radio frequency, optical scanner, electrical and capacitor based systems including one or more of such key systems used in combination with each other and with optical key systems. For example, in the context of FIGS. 25 and 24, the elements indicated 255 and 355 can comprise merely a capacitor which senses the present or absence of the frangible element 22. As another alternative, the frangible element 220 may carry a magnet such as in a form of a magnetic strip and the elements 255 and 355 may comprise a magnetic detector. The frangible element 220 might carry a machine readable optical representation such as a bar code or universal product code and the elements 255 and 355 may comprise an optical reader such as a bar code reader. The frangible element 220 may carry radio-frequency identification (RFID) tag or transponder, whether passive, active or semi-active to be sensed by the element 255 and 355 being a complimentary sensory.

Carrying a secondary keying system on the removable reservoir assembly for alteration of the secondary keying system on coupling or uncoupling of the removable reservoir assembly provides in the context of the operation described with reference to FIG. 24, an improved control of the operation of a dispenser permitting as described above, amongst other things, the permitted coupling and recoupling of the same reservoir assembly to the dispenser for dispensing to a maximum number of actuations of the pump as described above. The use of such a frangible member whether optical, magnetic, a RFID tag or a bar code or otherwise could be used not only with the primary keying system disclosed in the present application as being optical but also with other keying systems such as that described in U.S. patent publication US2006/0124662 to Reynolds et al., using an electric coil/capacitor type system. An optical key system is preferred as in the proposed preferred embodiments in that all of the components of the optical key system on the removable reservoir assembly may be conveniently made from plastic as by injection moulding.

As to the change of the characteristics of a waveguide on coupling of the removable reservoir assembly 12 to the dispenser, it is possible that selected frangible portions on the reservoir assembly 12 be removed on coupling or insertion rather than on removal. It is not necessary that the waveguide be changed by removal or severing of a frangible member. A portion of the removable reservoir assembly 12 which comprises a portion of the waveguide may be bended or deflected or otherwise manipulated in a manner so that they can come to be suitably positioned relative to a key emitter or a key sensor on coupling yet on removal or reinsertion would not adopt the same physical configuration.

It may be possible for unauthorized tampering of a device in accordance with the present invention as by the removal of the catch mechanism such as the catch members 230 and 231 shown in FIG. 23 to prevent the severance of frangible member 220 so that the reservoir assembly 12 could be reused. Alternatively, after severing of frangible member 220 from reservoir assembly 12, efforts could be made to secure a frangible member in an appropriate location towards possibly having the wave path appear unchanged. Methods for overcoming such tampering include having a control mechanism count the number of activations to calculate when a reservoir assembly 12 may be considered to have its reservoir bottle empty and preventing operation after the reservoir bottle 22 is perceived to be empty as by not permitting use until the controller sees that there is a removal and replacement of the key member as in the sensing of the absence of a frangible member followed by the sensing of the presence of a frangible member. This arrangement may, for example, require the provision of additional key emitters, key sensors and members through which an optical path is sensed. The removal of the catch members 230 or 231 could be prevented by their physical location and/or by requiring some test by a control system to ensure that, in fact, the catch members may be intact.

In the preferred embodiment illustrated in FIG. 1, the reservoir assembly 12 is removable as by moving vertically downward and then being slid rearwardly. It is to be appreciated that with various arrangements, the reservoir assembly 12 could be coupled to the remainder of the dispenser merely by moving vertically downwardly or merely sliding in one direction as, for example, horizontally or at an angle downwardly and rearwardly. Of course, in the preferred embodiments shown, the vertical opening through the support plate 18 is to be sized to permit the lower end of the reservoir assembly 12 including the key collar 26 to be moved downwardly therethrough before being slid rearwardly.

In the preferred embodiments illustrated, the optical sensor or emitters are shown as substantially in contact with the waveguide through which electromagnetic radiation is to be transferred. This is preferred but not necessary as light will transfer through air and can assist in the relative location of the various sensors and emitters and the entrances and exists of the waveguides.

In accordance with the present invention, the various waveguides through which radiation is transmitted may be photochromic or include a photochromic portion. Referring again to FIG. 7, the collar 26 may be formed as by injection moulding from a plastic material which includes at least one reversible photochromic dye. The reversible photochromic dye is a dye which inherently assumes an "unactivated state". The dye when unactivated, that is, in an unactivated state, may be activated by radiation with a "dose" of activation electromagnetic radiation in a range of "activation wavelengths" for the dye so as to assume an activated state. After a period of time from being last radiated with the dose of activation electromagnetic radiation, the reversible photochromic dye returns to its unactivated state preferably returning inherently. When the dye is not activated, that is, when in the unactivated state, the dye has a different ability to absorb electromagnetic radiation in a range of "test wavelengths" than when the dye is activated, that is, in the activated state. Typically, the dye when in the unactivated state has a relatively low ability to absorb electromagnetic radiation in a range of the test wavelengths, as a result, when the first dye is not activated, the photochromic waveguide 64 has an "inherent transmission characteristic" for relative transmission of electromagnetic radiation in the range of test wavelengths which is relatively high. When such a dye is activated, that is, in an activated state, typically the dye absorbs electromagnetic radiation in the range of the test wavelengths to a substantially greater extent than the ability of the dye to absorb electromagnetic radiation in the range of the test wavelengths when dye is not activated. As a result, when the dye is activated, the photochromic waveguide 64 has an "activated transmission characteristic" for relative transmission of electromagnetic radiation in the range of the test wavelengths different than the inherent transmission characteristic of the photochromic waveguide when the dye is not activated. The activated transmission characteristic of the photochromic waveguide typically provides for substantially less transmission through the waveguide of electromagnetic radiation in the range of the test wavelength than the transmission characteristic, however, it could provide for greater transmission.

By way of a simple example, the collar 26 may be formed by injection moulding from low density polyethylene including an Oxford Blue REVERSACOL trade mark reversible photochromic dye which when radiated by a suitable dose of ultraviolet light preferably in the range of 350-410 nm becomes fully activated. The plastic forming the waveguide, with the dye unactivated may preferably be substantially colourless, clear and having relatively high ability to transmit light. When the Oxford Blue REVERSACOL dye is fully activated by a dose of the ultraviolet wavelength activation radiation wavelength, the dye absorbs blue light in a range of the test wavelengths appearing as Oxford Blue in the visible light spectrum. When the dye is activated, the plastic forming the waveguide 64 appears of an Oxford Blue colour. When the dye is activated, visible light in the range of the test wavelengths representing the Oxford Blue colour are significantly prevented from transmission through the waveguide 64 since such Oxford Blue light in the range of the test wavelengths is absorbed by the activated dye. Thus, the dye when activated provides the waveguide 64 with an activated transmission characteristic of relatively low transmission of visible light having the test wavelengths representing Oxford Blue colour compared to the inherent transmission characteristic of the waveguide 64 when the first dye is not activated and the waveguide permits substantially greater transmission of visible light in the range of the test wavelengths represented by the Oxford Blue colour.

The dose of activation electromagnetic radiation in the range of activation wavelengths in this example with Oxford Blue REVERSACOL dye is a dose of ultraviolet radiation preferably in the range of 350-410 nm wavelengths. The dose of radiation provides adequate energy in the dose required to fully activate the dye as can be determined by simple experimentation. The reversion time period which is required from the dye of the waveguide last being fully activated until the dye of the waveguide returns to being unactivated can depend upon the fade rate for the dye and the concentration of the dye in the plastic. In respect of the Oxford Blue REVERSACOL dye, the concentration of the dye in the plastic may be selected so as to provide for a reversion time period, for example, of five minutes, such that, for example, after one minute, the plastic forming the waveguide appears only slightly tinted in blue colour and after, for example, five minutes, the dye is inactivated and the plastic forming waveguide has returned to its substantially clear uncoloured inherent appearance.

In the context of the above described example and with the waveguide 64 of a reversible photochromic dye in the embodiment illustrated in FIGS. 1 to 8, the key emitter 55 is selected to be an emitter which can selectively emit both (a) electromagnetic radiation in the range of activation wavelengths for the dye, that is, ultraviolet wavelengths in the range of 350-410 mm, and (b) electromagnetic radiation in the range of the test wavelengths representing the visible light of wavelengths represented by Oxford Blue colour. The control mechanism for the activation unit can at controlled times activate the key emitter 55 to emit a dose of the activation electromagnetic radiation in the range of ultraviolet activation wavelengths adequate to activate the dye in the waveguide 64. The control mechanism controls the key emitter 55 in a manner to permit electromagnetic radiation in the range of test wavelengths representing the Oxford Blue colour to be emitted at desired times. The control mechanism preferably controls the timing of, intensity, energy and duration of each of the activation electromagnetic radiation in the range of activation wavelengths and the test electromagnetic radiation in the range of the test wavelengths.

The key sensor 56 is configured to sense electromagnetic radiation transmitted through the waveguide 64 and particularly to sense the timing, intensity, energy and duration of electromagnetic radiation in the range of test wavelengths, that is, of the Oxford Blue colour, notably over time.

A preferred method of operation of the apparatus of FIGS. 1 to 8 with the photochromic waveguide 64 involves in a controlled manner selectively inputting the activation electromagnetic radiation into the waveguide so as to selectively control whether or not any photochromic dye in the waveguide is activated or not activated over time. With the control mechanism controlling the times when the photochromic waveguide has its known different transmission characteristics for the electromagnetic radiation in the range of the Oxford Blue test wavelengths, the control mechanism can then at selected times input test electromagnetic radiation of the Oxford Blue colour test wavelength via the key emitter 55 and sense via the key sensor 56 the relative levels of Oxford Blue colour test wavelength of test electromagnetic radiation transmitted through the waveguide 64.

By this method, the dispenser control can determine whether there is coupled to the dispenser a waveguide including the specific Oxford Blue REVERSACOL reversible photochromic dye. The determination as to whether any waveguide 64 coupled to the dispenser includes the Oxford Blue photochromic dye can be made by sensing the test electromagnetic radiation transmitted through the waveguide at a time when the photochromic dye if present in the waveguide should be activated. This may be carried out by inputting via the key emitter 55 into the waveguide 64 for transmission through the waveguide 64 input radiation representing a dose of the ultraviolet activation electromagnetic radiation adequate to activate the dye and, after inputting the dose of ultraviolet activation electromagnetic radiation sufficient to activate the dye so that the dye if present should be in the activated state, further inputting into the guideway 64 via the key emitter 55 for transmission through the guideway as input electromagnetic radiation, Oxford Blue coloured test electromagnetic radiation, followed by sensing with the key sensor 56 the relative levels of Oxford Blue wavelength electromagnetic radiation transmitted through the waveguide 64, and determining from the Oxford Blue wavelength electromagnetic radiation sensed if the waveguide 64 relatively transmits the Oxford Blue wavelength electromagnetic radiation above or below a threshold value. Sensing transmitted Oxford Blue wavelengths electromagnetic radiation above a threshold valve is indicative of the first waveguide not having the activated transmission characteristic and that the waveguide 64 does not include Oxford Blue photochromic dye. If the transmitted Oxford Blue wavelength electromagnetic radiation sensed by the key sensor 56 is determined to be below the threshold valve, then this is indicative that the waveguide has the activated transmission characteristic and that the waveguide 64 includes the Oxford Blue photochromic dye. The control mechanism may control operation of the dispenser dependent upon whether or not the waveguide is indicated to include the Oxford Blue photochromic dye.

The above referred to test to determine if the waveguide 64 includes the Oxford Blue wavelength photochromic dye would not be able to distinguish between a waveguide 64 including the Oxford Blue photochromic dye which has been activated and a waveguide 64 which permanently has a colour of the Oxford Blue wavelength. The method preferably may include other steps in which the ability of the waveguide when expected to be inactivated is tested to consider if its transmission of test electromagnetic radiation in the range of the test wavelength matches the inherent transmission characteristic. The dispenser may be operated in a method which determines, at a time when the waveguide 64 should be in an inactivated state, if the waveguide 64 has the capability of transmitting the Oxford Blue test electromagnetic radiation in a manner consistent with the waveguide 64 including the Oxford Blue photochromic dye that is inactivated. The control mechanism for the activation unit 48 controls and is cognizant of whether the waveguide 64, if it contains the Oxford Blue photochromic dye, would be activated or unactivated. The control mechanism would expect that the waveguide 64 containing the Oxford Blue dye would not be activated: (a) before any dose of the ultraviolet activation electromagnetic radiation has been emitted by the key emitter 55, or (b) after the reversion time period has passed following the last input of ultraviolet electromagnetic radiation to activate the dye. At such point in time as the control determines that the Oxford Blue photochromic dye if present in the waveguide 64 would not be activated, the following test procedure is carried out. Via the key emitter 55, input electromagnetic radiation is input into the waveguide 64 comprising Oxford Blue wavelength test electromagnetic radiation. Simultaneously, the key sensor 56 is used to sense transmitted electromagnetic radiation transmitted through the waveguide 64 in the range of Oxford Blue colour test wavelengths. The control then makes a determination from the sensed Oxford Blue transmitted electromagnetic radiation as to the relative level of transmission of the Oxford Blue wavelength electromagnetic radiation. If the Oxford Blue wavelength electromagnetic radiation sensed is below a set threshold, then this is indicative of the waveguide not including the Oxford Blue reversible photochromic dye. If the Oxford Blue wavelength electromagnetic radiation sensed is above the relative threshold, then this is indicative of the waveguide including the Oxford Blue reversible photochromic dye.

In respect of determining the relative transmission of the Oxford Blue wavelength test electromagnetic radiation through the waveguide from the key emitter 55 to the key sensor 56, the control may compare the Oxford Blue wavelength test electromagnetic radiation emitted by the key emitter 55 with the Oxford Blue wavelength test electromagnetic radiation sensed by the sensor 56. Alternatively, with knowledge, for example, of preset intensity levels of the Oxford Blue test electromagnetic radiation emitted by the key emitter 55, the relative intensity of the Oxford Blue test electromagnetic radiation sensed by the key sensor 56 may itself indicate the relative ability of the waveguide to transmit the Oxford Blue test electromagnetic radiation.

Insofar as electromagnetic radiation in a range of wavelengths is required for a reversible photochromic dye to change from an activated state to an unactivated state, then the control mechanism may also control the application of such radiation to the waveguide as, for example, by controlling the key emitter to input such radiation.

The use of the collar 26 as shown in FIG. 7 has been described above in which the waveguide 64 is formed as a unit by injection moulding from plastic material which permits transmission of electromagnetic radiation therethrough and includes as one photochromic dye an Oxford Blue REVERSACOL photochromic dye. Such a collar 26 may, however, include more than one photochromic dye, for example, two, three, four or five or more different photochromic dyes. The particular nature of the different photochromic dyes may be suitably selected. For example, each of the different photochromic dyes may be activated by activation electromagnetic radiation having the same range of activation wavelengths, for example, all may be activated by ultraviolet light. The dosage of such activation electromagnetic radiation of ultraviolet light to activate each different photochromic dyes may be the same or may vary as, for example, with the amount of energy required to activate one of the dyes being different than the amount of energy required to activate the other of the dyes such that varying the amount of energy of the activation electromagnetic radiation radiated can control which of the photochromic dyes may be activated.

In one preferred embodiment, more than one photochromic dye may be used, each being activated by the same activation wavelength, for example, the same ultraviolet light and each being relatively equally activated by any dose of such ultraviolet light. Each of the photochromic dyes may have a range of test wavelengths that it selectively absorbs when activated, for example, to have different colour when activated and, preferably each, when unactivated, effectively is clear transmitting visible light and provides substantially no colour to the waveguide. Referring to the photochromic dye as having a colour when activated is a simplistic way of stating that the photochromic dye when activated has an enhanced ability to absorb electromagnetic radiation of a particular test wavelength, in this case, corresponding to visible light of the specific colour.

The dispenser has been described above as being controlled by using a method which determines whether or not the waveguide includes a reversible photochromic first dye. In an analogous manner, the dispenser may be operated in a manner to determine whether the waveguide also includes a reversible photochromic second dye or a reversible photochromic third dye or any other different reversible photochromic dyes. If two or more of the different reversible photochromic dyes are activated by activation electromagnetic radiation in the same range of activated wavelengths, then these dyes may be activated simultaneously. Thereafter, emission of the test electromagnetic radiation for each photochromic dye and sensing of the transmission of such test electromagnetic radiation for each photochromic dye may be carried out while each of the photochromic dyes is activated.

Where multiple photochromic dyes are incorporated in the same wavelength 64, it is possible to utilize photochromic dyes that are activated by activation electromagnetic radiation having different activation wavelengths. For example, a first photochromic dye in the wavelength might be activated by one of ultraviolet, visible or infrared light electromagnetic radiation as a first range of activation wavelengths and a second photochromic dye may be activated by radiation with electromagnetic radiation of a different second range of activation wavelengths which is outside the first range. With key emitter 55 capable of emitting the activation electromagnetic radiation selectively of the different desired ranges of activation wavelengths, the two different photochromic dyes may be selectively activated by the control mechanism.

The two or more of the photochromic dyes in the same waveguide could have the ability when activated to selectively absorb the same test electromagnetic radiation. For example, different activation electromagnetic radiation may be used to selectively activate two different photochromic dyes, however, each of which may absorb light of the Oxford Blue wavelength. Nevertheless, selective testing may be carried out testing for the level of transmission of test electromagnetic radiation of the Oxford Blue wavelength in the various conditions of: (1) neither photochromic dyes being activated, (2) one of the photochromic dyes activated and the other of the photochromic dyes not being activated, or (3) both of the photochromic dyes being activated. Furthermore, each of the photochromic dyes which when activated may absorb the Oxford Blue wavelength to different extents and thus different level transmissions of Oxford Blue wavelengths electromagnetic transmission may be determined depending upon whether none, one or both of the photochromic dyes are activated.

The present invention also provides for the use of irreversible photochromic dyes. An irreversible photochromic dye describes a dye that undergoes a relatively permanent change in its ability to absorb electromagnetic radiation in a range of test wavelengths upon exposure to activation electromagnetic radiation in a range of activation wavelengths. The irreversible photochromic dyes provide the waveguide with an inherent transmission characteristic when not activated which is different than an activated transmission characteristic when activated. For example, when not activated, the irreversible photochromic dye may not significantly absorb electromagnetic radiation of specific test wavelengths yet, when activated, may significantly absorb electromagnetic radiation of the specific test wavelengths. Alternatively, the irreversible photochromic dye may, when not activated, significantly absorb electromagnetic radiation in a range of test wavelengths yet, when activated, may not absorb electromagnetic radiation in the range of the test wavelengths.

In accordance with the present invention, as shown in FIG. 7, the collar 26 may be injection moulded in its entirety from a plastic material which contains an irreversible photochromic dye. For example, the irreversible photochromic dye may be a dye which when activated with activation electromagnetic radiation such as ultraviolet radiation within a certain dose in a period of time, substantially irreversible activates the dye to permanently significantly absorb electromagnetic radiation within a range of test wavelengths, for example, red colour visible light and thus assume a red colour.

In accordance with the present invention, the dispenser may be controlled such that at some time in the cycle of operation, the irreversible photochromic dye may be activated such that the dye will permanently have the colour red and the waveguide will absorb red wavelength light.

For example, in the embodiment of FIGS. 1 to 8, the control mechanism may, for example, after initialization such as insertion of the removable reservoir assembly 12 or after its initial usage, activate the irreversible photochromic dye in the waveguide 64 as by activation with ultraviolet light such that the waveguide thereafter will permanently have an activated transmission characteristic of selectively absorbing electromagnetic radiation in a range of red light wavelengths. Before any removable reservoir assembly 12 may be permitted to be used in the dispenser in an initialization process, the control mechanism will preferably perform a suitable initialization test to determine if the waveguide transmits red wavelength electromagnetic radiation. If red wavelength electromagnetic radiation is not permitted to be transmitted at a time when a waveguide should be unactivated, then the dispenser may be controlled in a manner as to prevent operation with that reservoir. Thus, in this manner, after any particular removable reservoir assembly 12 and its collar 26 has been used in a dispenser assembly, that collar 26 and its waveguide are permanently marked by activation of the irreversible photochromic dye as a reservoir assembly 12 which should not be permitted to be removed, inserted and re-initialized for re-use another time in the dispenser.

The time when the irreversible photochromic dye may be activated to permanently adopt its activated state, for example, red colour may take place at times other than after initialization or initial dispensing. For example, for any removable reservoir assembly at any time after insertion and before removal but preferably after checking to see that the waveguide 64 is an acceptable waveguide, the waveguide may then have its irreversible photochromic dye activated to prevent re-use after removal. The activation of the irreversible photochromic dye may take place at some set time after initial insertion as, for example, a pre-selected time in of hours, days or months after insertion or after a determination has been made that some pre-selected amount of fluid has been dispensed, or is calculated, estimated or expected to have been dispensed, from the reservoir. For example, the control mechanism may count the number of activations of the piston 32 such that after a maximum number of activations have been counted since last reset of the counter mechanism, the irreversible photochromic dye is activated.

An irreversible photochromic dye may be selected, for example, to be absorptive of electromagnetic radiation of test wavelengths, for example, red wavelength light when not activated and, when activated, be non-absorptive and therefore transmissive of the red colour test electromagnetic radiation. With such a irreversible photochromic dye, on initial insertion of the removable reservoir 12 which the collar 26 and while the wavelength should be unactivated, the control mechanism may conduct a test to ensure that the collar 26 has the inherent transmission characteristic, that is, is absorptive of red wavelength light. Thereafter, the collar may be irradiated with activation electromagnetic radiation to activate the photochromic dye and assume a transmission characteristic that permits increased transmission of red light. Subsequently, tests could be conducted to ensure if the waveguide permits the transmission of red light and prevent operation if red light is not adequately transmitted.

In accordance with the present invention, one or more irreversible photochromic dyes may be used. Each irreversible photochromic dye may be activated by activation electromagnetic radiation having the same or different activation wavelengths. Each of the irreversible photochromic dyes may have the same or different test wavelength electromagnetic radiation which it will selectively absorb.

In accordance with the present invention, any particular waveguide such as the waveguide 26 in FIG. 7 may include one or more irreversible photochromic dyes and one or more irreversible photochromic dyes, each of which has a respective activation electromagnetic radiation in a range of activation wavelengths, each of which has a respective electromagnetic radiation in a range of test wavelengths which is adapted to selectively absorb. The various activation wavelengths of the activation electromagnetic radiation may be the same or different and the various test wavelengths of the electromagnetic radiation absorbed may be the different or the same.

The irreversible photochromic dye may comprise a dye in respect of which the cumulative amount of activation electromagnetic radiation it receives will move the photochromic dye successively from an unactivated state towards an activated state, for example, progressively, as for example, to linearly with the energy of activation electromagnetic radiation received, increase the dye's ability to absorb electromagnetic radiation in the range of test wavelengths. In one embodiment, the waveguide 26 may include both a reversible photochromic dye and an irreversible photochromic dye, with each having the same activation wavelength, for example, ultraviolet wavelength light. With each successive dose of ultraviolet radiation to successively activate the reversible photochromic dye in the course of normal usage, the irreversible photochromic dye becomes increasingly activated until it is so fully activated that it would fail to meet a minimum threshold as to permit further usage in the dispenser it is coupled to or that it needs be accepted as a replacement waveguide if removed from the dispenser and reinserted.

In accordance with one aspect of the present invention, it is advantageous that the collar 26, for example, as shown in FIG. 7 may visually to a human handler have a specific colour or absence of colour. For example, on initial manufacture, the collar may appear clear or colourless. In the absence of application of appropriate input electromagnetic radiation and sensing appropriate output electromagnetic radiation, it would not be apparent to a user as to what inherent light transmitting characteristics of the waveguide will arise and thus would be difficult, in the absence of some not insubstantial testing and investigation, for any third party without knowledge of the transmission characteristics to determine what specific characteristics are found in that waveguide and are necessary to make it compatible with the component for which it is intended.

The embodiment illustrated in FIG. 9 shows an optical fiber member 68 as forming a waveguide. It is to be appreciated that the optical fiber member 68 may comprise a plastic containing one or more photochromic dyes. In the embodiment illustrated in FIG. 9, the base 66 may be formed from a plastic including a first photochromic dye, the top 67 may be formed from a plastic including a second photochromic dye and the optical fiber member 68 may be formed from a plastic including a third photochromic dye. Emitted electromagnetic radiation from the key emitter 55 may simultaneously be inputted into each of the base 66, top 67 and optical fiber member 68 and electromagnetic radiation transmitted through each may be sensed by the key sensor 56. Only one or two of the base 66, top 67 or optical fiber member 68 may have a photochromic dye.

FIGS. 10 and 11 illustrate various embodiments in which the elements 211, 212, 213 and 214 may selectively be either an emitter of electromagnetic radiation or a sensor of electromagnetic radiation. As well, FIGS. 10 and 11 show configurations which adopt one or more of three optical fiber members 105, 106 and 107 as waveguides. Preferably, in FIGS. 10 and 11, at least one of the waveguides includes a photochromic dye, however, each of the waveguides 105, 106 and 107 may include one or more photochromic dyes. Each of the waveguides 105, 106 and 107 may have a different photochromic dye. It is within the skill of a person knowledgeable in this area to determine a simple relative test for inputting activation electromagnetic radiation selectively and inputting test electromagnetic radiation selectively so as to determine whether or not any one of the various waveguides includes an expected photochromic dye.

In the embodiment of FIG. 12, the individual waveguide inserts 171, 172 and 173 may each include one or more photochromic dye. Similarly, in the embodiment illustrated in FIG. 14, the waveguide extensions 151 and 152 which may be removable may include one or more photochromic dyes. In the embodiments of each of FIGS. 15 and 20, each of the waveguide members 184 and the waveguide members 201, 202 and 203 may include one or more photochromic dye.

In the embodiments of FIGS. 13, 14, 21, 22 and 24, the collar 26 may, as in the case collar in FIG. 7, be injection moulded in its entirety of plastic material containing one or more photochromic dyes. Alternatively, various components of the collar 26 may be injection moulded selectively with different plastics in different portions so as to provide photochromic dye in one portion which is not in another portion. For example, in the context of the embodiment illustrated in FIG. 22, injection moulding may be carried out so as to injection mould the annular circular part containing the circular portion of the waveguide 264 to be plastic having different amounts of photochromic dye than the parts of the collar 26 forming the waveguide 64 as shown in FIG. 22.

The embodiment of FIG. 24 shows the use of two key emitters, a first key emitter 55 and a second key emitter 255. More than one key emitters may be provided as may be advantageous for selectively inputting into the waveguide of either activation electromagnetic radiation or test electromagnetic radiation of different wavelengths. This may be preferred to having a single emitter which is adaptable to emit radiation of different wavelengths. The key emitter 55 illustrated, for example, in FIG. 4 may comprise a combination of various individual emitting devices each of which can emit radiation of desired wavelengths with the emitted radiation from all the individual emitters being the resultant emission from the key emitter 55.

The preferred embodiments illustrated show various waveguides which are typically referred to as comprising plastic. However, other light transmitting materials may be used, for example, waveguides made of glass including notably a glass optical fiber as in FIG. 9 and the separate replaceable waveguides indicated as 105, 106, 107 in FIGS. 10 and 11 or 184 in FIG. 15.

The electromagnetic radiation to be emitted into the waveguides via the key emitter 55, transmitted through the waveguide and sensed by the key sensor 56 may preferably be light in ultraviolet, visible and near visible wavelengths. Light of almost any wavelength is preferred.

In the embodiments of FIGS. 1 to 24, the waveguide has substantially been characterized as a portion of the collar 26 forming a portion of the removable reservoir assembly 12. In the embodiment of FIG. 25, the waveguide is provided as a portion of the bottle 22 notably the frangible member 220, however, it is to be appreciated that it is within the scope of the present invention that a member similar to 220 could be provided on the bottle which is not frangible and merely provides a waveguide, which waveguide may preferably include photochromic dye.

In accordance with the present invention, a removable and replaceable key component is disclosed which is required for operation of a mechanism and which the key component includes an electromagnetic waveguide preferably including a photochromic portion. The keying portion preferably serves a function in the operation of the mechanism in addition to the function of providing the waveguide. In this regard, the collar 26 in the first embodiment serves a purpose of securing the pump assembly 24 to the bottle 22 against removal. In the case of the bottle 22 as seen in FIG. 25, the bottle 22 serves the function of a reservoir for fluid. These functions may be seen to be in addition to the function of serving as a waveguide and may be considered independent to the function of providing the waveguide.

In the context of the keying component being a component required for operation of a mechanism, the present invention is not limited to keying components for mechanisms whose purpose is to dispense material although this is a preferred application. In the case where the mechanism is an apparatus for dispensing material, the replaceable keying component has been shown, for example, in FIGS. 1 to 25 to comprise a securing collar 26 and in FIG. 25 to comprise the bottle 22. The keying component is not limited to being such components, however.

Figure 27:
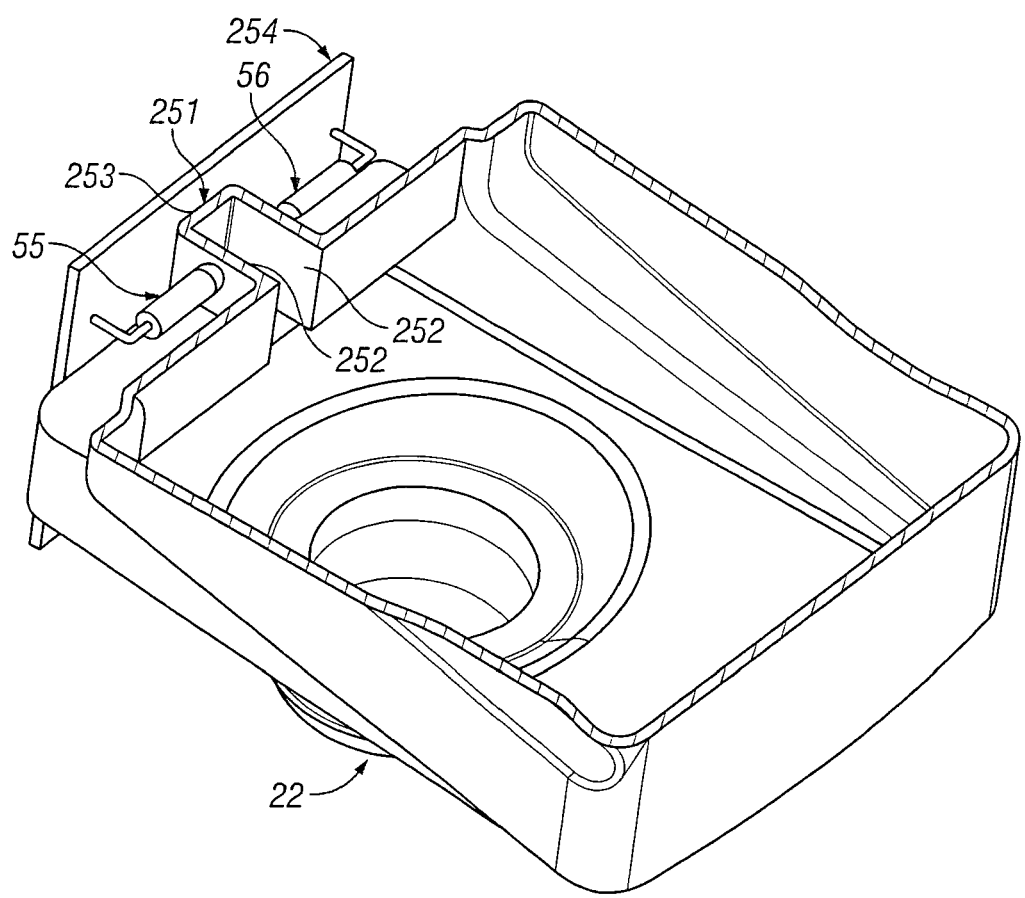
FIG. 27 is a schematic cross-section along section line A-A' in FIG. 25 and showing the cross-section reservoir in conjunction with a further embodiment of an emitter and scanner in accordance with the present invention.
Figure 28:
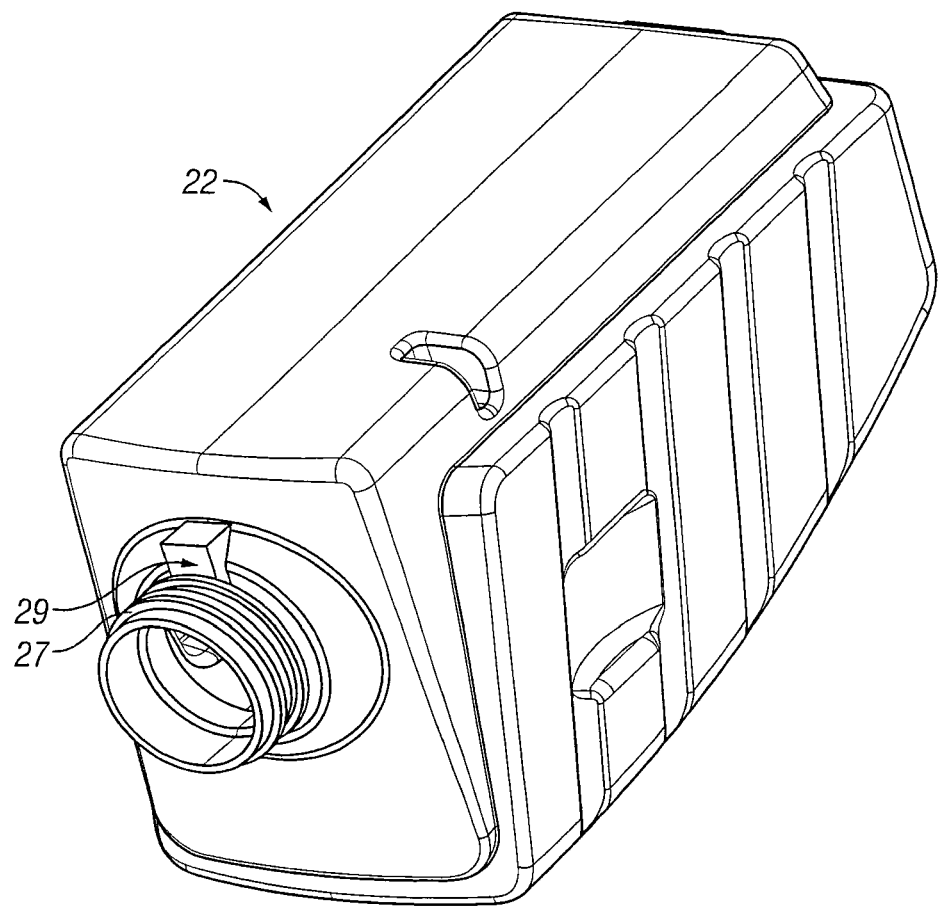
FIG. 28 is a pictorial rear view of a reservoir bottle similar to that shown in FIG. 5.
Figure 29:
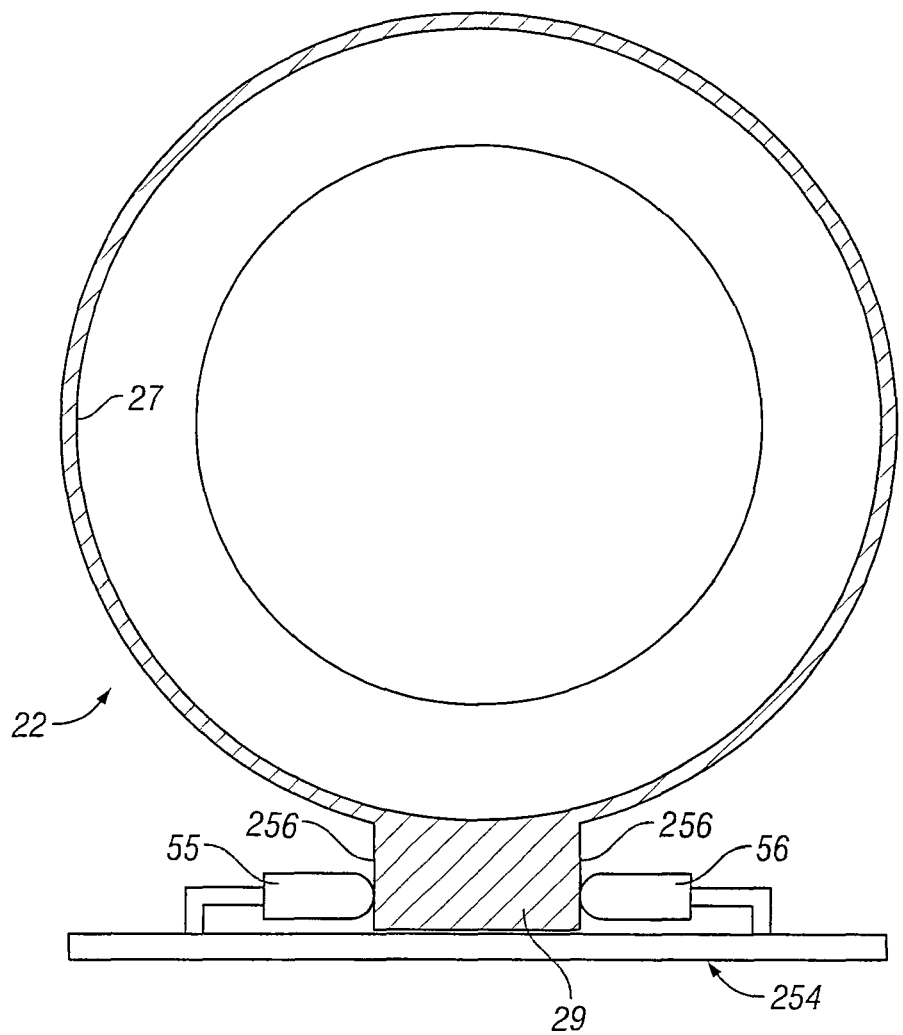
FIG. 29 is a cross-sectional view through the neck of the reservoir shown in FIG. 28 and illustrating a further embodiment of an emitter and sensor in accordance with the present invention.

Reference is made to FIGS. 27 to 29 which illustrate two alternate embodiments in which the keying component including the waveguide which preferably including a photochromic portion comprises the bottle 22. As seen in the rear view of the bottle 22 shown in FIG. 25, a pair of recesses 250 are provided extending into the rear and spaced by a web 251 of the bottle. As best seen in FIG. 27, the web 251 comprises a pair of side walls 252 and a rear wall 253. FIG. 27 schematically illustrates the bottle 22 as secured in a dispensing apparatus with the dispensing apparatus including a mounting board 254 carrying a key emitter 55 and a key sensor 56 directed such that electromagnetic radiation is directed into the web 251 for transmission of electromagnetic radiation through the web 251. The web 251 may be configured such that electromagnetic radiation will pass internally through the side wall 252 through the rear wall 253 to the other side wall 252 to be sensed by the key sensor 56. Alternatively, the electromagnetic radiation may pass through each side wall 252 perpendicular thereto and through the space between the side walls 252 within the bottle 22 then through the other side wall 252 to reach the key sensor 56. In a further embodiment, the web 251 could be provided such that the two side walls are, in fact, one side wall and there is no gap therebetween.

Reference is made to FIG. 28 which illustrates a further embodiment of a bottle 22 having similarities to that shown in FIG. 5 and FIG. 25. In FIG. 28, a tab 29 is provided on the neck 27. The tab 29 in FIG. 28 is substantially the same as the locking tab 29 in FIG. 5, however, in FIG. 28, the tab 29 is provided at the rear of the bottle. FIG. 29 schematically illustrates a cross-section normal to the neck 27 through the tab 28 and with the bottle 22 secured to a fluid dispenser with a mount board 254 similar to that shown in FIG. 27 having its key emitter 55 and key sensor 56 disposed to engage opposite side surfaces 256 of the tab 29. The tab 29 thus serves as a waveguide for passage of electromagnetic radiation therethrough and the tab 29 preferably includes a photochromic dye.

Figure 30:
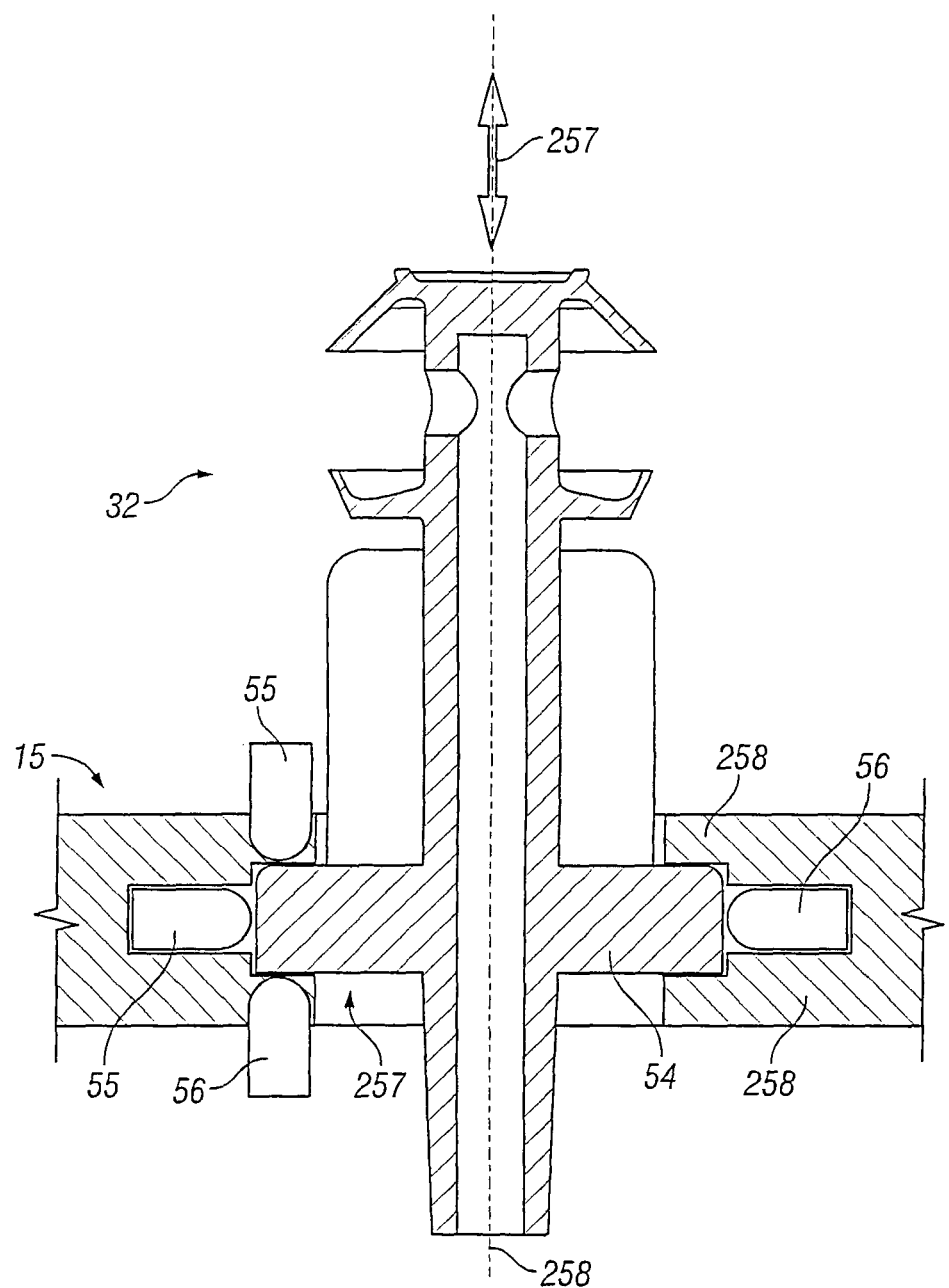
FIG. 30 comprises a vertical cross-section through a piston as shown in FIG. 5, however, showing the piston engaged with a presser member and an arrangement of emitters and sensors in accordance with another embodiment of the present invention.

Reference is made to FIG. 30 which illustrates an arrangement in which the replaceable keying component is a piston 32 of a pump assembly 25 substantially the same as that shown in FIG. 5. The piston 32 includes an engagement flange 54 which, as shown in a vertical cross-section in FIG. 30, is adapted for engagement with a presser member 15 such that movement of the presser member moves the piston 32 upwardly and downwardly as indicated by the arrow 257 shown in FIG. 30. The presser member 15 is shown to have a slotway 257 therethrough with catch members 258 to engage the engagement flange 54 and couple the engagement flange 54 to the presser member 15. The presser member 15 is shown to have two key emitters 55 and two key sensors 56. A first key emitter 55 is disposed to direct the electromagnetic radiation radially into the engagement flange 54 normal the axis 258 for passage radially and circumferentially through the engagement flange 54 to a diametrically opposed key sensor 56. In addition, a second key emitter 55 is carried by the presser member 15 to direct electromagnetic radiation axially parallel to the axis 258 of the piston with the electromagnetic radiation to pass axially through the engagement flange for sensing by an oppositely disposed key sensor 56. The engagement flange 54 thus serves the function of a waveguide. In each of the embodiments illustrated, where each of the respective key emitters engages or directs electromagnetic radiation into the respective waveguide, there is formed on the waveguide an inlet for electromagnetic radiation and similarly on each waveguide opposite and opposed to each key sensor, the waveguide provides an outlet for electromagnetic radiation. To enhance various portions of the circumferential surface of the engagement flange 54 to serve as an input or output, the circumferential surface may be faceted and provide surfaces substantially normal to the emitter and sensor.

Figure 8:
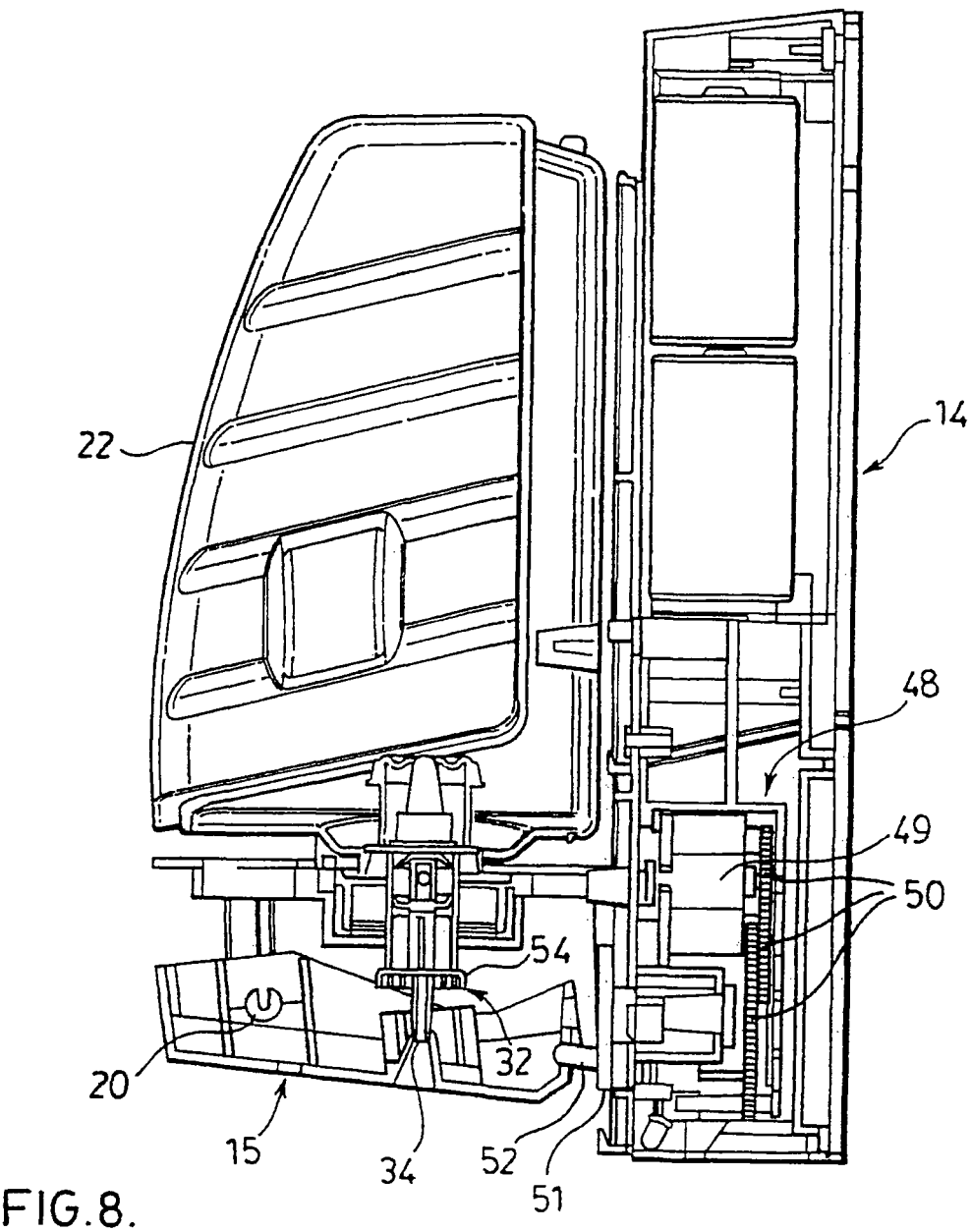
FIG. 8 is a schematic cross-sectional side view of the dispenser assembly 10 shown in FIG. 1.

In FIG. 30, the presser member 15 may comprise a presser such as the presser 15 shown in FIG. 8 which pivots about the stub axles 20, however, in accordance with the embodiment of FIG. 30, the presser member 15 is mounted to the housing for linear movement parallel to the axis 258 as by mounting the presser member 15 for sliding vertically relative to the side plates 19 of the backplate assembly 14 shown in FIG. 2 rather than for pivoting about the stub axles 21. Preferably in a different arrangement, the engagement flange 54 may be adapted to be slid horizontally rearwardly into a forwardly open slot formed by the presser member 15 as is known, for example, in devices as taught by U.S. Pat. No. 5,431,309 to Ophardt issued Jul. 11, 1995 albeit disclosing a manually operated fluid dispenser.

Each of the embodiments illustrated in FIGS. 27 to 30 may provide their respective waveguide and key emitter and key sensor in an arrangement which avoids the need for any of the other waveguides illustrated, for example, in FIGS. 1 to 26 although any combination of two or more waveguides disclosed may be utilized.

Figure 31:
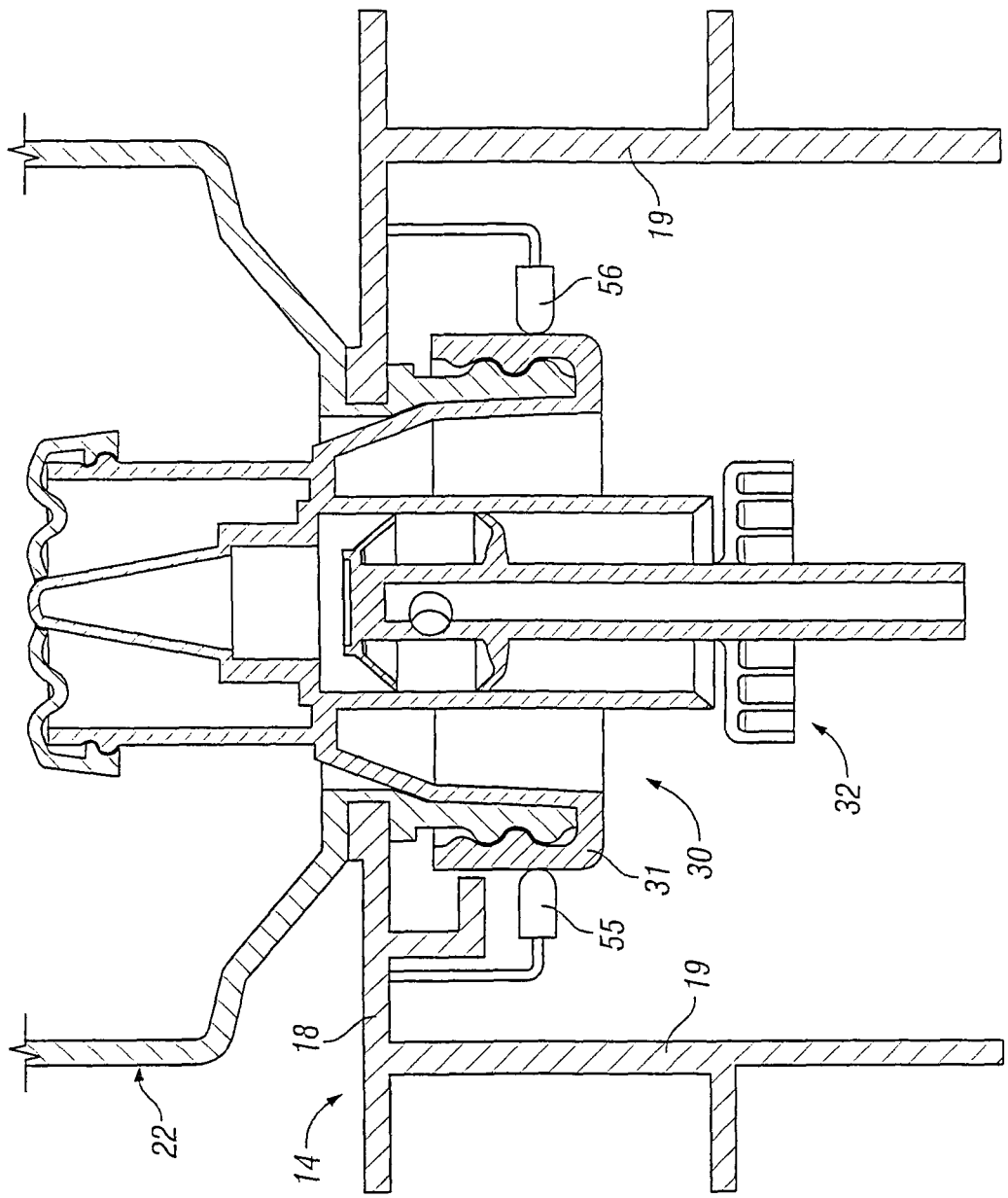
FIG. 31 is a vertical cross-sectional view through a fluid dispenser in accordance with a further embodiment of the invention having similarities to the dispenser illustrated in FIGS. 1 to 26.

Reference is made to FIG. 31 which illustrates a cross-sectional view with an alternate embodiment of a fluid dispenser in accordance with the present invention substantially identical to that shown in FIGS. 1 to 26, however, with the notable exception that the collar 26 has been eliminated and the piston chamber-forming member 30 has been utilized to provide a waveguide with radiation to be input into the outer flange 31 by a key emitter 55 to pass circumferentially about the outer flange 31 for sensing of transmitted electromagnetic radiation by the key sensor 56. As shown, the key sensor 56 and key emitter 55 are secured to the support plate 18 of the backplate assembly 14. In this embodiment, the structure of the dispenser is otherwise the same as the embodiment of FIGS. 1 to 26.

Figure 32:
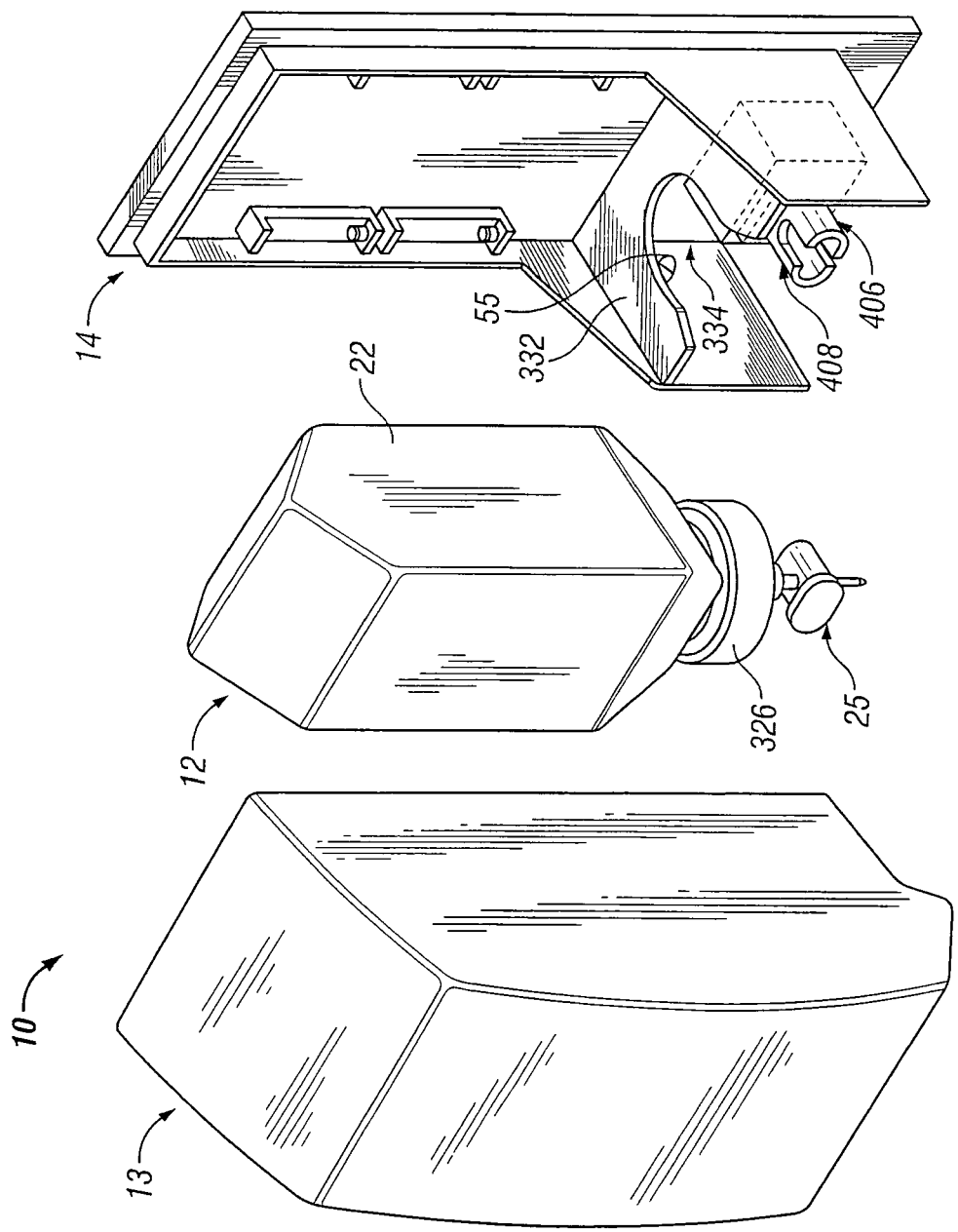
FIG. 32 is an exploded perspective view of another embodiment of a fluid dispenser in accordance with the present invention.

Reference is made to FIG. 32 which shows an exploded view of another embodiment of a fluid dispenser in accordance with the present invention having similarities to the pump disclosed in U.S. Pat. No. 5,836,482 to Ophardt issued Nov. 17, 1998. The dispenser 10 comprises a housing 14, a replaceable reservoir assembly 12 and a cover 13. The housing 14 is adapted to be mounted vertically as to a wall. The cover 13 is adapted to be coupled to the housing to permit insertion and removal of the reservoir assembly 12 preferably as in a known manner with the cover 13 hingedly connected to the housing 14. The replaceable reservoir assembly 12 comprises a collapsible fluid container 22 and a pump assembly 25.

Figure 33:
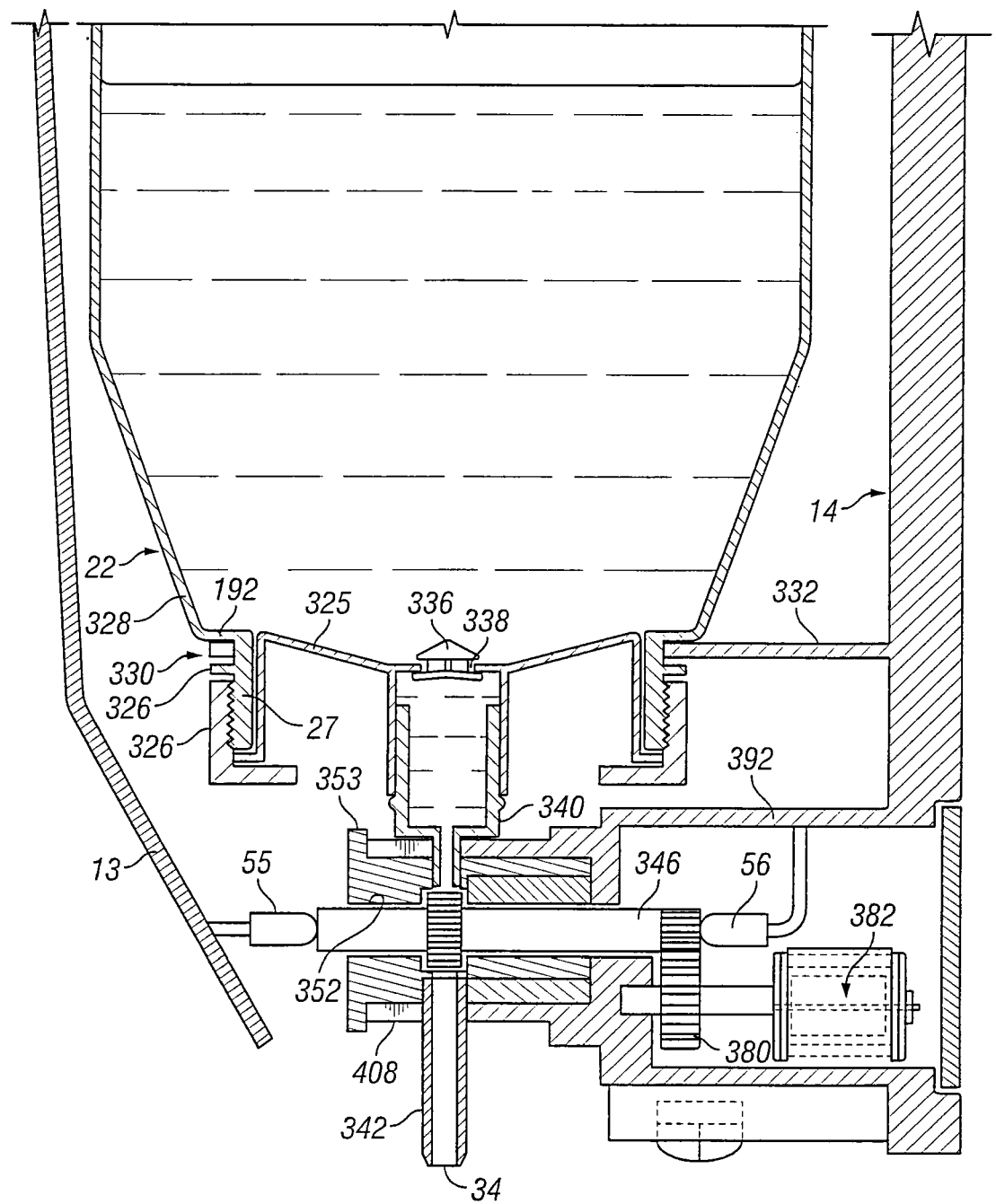
FIG. 33 is a partial cross-sectional side view through the fluid dispenser of FIG. 32 in an assembled condition.

Reference is made to FIG. 33 which shows in cross-section the container 22 filled with fluid. The container 22 has a cylindrical outlet neck 27 which is externally threaded at its end to threadably receive a collar 26. The neck 27 has a radially outwardly extending flange 326 disposed closely under a radially outwardly extending shoulder 192 of the wall 328 of the container so as to present a radially extending support slot 330 therebetween. The housing 14 has a horizontally extending support plate 332 with a forwardly open U-shaped slot 334 therein sized to be complementary to support slot 330 such that the support plate 332 can be received in slot 330 and support the weight of the container 22 and locate the container in a desired position.

The collar 26 supports a funnel-like plate 325 with a central opening 338 therethrough which opens into a feed tube 340. A flapper valve member 336 is located in opening 338 to form a one-way valve which prevents flow upwardly from the feed tube 340 into the container.

Fluid passing through the one-way valve formed by member 336 is conducted via feed tube 340 to the pump assembly 25 and then from pump assembly 25 via an exit tube 342 to out a discharge opening 34.

Figure 34:
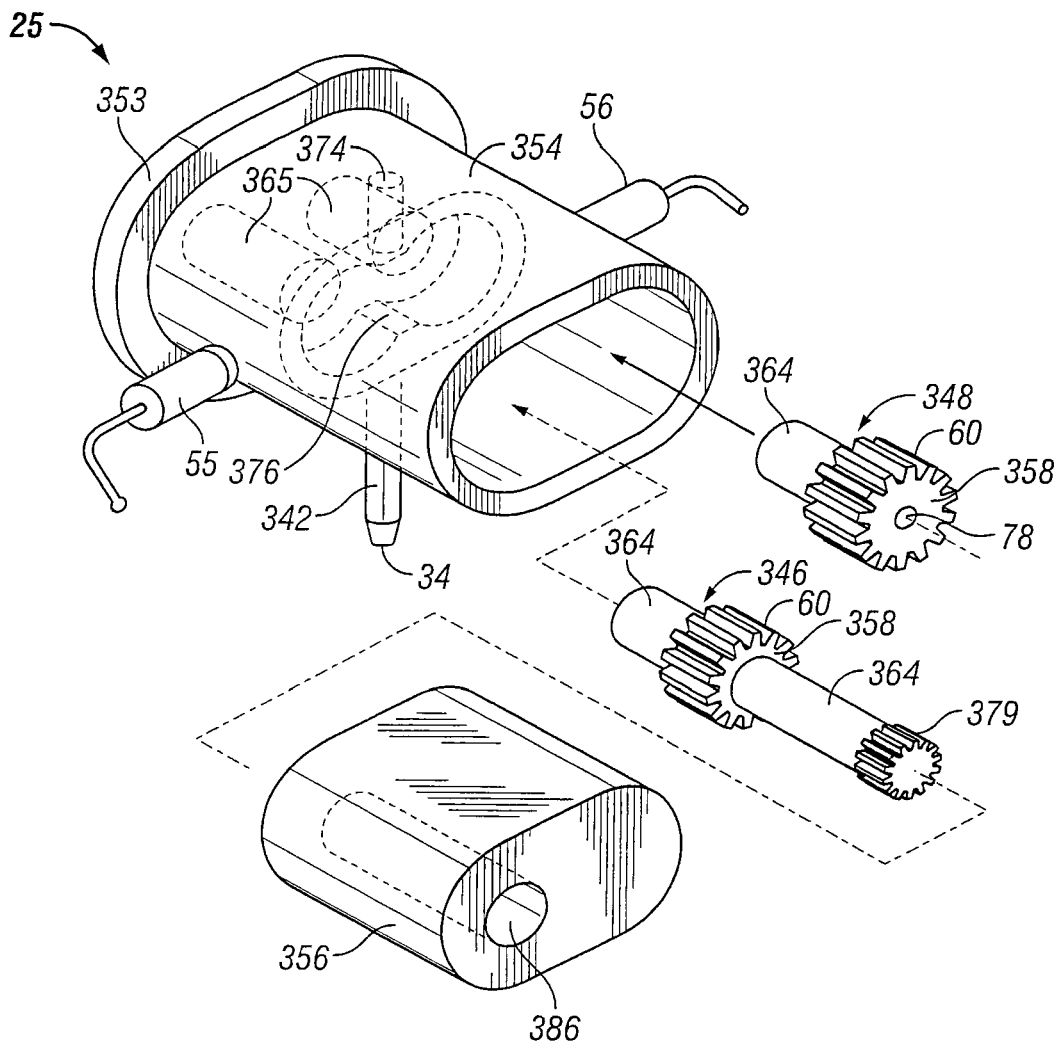
FIG. 34 is an exploded pictorial rear view of the pump assembly of the dispenser shown in FIG. 32.

The construction of the pump assembly 25 is best seen with reference to FIG. 34. The pump assembly 25 is a gear-type rotary pump with two intermeshing gear-like impellers, namely, a driver impeller 346 and a driven impeller 348, received in a cavity within a pump casing. The casing 352 comprises a primary casing member 354 with a removable casing plug 356 defining the cavity therebetween.

The impellers 346 and 348 are identical with each adapted to be rotated about its respective axis. Each impeller has a gear portion 358 disposed coaxially about the axis with radially and axially extending teeth 360. Each impeller has an axle member 364 which extends axially from the gear portion 358 and serves to assist in journaling its impeller in the cavity.

The cavity is formed so as to journal the impellers 346 and 348 for rotation with the axes of the impellers parallel, with the impellers disposed beside each other and with the teeth of one impeller intermeshing with the teeth of the other impeller in a nip between the impellers.

The cavity is provided with flat, radially extending front and rear walls to relatively closely engage the flat, radially extending front and rear surfaces of the gear portions 358. The front wall of the cavity is formed on the primary casing member 354 with two forwardly extending bores 365 sized to receive and journal the axle members 364 of the impellers to journal the impellers. The cavity has circumferential side wall defined by a part-cylinder forming surface disposed at a constant radius from the axis of the driver impeller 346 and a part-cylinder forming surface disposed at a constant radius from the axis of driven impeller 348.

An inlet port 374 opens through the casing into the cavity on an upper side of the cavity above the nip. The feed tube 340 is connected to the inlet port 374 to permit fluid in the container to be in communication with the cavity.

An outlet port 376 opens through the casing 352 into the cavity on a lower side of the casing below the nip. The exit tube 342 is received in a friction fit relation in the outlet port 376 to permit fluid from the cavity to flow out of the discharge outlet 34.

The driver impeller 346 has its axle member 64 extend rearwardly from the rear surface of the impeller 346 out of the pump casing 352 though a journaling bore 386 in the plug 356 for operative connection to a motor 382. The journaling bore 386 of plug 356 and the journaling bore of 356 of the casing 350 preferably engages the axle 64 in a sealed manner as by use of O-ring seals not shown.

The driver impeller 346 is shown to carry gear teeth 379 at its inner end to engage with a gear toothed drive 380 carried by the motor 382. When the motor 382 rotates the driver impeller 346, the driver impeller 346 engages the driven impeller 348 to rotate the driven impeller and to dispense fluid from the discharge outlet 34.

The motor casing 392 carries a forwardly opening socket 408 defined within a forwardly extending wall 406. Socket 408 has a cross-sectional shape, size and depth complementary to that of the casing. As shown in the preferred embodiment, the socket 408 and casing have complementary oval shapes in cross-section. The casing carries a stop flange 353 which extends radially relative the axis of the impellers at a forward end of the casing. The stop flange serves to engage a forward edge of the wall 406 when the casing 352 is fully inserted into socket 408. Insertion and removal of the reservoir assembly 12 is accomplished by sliding the reservoir assembly 12 forwardly and rearwardly relative the housing 14 parallel the axis of the impellers with the support plate 332 received in the support slot 330 and the casing received in the socket 408. With such rearward and forward sliding, the pump assembly 25 becomes engaged and disengaged with the motor 382.

A control mechanism is provided which includes a proximity sensor which will sense the presence of a user's hand under the exit tube 342 and provide a signal to a control circuit coupling the sensor to the electric motor for actuating the motor. The control mechanism preferably controls the supply of power to the motor 382 so that whenever it is desired that fluid be dispensed, the motor is operated for a pre-selected period of time which will dispense a single dose being approximately a predetermined quantity of fluid.

The reservoir assembly 12 is preferably disposable and recyclable. In this regard, each element of the reservoir assembly 12 is preferably formed from recyclable plastic material. The container 22 illustrated in FIG. 33 is a collapsible container form made of recyclable plastic material. Similarly, the collar 326 and its one-way valve 336 can all be made from recyclable plastic materials. Each of the feed tube 340, exit tube 342, primary casing member 354 and casing plug 356 as well as the two impellers 346 and 348 are each preferably formed from recyclable plastic material. Thus, the entirety of the reservoir assembly 12 is preferably formed from recyclable plastic material which can, after use, readily be recycled.

In the context of the embodiment illustrated in FIGS. 32 to 35, various different components of the dispenser may be used as a removable and replaceable keying component to carry a waveguide preferably including a photochromic portion.

FIG. 33 shows an arrangement in which the pump impeller 346 and notably its axle 364 may form a waveguide made from electromagnetic radiation transmitting plastic with radiation to be emitted via a key emitter 55 carried on the cover 13 and a key sensor 56 carried on the housing 14 with opposite ends of the axle member 364 forming the inlet and the outlet of the waveguide. The impeller 346 may be characterized as a movable material displacing element which is received inside a chamber for the pump assembly 25.

Reference is made to FIG. 34 which schematically illustrates a key sensor 56 and a key emitter 55 in an arrangement in which the casing 352 is used as a waveguide with an outlet and inlet provided on diametrically opposed sides of the casing 352. In respect of use of the casing 352 as a waveguide, it is to be appreciated that the radiation may extend substantially in a straight line through a portion of the casing underneath the bores 65. In an alternate configuration not shown, a key emitter could be provided at the top of the casing and a key sensor at the bottom of the casing, for example, in between the two bores 65 for passage of radiation vertically therebetween forward of the cavity. Each of the key emitter 55 and key sensor 56 shown only in FIG. 34 could be secured in suitably provided openings (not shown) in the wall 406 of the socket 408.

FIG. 34 illustrates the provision of a removable keying component as a chamber-forming body for a pump having a chamber for receiving a movable material displacing element, that is, the pump impeller therein.

Figure 35:
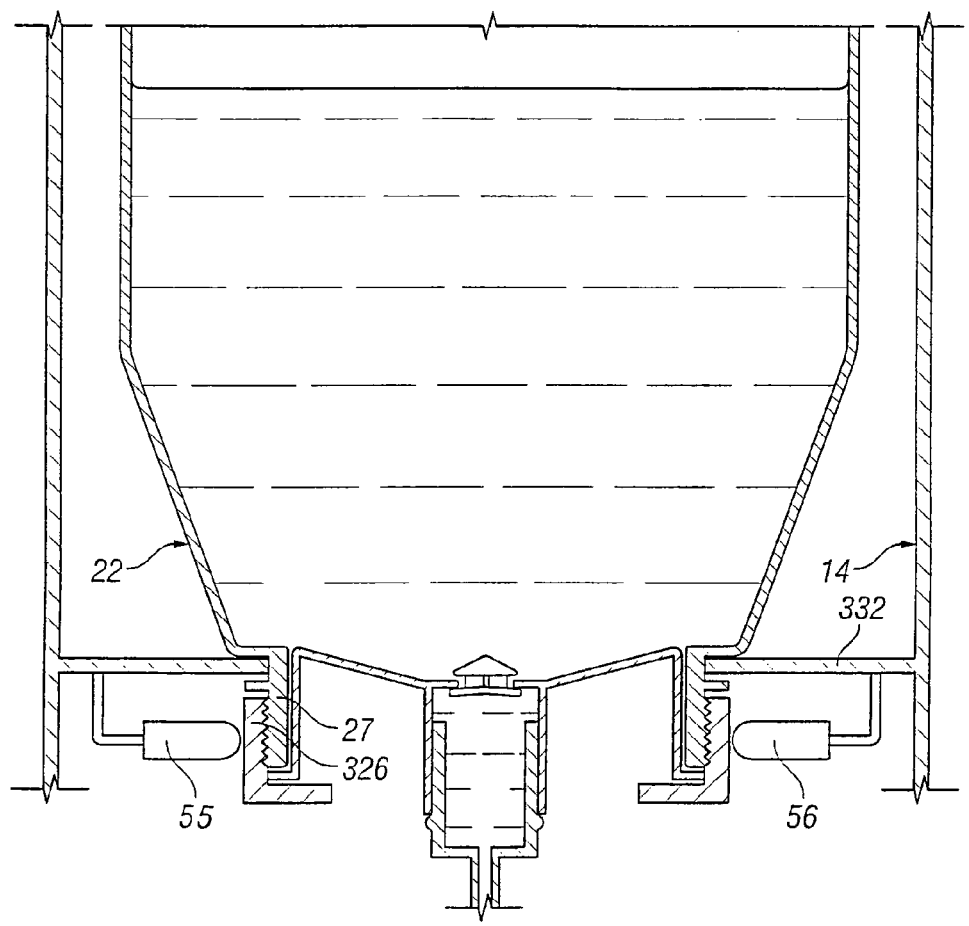
FIG. 35 is a partial cross-sectional front view through the fluid dispenser of FIG. 32.

Reference is made to FIG. 35 which shows an arrangement in which the threaded collar 326 engaged about the outlet neck 27 of the container 22 serves as a waveguide. Electromagnetic radiation is input into the collar 326 on the first side via key emitter 55, passes circumferentially about the collar 326 to a key sensor 56 supported on an opposite side of the housing 14. The collar 326 is preferably secured to the container 22 against removal by various means including welding, bonding and supplemental mechanical arrangements which prevent removal.

The threaded collar 326 like the threaded outer flange 31 of the piston chamber-forming member 30 shown in FIG. 31 is secured to the neck 27 of the bottle 22.

While the outer flange 31 in FIG. 35 and the collar 326 in FIG. 35 are shown as threaded onto the neck of the bottle, various other mechanical coupling arrangements can be provided as, for example, a one-way snap-fit arrangement which prevents removal.

A flange member like outer flange member 31 in FIG. 5 and the collar 326 in FIG. 35 may form a simple cap with an outlet tube leading to a dispensing control mechanism which might merely be a simple arrangement which squeezes or releases the tube to control material discharge. Virtually any form or manner of a cap for closing the container 22 may be used conveniently as a keying component with a waveguide.

In accordance with the embodiment illustrated in FIGS. 32 to 35, the control mechanism will preferably include a mechanism to determine if electromagnetic radiation passing through the waveguide from the key emitter 55 to the key sensor 56 meets expected electromagnetic radiation profiles and the control mechanism may be operated to determine whether or not the waveguide includes an expected photochromic portion.

Figure 36:
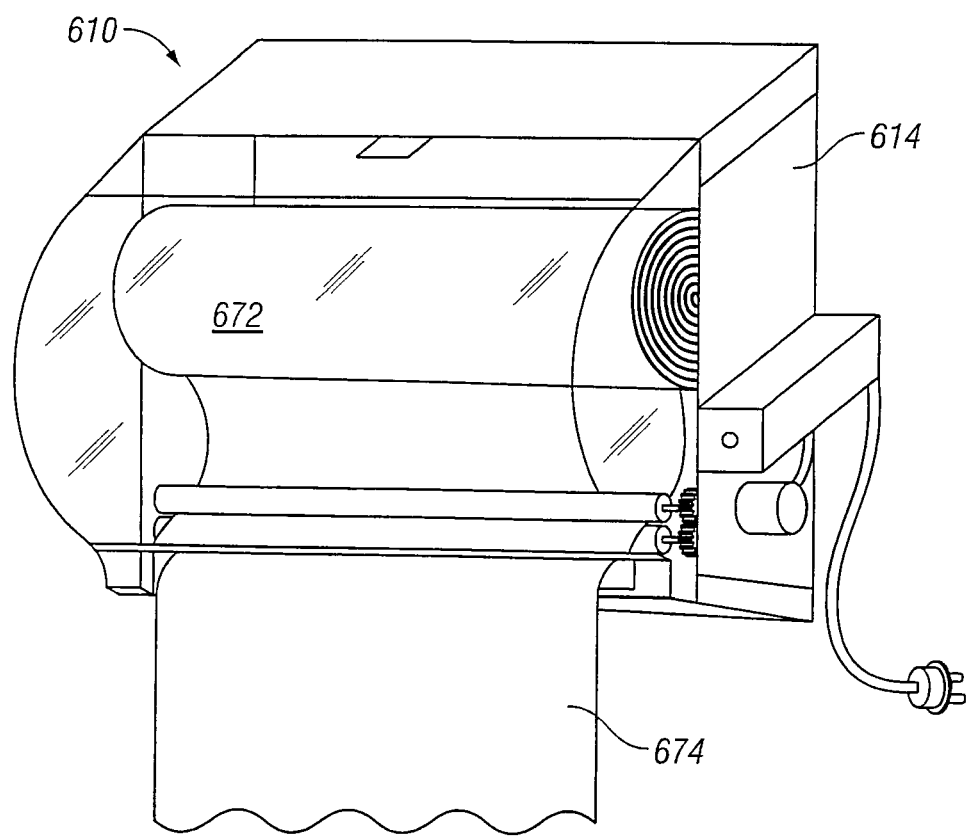
FIG. 36 is a schematic pictorial view of an automatic paper dispenser in accordance with a further aspect of the present invention.
Figure 37:
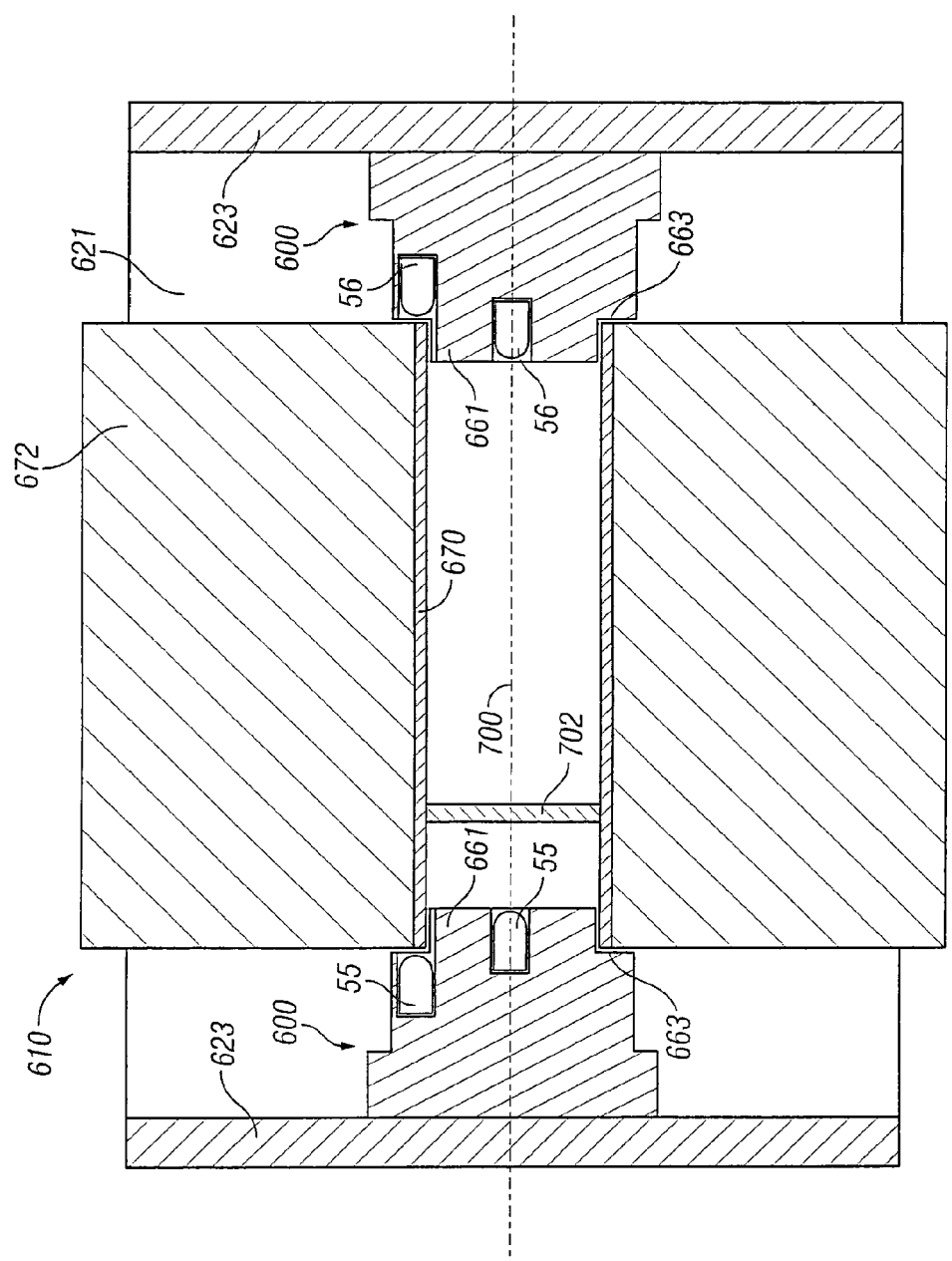
FIG. 37 is a schematic vertical cross-sectional front view through the axis of a roll of paper received in the paper dispenser of FIG. 36.
Figure 38:
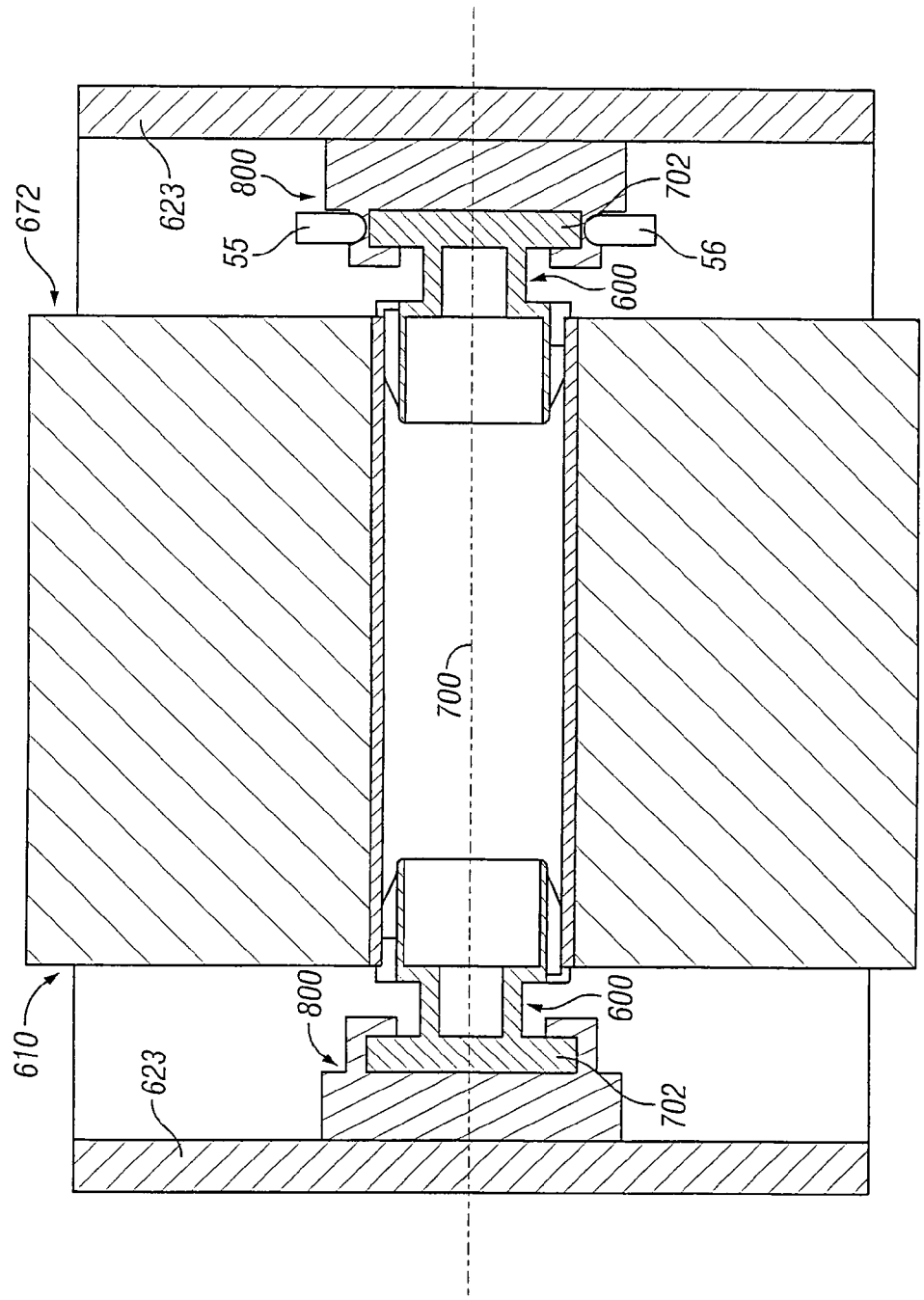
FIG. 38 is a cross-sectional front view the same as in FIG. 36 but of a different embodiment.

Reference is made to FIGS. 36 to 38 which illustrate a dispenser for sheet material wound in a roll, notably paper toweling of the type disclosed, for example, in U.S. Pat. No. 6,069,354 to Alfano issued May 30, 2000.

As can best be seen in FIGS. 36 and 37, the dispenser 610 includes a housing generally indicated 614 with a backplate 621, typically to be mounted vertically to a wall as in a washroom and two side walls 623 which extend vertically and forwardly from the backplate 621. On the inside of each of the side walls 623 there is mounted an end plug 600. The end plugs carry a journaling portion 661 with a cylindrical outside surface which is received within a hollow core 670 of a roll of paper 672 carrying rolled layers of paper sheeting 674 which is to be dispensed. The hollow core 670 is thus rotatably journalled upon the journaling portions for rotation about the axis 700. The end plugs 600 carry radially extending inwardly directed locating shoulder 663 to limit side-to-side movement of the hollow core 670. The hollow core 670 is preferably formed out of material such as plastic to provide a waveguide which has an inlet at one end of the hollow core and an outlet at the other end of the hollow core. A key emitter 55 is provided in one of the end plugs 600 and a key sensor 56 is provided in the other end plug 600 each axially aligned with the circumferential wall of the hollow core 670 such that radiation may be selectively passed axially through the waveguide formed by the cylindrical wall of the hollow core 670.

FIG. 36 also shows a second waveguide being provided as a circular disc 702 which is fixedly secured inside the hollow core 670. The disc 702 is made of a material which transmits electromagnetic radiation and preferably as with the other waveguide includes a photochromic portion. An axially centrally located key emitter 55 is provided on one end plug 600 to direct electromagnetic radiation through the hollow center of the hollow core 670 into the waveguide forming disc 702. A complementary key sensor 56 is provided in the other end plug 600.

FIG. 36 shows the use of two different waveguides. It is to be appreciated that merely one or other of these waveguides may be provided. Each waveguide may preferably include a photochromic portion although this is not necessary.

In the embodiment in FIG. 35, the hollow core 670 is shown as preferably comprising a plastic material which forms a waveguide. Rather than have the entirety of the hollow core 67 being a plastic material, it may comprise a composite material, for example, a thin cylindrical tube of plastic material forming a waveguide about which there may be provided an additional tube of, for example, cardboard or other paper-like material. As well, rather than provide the waveguide on the hollow core to be a continuous cylinder, the waveguide might comprise but a strand of optical fiber carried on a cylindrical tube of paperboard type material.

Reference is made to FIG. 37 which shows a similar roll of paper 672 carried on a hollow core 670, however, in which the core 670 carries a pair of end plugs 600 which are fixedly secured to the hollow core 670 of the roll of paper and with each end plug 600 being removably secured in a catch member 800 which is fixedly secured to the side wall 623. The two end plugs 600 together with the hollow core 670 are rotatable as a unit with a cylindrical end flange 702 of each of the end plugs 600 received in a cylindrical journaling cavity within the catch members 800. As seen, a key emitter 55 is provided in one catch member 800 and the same catch member has a key sensor 56 at a diametrically opposite location. The cylindrical disc 702 on the end plug 600 thus serves the function of a waveguide and preferably includes a photochromic portion.

While the invention has been described with reference to preferred embodiments, many modifications and variations will now occur to persons skilled in the art. For a definition of the invention, reference is made to the following claims.

We claim:
1. A dispensing system comprising:
a reservoir assembly including a reservoir containing material to be dispensed;
an activation unit,
the reservoir assembly removably coupled to the activation unit for replacement by a similar reservoir assembly,
an electromagnetic radiation waveguide having an inlet and an outlet and providing a path for transmission of electromagnetic radiation from the inlet to the outlet, an electromagnetic radiation emitter carried by the activation unit directing electromagnetic radiation into the waveguide via the inlet,
an electromagnetic radiation sensor carried by the activation unit sensing electromagnetic radiation from the waveguide via the outlet,
at least part of the waveguide carried by the reservoir assembly and removable therewith, and
a control mechanism to control the operation of the emitter and receive input from the sensor to determine whether the electromagnetic radiation sensed by the sensor indicates that a portion of the waveguide carried on the reservoir is photochromic.

2. A dispensing system as claimed in claim 1 wherein:
the control mechanism controlling operation of the dispenser depending upon whether the electromagnetic radiation sensed by the sensor indicates that a portion of the waveguide carried on the reservoir is photochromic.

3. A dispensing system as claimed in claim 2 wherein:
the control mechanism preventing operation of the dispensing system from dispensing the material when the electromagnetic radiation sensed by the sensor indicates that a portion of the waveguide carried on the reservoir is not photochromic.

4. A dispensing system as claimed in claim 1 wherein:
the waveguide includes a photochromic portion which contains a photochromic dye which has an inherent unactivated state and an activated state, on radiating with a dose of activation electromagnetic radiation in a range of activation wavelengths the photochromic dye changing from the unactivated to the activated state, with the photochromic dye in the unactivated state the photochromic portion having an inherent first transmission characteristic of electromagnetic radiation in a range of test wavelengths, and with the photochromic dye in the activated state the photochromic portion having a second transmission characteristic of electromagnetic radiation in the range of test wavelengths different than the first transmission characteristic.

5. A dispensing system as claimed in claim 4 wherein the photochromic dye is selected from the group consisting of a reversible photochromic dye and an irreversible photochromic dye.

6. A dispensing system as claimed in claim 5 wherein the photochromic dye comprises more than one photochromic dye including one or more properties selected from the following group of properties: (a) the range of activation wavelengths for each photochromic dye included being the same or different than the range of activation wavelengths for each other photochromic dye included, and (b) the range of test wavelengths for each photochromic dye included being the same or different the range of test wavelengths wavelengths for each other photochromic dye included.

7. A dispensing system as claimed in claim 6 wherein in the photochromic portion a concentration of each photochromic dye included is selected to provide one or more properties selected from the following group of properties: (a) the dose of activation electromagnetic radiation in a range of activation wavelengths required to change each the photochromic dye included changing from the unactivated to the activated state dye being the same or different than the dose of activation electromagnetic radiation in a range of activation wavelengths required to change each other photochromic dye included, and (b) an ability of each photochromic dye included in the photochromic portion, in the activated state, to absorb electromagnetic radiation in the range of test wavelengths being the same or different than an ability of each other photochromic dye included in the photochromic portion, when in the activated state, to absorb electromagnetic radiation in the range of test wavelengths, and (c) an ability of each photochromic dye included in the photochromic portion, in the unactivated state, to absorb electromagnetic radiation in the range of test wavelengths being the same or different than an ability of each other photochromic dye included in the photochromic portion, when in the unactivated state, to absorb electromagnetic radiation in the range of test wavelengths.

8. A dispensing system as claimed in claim 4 wherein the photochromic portion includes a reversible photochromic dye.

9. A dispensing system as claimed in claim 8 wherein the reversible photochromic dye changing from the activated state to the unactivated state, either (a) after a reversion period of time has passed from the waveguide last being last being radiated by activation electromagnetic radiation in the range of activation wavelengths, or (b) after being radiated by a dose of reversion electromagnetic radiation in a range of reversion.

10. A dispensing system as claimed in claim 4 wherein the emitter is capable of emitting activation electromagnetic radiation in the range of activation wavelengths and electromagnetic radiation in the range of test wavelengths, the sensor capable of sensing electromagnetic radiation in the range of test wavelengths, the control mechanism selectively controlling the emitting by the emitter of activation electromagnetic radiation in the range of activation wavelengths and electromagnetic radiation in the range of test wavelengths.

11. A dispensing system as claimed in claim 10 wherein the control mechanism controls operation of the dispensing apparatus dependent on whether the electromagnetic radiation sensed by the sensor appropriately correlates to one or more pre-selected electromagnetic radiation profiles.

12. A dispensing system as claimed in claim 11 wherein one or more pre-selected electromagnetic radiation profiles is selected by the control mechanism as a function of electromagnetic radiation emitted by the emitter.

13. A dispensing system as claimed in claim 12 wherein removal of the reservoir assembly from the activation unit causing destruction of a portion of the waveguide which changes transmission characteristics of electromagnetic radiation from the inlet to the outlet via the path.

14. A dispensing system as claimed in claim 11 wherein the waveguide includes a frangible portion comprising a portion of the path, which frangible portion if broken changes the transmission characteristics of the waveguide such that the electromagnetic radiation sensed by the sensor will not appropriately correlate to the pre-selected electromagnetic radiation profiles, and wherein removal of the reservoir assembly from the dispensing apparatus breaks the frangible portion.

15. A dispensing system as claimed in claim 10 wherein the reservoir assembly comprises more than one of the waveguide with each waveguide being the same or different than other waveguides included in respect of one or more of the following properties: (a) the photochromic dye, (d) a concentration of each photochromic dye included, (e) a length of the path for transmission of electromagnetic radiation from the inlet to the outlet.

16. A dispensing system as claimed in claim 4 wherein the material is a fluid, the dispensing system including a pump mechanism activatable by the activation unit to dispense the fluid from the reservoir out of the outlet opening.

17. A dispensing system as claimed in claim 16,
the reservoir having an outlet opening for dispensing of the fluid therefrom, an outlet member secured to the outlet opening substantially against removal from the reservoir, the outlet member when secured to the reservoir rendering the reservoir difficult to refill with the fluid through the outlet opening, the reservoir aside from the outlet opening not having another opening via which fluid can be passed except with difficulty to refill the reservoir with the fluid, and removal of the outlet member causing destruction of a portion of the waveguides which changes a transmission characteristic of the electromagnetic radiation of the waveguide from the inlet to the outlet via the path.

18. A dispensing system as claimed in claim 16 wherein the reservoir assembly includes the pump mechanism.

19. A dispensing system as claimed in claim 4 wherein the waveguide is entirely carried waveguide carried by the reservoir assembly and removable therewith.

20. A dispensing system as claimed in claim 16 wherein:
the waveguide is entirely carried by the reservoir assembly and removable therewith,
the reservoir having an outlet opening for dispensing of the fluid therefrom,
the waveguide provided in a collar member secured about the outlet opening substantially against removal from the reservoir.

* * * * *